US012495424B2

(12) United States Patent
Xue et al.

(10) Patent No.: US 12,495,424 B2
(45) Date of Patent: Dec. 9, 2025

(54) COMMUNICATION METHOD, COMMUNICATION APPARATUS, AND DEVICE INCLUDING PERIODICITY

(71) Applicant: Huawei Technologies Co., Ltd., Shenzhen (CN)

(72) Inventors: Lixia Xue, Beijing (CN); Xu Zhang, Beijing (CN); Feng Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 586 days.

(21) Appl. No.: 17/738,874

(22) Filed: May 6, 2022

(65) Prior Publication Data

US 2022/0264628 A1 Aug. 18, 2022

Related U.S. Application Data

(63) Continuation of application No. PCT/CN2019/116811, filed on Nov. 8, 2019.

(51) Int. Cl.
*H04W 72/23* (2023.01)
*H04W 52/02* (2009.01)

(52) U.S. Cl.
CPC ....... *H04W 72/23* (2023.01); *H04W 52/0206* (2013.01); *H04W 52/0216* (2013.01)

(58) Field of Classification Search
CPC ............ H04W 72/23; H04W 52/0206; H04W 52/0216; Y02D 30/70
See application file for complete search history.

(56) References Cited

U.S. PATENT DOCUMENTS 10,841,914 B2 * 11/2020 Liou .................... H04L 5/0094
10,951,383 B2 * 3/2021 Lu ....................... H04L 5/0094
(Continued)

FOREIGN PATENT DOCUMENTS

| CN | 109219113 A | 1/2019 |
| CN | 110167151 A | 8/2019 |
| WO | 2019031580 A1 | 2/2019 |

OTHER PUBLICATIONS

"UE adaptation schemes," 3GPP TSG RAN WG1 Meeting #95, R1-1813011, Spokane, USA, Total 11 pages, 3rd Generation Partnership Project, Valbonne, France (Nov. 12-16, 2018).

(Continued)

*Primary Examiner* — Mounir Moutaouakil
(74) *Attorney, Agent, or Firm* — Leydig, Voit & Mayer, Ltd.

(57) ABSTRACT

This application relates to a communication method, a communication apparatus, and a device. The method includes: determining first signaling, where the first signaling is used to indicate at least one periodicity, and one of the at least one periodicity is a periodicity to be used by a terminal device to detect a downlink signal; and sending the first signaling. In embodiments of this application, a network device may indicate the at least one periodicity to the terminal device, so that the terminal device can detect the downlink signal based on the at least one periodicity. For example, the at least one periodicity matches a state of the network device. This is equivalent to describing that the terminal device can detect the downlink signal based on the state of the network device, to reduce power consumption of the terminal device as much as possible.

16 Claims, 13 Drawing Sheets

(56) References Cited

U.S. PATENT DOCUMENTS

| | | | |
|---|---|---|---|
| 11,374,639 B2* | 6/2022 | Li | H04W 72/046 |
| 2017/0303265 A1* | 10/2017 | Islam | H04W 74/0833 |
| 2018/0035372 A1* | 2/2018 | Pradas | H04W 76/28 |
| 2019/0069277 A1 | 2/2019 | Awad et al. | |
| 2019/0104510 A1 | 4/2019 | Lee et al. | |
| 2019/0123992 A1* | 4/2019 | Ly | H04W 24/10 |
| 2019/0199422 A1* | 6/2019 | Li | H04W 72/046 |
| 2019/0313383 A1 | 10/2019 | Xiong et al. | |
| 2020/0022177 A1* | 1/2020 | Liu | H04L 1/0008 |
| 2020/0037253 A1* | 1/2020 | Annam | H04W 52/0245 |
| 2021/0385835 A1* | 12/2021 | Medina Acosta | H04W 72/1268 |
| 2022/0400433 A1* | 12/2022 | Xu | H04L 5/0091 |
| 2023/0134762 A1* | 5/2023 | Koskela | H04W 24/08 370/329 |

OTHER PUBLICATIONS

"Discussion on UE adaptation schemes," 3GPP TSG RAN WG1 Meeting #94bis, R1-1810892, Chengdu, China, Total 6 pages, 3rd Generation Partnership Project, Valbonne, France (Oct. 8-12, 2018).

"Potential Enhancements for NR UE Power Saving," 3GPP TSG-RAN WG1 Meeting #92bis, R1-1804773, Sanya, China, pp. 1-5, 3rd Generation Partnership Project, Valbonne, France (Apr. 16-20, 2018).

Spreadtrum Communications, "Discussion on DL signals and channels for NR-U," 3GPP TSG RAN WG1 #97, Reno, S.A, R1-1906384, Total 4 pages, 3rd Generation Partnership Project, Valbonne, France (May 13-17, 2019).

LG Electronics, "Discussion on evaluation methodology for UE power consumption," 3GPP TSG RAN WG1 Meeting #95, Spokane, USA, R1-1812586, Total 9 pages, 3rd Generation Partnership Project, Valbonne, France (Nov. 12-16, 2018).

* cited by examiner

COMMUNICATION METHOD, COMMUNICATION APPARATUS, AND DEVICE INCLUDING PERIODICITY

CROSS-REFERENCE TO RELATED APPLICATIONS

This application is a continuation of International Application No. PCT/CN2019/116811, filed on Nov. 8, 2019, the disclosure of which is hereby incorporated by reference in its entirety.

TECHNICAL FIELD

This application relates to the field of mobile communication technologies, and in particular, to a communication method, a communication apparatus, and a device.

BACKGROUND

To reduce power consumption of a terminal device, a periodicity for a physical downlink control channel (PDCCH) may be configured for a terminal device in a radio resource control (RRC) connected mode, and the terminal device detects the PDCCH based on the configured periodicity.

However, a base station may have a plurality of working states, for example, a normal working state or a sleep state. In different states, the base station sends the PDCCH at different frequencies. However, currently, the terminal device usually detects the PDCCH based on only one periodicity. It is clear that this cannot correspond to the different states of the base station, and may increase the power consumption of the terminal device.

SUMMARY

Embodiments of this application provide a communication method, a communication apparatus, and a device, to reduce power consumption of a terminal device.

According to a first aspect, a first type of communication method is provided. The method includes: determining first signaling, where the first signaling is used to indicate at least one periodicity, and each of the at least one periodicity is a periodicity to be used by a terminal device to detect a downlink signal; and sending the first signaling.

The method may be performed by a first communication apparatus. The first communication apparatus may be a communication device, or may be a communication apparatus, for example, a chip, that can support the communication device in implementing a function required in the method. For example, the first communication apparatus is a network device, a chip that is disposed in the network device and that is configured to implement a function of the network device, or another component configured to implement the function of the network device. In the following description process, an example in which the first communication apparatus is the network device is used.

In embodiments of this application, the network device may indicate the at least one periodicity to the terminal device, so that the terminal device can detect the downlink signal based on the at least one periodicity. For example, the at least one periodicity matches a state of the network device. This is equivalent to describing that the terminal device can detect the downlink signal based on the state of the network device, to reduce power consumption of the terminal device as much as possible.

In an optional implementation, the at least one periodicity matches at least one sleep mode.

One periodicity matches one sleep mode. For example, a matching manner is that a difference between a length of the periodicity and a sleep granularity of the sleep mode is less than a first threshold. For example, the first threshold is configured by the network device, or specified in a protocol. If the first threshold is 0, the length of the periodicity is equal to the sleep granularity of the sleep mode. In this way, the periodicity matches the sleep mode of the network device, so that when the network device is in sleep, the terminal device may alternatively detect the downlink signal based on the matched periodicity, so as to avoid as much as possible that when the network device is in the sleep mode, the terminal device still detects the downlink signal based on a periodicity used when the network device is in an active state, thereby reducing a probability that the terminal device performs useless work, and reducing the power consumption of the terminal device. In addition, the periodicity may correspond to the sleep mode of the network device. If the network device may be sequentially in a plurality of sleep modes, a quantity of the at least one periodicity may be greater than 1. In other words, the network device may indicate the plurality of periodicities to the terminal device. When the network device is in one sleep mode, the terminal device may detect the downlink signal based on a periodicity matching the sleep mode, so that the periodicity of the terminal device can match each sleep mode of the network device, and the power consumption of the terminal device can be reduced.

In an optional implementation, the first signaling is further used to indicate a quantity of times of detection to be performed by the terminal device based on the at least one periodicity.

One or more of the at least one periodicity may be executed by the terminal device once or for a plurality of times. For example, for one sleep mode, if the network device repeatedly executes the sleep mode, and the periodicity corresponds to the sleep mode, the periodicity of the terminal device is correspondingly repeated; in other words, the terminal device correspondingly repeatedly detects the downlink signal. Therefore, the first signaling may indicate the quantity of times of detection to be performed by the terminal device based on the at least one periodicity; or other signaling may be used to indicate the quantity of times of detection to be performed by the terminal device based on the at least one periodicity. The quantity of detection times is indicated, so that the periodicity of the terminal device more accurately matches the sleep mode of the network device. For the sleep mode, if the network device repeatedly executes the sleep mode for a plurality of times, the quantity of times may be referred to as a quantity of repetitions of the sleep mode, a quantity of cycles of the sleep mode, or the like. Herein, a quantity of times of detection to be performed by the terminal device based on one periodicity means that an interval between two adjacent detection times satisfies the periodicity, or indicates a quantity of times that the terminal device is to execute the periodicity, instead of indicating a quantity of times that the terminal device is to detect the downlink signal within the periodicity.

In an optional implementation, the first signaling is further used to indicate an order of detection to be performed by the terminal device based on the at least one periodicity.

If the quantity of the at least one periodicity is greater than 1, there is a corresponding order when the terminal device performs detection based on the at least one periodicity or when the terminal device executes the at least one periodicity. Optionally, if the quantity of the at least one periodicity is greater than 1, the first signaling may further indicate the order of the at least one periodicity, or indicate the order in which the terminal device is to perform detection based on the at least one periodicity. Alternatively, other signaling may be used to indicate the order of the at least one periodicity. This is equivalent to indicating the order of the at least one periodicity in an explicit manner. If the at least one periodicity matches the at least one sleep mode, the order of the at least one periodicity may be the same as an order of the at least one corresponding sleep mode, so that the terminal device can detect the downlink signal based on the periodicity matching the sleep mode of the network device.

In an optional implementation, the first signaling is further used to indicate one or more offsets, and the one or more offsets are used to assist in the periodicity-based detection.

The at least one periodicity may correspond to the one or more offsets, and a quantity of offsets corresponding to the at least one periodicity may be equal to or not equal to the quantity of the at least one periodicity. In addition to indicating the at least one periodicity to the terminal device, the network device may further indicate, to the terminal device, the one or more offsets corresponding to the at least one periodicity. The one or more offsets may assist the terminal device in performing detection. For example, the periodicity corresponds to the sleep mode, and the sleep mode corresponds to deactivation duration and activation duration. The offset can enable the periodicity to correspond to the sleep granularity of the sleep mode, and the deactivation duration, the activation duration, and the like that correspond to the sleep mode may not necessarily correspond to the periodicity. In this way, the periodicity determined by the terminal device better matches the sleep mode of the network device.

Alternatively, if the offset corresponding to the at least one periodicity is very short and may be ignored, the network device may not need to indicate the offset corresponding to the at least one periodicity. For example, hardware devices of some vendors have good performance, so that deactivation duration when the network device enters one sleep mode is short, and activation duration when the network device exits from one sleep mode is also short. This does not affect the downlink signal detection performed by the terminal device. In this case, the network device may not need to indicate the offset corresponding to the at least one periodicity.

In an optional implementation, the method further includes:
sending second signaling when the quantity of times of detection to be performed based on the at least one periodicity is reached, where the second signaling is used to indicate a first periodicity, and the first periodicity sequentially follows the at least one periodicity.

If the terminal device needs to sequentially execute a plurality of periodicities, and the first signaling indicates only a part of periodicities that are to be executed subsequently, the network device may further send the second signaling to the terminal device. For example, the terminal device may receive the second signaling when execution of the at least one periodicity is completed or before the execution of the at least one periodicity is completed, where the second signaling may indicate one or more periodicities, and the one or more periodicities sequentially follow the at least one periodicity. For example, the second signaling may indicate the first periodicity, and the first periodicity may be one periodicity included in the one or more periodicities. For example, the network device sequentially enters a plurality of sleep modes, and the first signaling indicates only a periodicity corresponding to a part of the sleep modes that the network device is to enter subsequently. Therefore, when the network device is woken up from the at least one sleep mode, the network device may send the second signaling, where the second signaling may indicate the first periodicity corresponding to a next sleep mode that sequentially follows the at least one sleep mode. Optionally, the second signaling may further indicate a quantity of times of detection to be performed by the terminal device based on the first periodicity. Optionally, the second signaling may further indicate an offset of the first periodicity. Similarly, the second signaling may be unicast signaling, multicast signaling, or broadcast signaling. For implementation of the second signaling, refer to the descriptions of the first signaling.

In this manner, the network device may separately indicate different periodicities by using different signaling, to reduce an amount of information included in the signaling. In addition, for example, before indicating a corresponding periodicity each time, the network device may determine the to-be-indicated periodicity, and does not need to determine all periodicities at a time, so that the periodicity determined by the network device better complies with a current situation.

In an optional implementation, that the first signaling is used to indicate at least one periodicity includes:
the first signaling includes the at least one periodicity; or
the first signaling includes an identifier of a first periodicity set, the identifier of the first periodicity set is used to indicate the at least one periodicity, the first periodicity set is one of a plurality of periodicity sets, and each of the plurality of periodicity sets includes an order combination of one or more periodicities.

For example, the network device may obtain the plurality of periodicity sets, and each of the plurality of periodicity sets may include one periodicity or an order combination of a plurality of periodicities. For example, the network device may set the plurality of periodicity sets, or the plurality of periodicity sets may be specified in a protocol. In this case, if the network device needs to determine the at least one periodicity, the network device may directly determine one periodicity set from the plurality of periodicity sets. Determining the periodicity set is determining the at least one periodicity. For example, if the network device determines the first periodicity set, the first periodicity set may correspond to the at least one periodicity, or the first periodicity set may correspond to an order combination of the at least one periodicity.

If the network device configures the plurality of periodicity sets for the terminal device in advance, the plurality of periodicity sets are preconfigured in the terminal device, or the plurality of periodicity sets are specified in a protocol, the first signaling may include the identifier of the first periodicity set. In this way, signaling overheads can be reduced. Alternatively, if the plurality of periodicity sets are not configured for the terminal device in advance, or the network device does not determine the first periodicity set, or the network device determines the first periodicity set but does not configure the plurality of periodicity sets for the terminal device in advance, the first signaling may still include the at least one periodicity. In this way, the terminal device does not need to sense the periodicity set, and implementation of the terminal device is simplified.

In an optional implementation, the method further includes:

sending third signaling, where the third signaling is used to indicate the plurality of periodicity sets.

If the network device configures the plurality of periodicity sets for the terminal device, for example, the network device may send the third signaling, where the third signaling is used to indicate the plurality of periodicity sets. After receiving the third signaling from the network device, the terminal device may determine the plurality of periodicity sets. The third signaling may be unicast signaling, multicast signaling, or broadcast signaling. This is not specifically limited.

In an optional implementation, in the at least one periodicity, a length of an earlier periodicity is greater than a length of a later periodicity.

For example, if the periodicity corresponds to the sleep mode, the network device may determine the corresponding periodicity based on the sleep mode. For example, the network device may determine the order of the at least one sleep mode based on power consumption corresponding to the network device. For example, in the at least one sleep mode, power consumption of the network device in an earlier sleep mode is less than power consumption of the network device in a later sleep mode. For example, the at least one sleep mode determined by the network device is a sleep mode 1, a sleep mode 2, and a sleep mode 3, power consumption of the network device in the sleep mode 1 is power consumption 1, power consumption of the network device in the sleep mode 2 is power consumption 2, and power consumption of the network device in the sleep mode 3 is power consumption 3. The power consumption 1>the power consumption 2>the power consumption 3. In this case, an order of the three sleep modes that is determined by the network device may be the sleep mode 3-the sleep mode 2-the sleep mode 1. Refer to FIG. 4B. Therefore, a corresponding order of the at least one periodicity may be a periodicity corresponding to the sleep mode 3-a periodicity corresponding to the sleep mode 2-a periodicity corresponding to the sleep mode 1. This is equivalent to describing that the network device experiences "deep to light" sleep. The manner in which the network device experiences "deep to light" sleep is the most energy-saving sleep manner. Correspondingly, if the power consumption of the network device in the sleep mode 1 is greater than the power consumption of the network device in the sleep mode 2, a length of the periodicity corresponding to the sleep mode 1 is less than a length of the periodicity corresponding to the sleep mode 2. Therefore, a length of an earlier periodicity is greater than a length of a later periodicity.

In an optional implementation, that the first signaling is used to indicate at least one periodicity includes:
the first signaling indicates first duration, and the first duration is related to one of the at least one periodicity.

For example, when the quantity of the at least one periodicity is 1, the first signaling may indicate the first duration. In this case, one of the at least one periodicity is the periodicity. In this case, that the first duration is related to one of the at least one periodicity means that the first duration is related to the periodicity. For example, the first duration is total duration in which the terminal device is to perform detection based on the periodicity corresponding to the first duration. For example, if the periodicity matches the sleep mode, the first duration may be total duration in which the network device is in the sleep mode. When the network device is in the sleep mode, the terminal device performs detection based on the periodicity corresponding to the first duration. Therefore, the first duration may also be considered as total duration in which the terminal device is to perform detection based on the periodicity. The terminal device may determine the corresponding periodicity based on the first duration, so that a manner of determining the periodicity by the terminal device is relatively flexible. In addition, if the first duration is the total duration in which the network device is in the sleep mode, and the terminal device selects the corresponding periodicity, the terminal device may determine, based on the first duration and a length of the periodicity, a quantity of times of detection to be performed based on the periodicity. Therefore, if the first signaling indicates the first duration, the first signaling may not need to indicate the quantity of times of detection to be performed based on the periodicity. In this way, an amount of information indicated by the first signaling can be reduced, and signaling overheads can be reduced.

In an optional implementation, that the first duration is related to one of the at least one periodicity includes:
a value of the first duration is in direct proportion to a value of the periodicity.

For example, the value of the first duration may be in direct proportion to the value of the periodicity. For example, at least one threshold may include two thresholds Th1 and Th2, where Th1<Th2. It is assumed that X and Y are two positive numbers. If the value of the first duration is X, a corresponding periodicity is a periodicity A. If the value of the first duration is Y, a corresponding periodicity is a periodicity B. If X is less than Y, A is less than B. For example, if 0<X<Th1 and Th1≤Y<Th2, that is, X<Y, A is less than B, that is, the value of the first duration may be in direct proportion to the value of the periodicity.

For example, if the first duration is total duration in which the network device is in the sleep mode, a longer duration in which the network device is in the sleep mode indicates longer duration of the first periodicity, so that the periodicity of the terminal device can match the sleep mode of the network device.

In an optional implementation, the method further includes:
sending fourth signaling after being woken up, where the fourth signaling is WUS signaling, DCI used to schedule data, or signaling used to carry special information.

For example, when the network device is in the sleep mode, if the network device receives a downlink service, the network device is woken up; or after completing execution of the at least one sleep mode, the network device is woken up regardless of whether the network device receives a downlink service. After being woken up, the network device may send the fourth signaling to the terminal device, to perform normal communication with the terminal device.

In an optional implementation, the first signaling is RRC signaling, DCI, or a system message.

Implementation of the first signaling is not limited in embodiments of this application.

In an optional implementation, the at least one periodicity is used to change a periodicity of a first search space of the terminal device to the at least one periodicity, and the first search space is a search space for sending the first signaling; or the first search space includes any one of all search spaces supported by the terminal device.

Before the terminal device replaces the periodicity of the search space of the terminal device based on the at least one periodicity, the original periodicity of the search space may be configured by the network device by using RRC signaling. It can be learned that in embodiments of this application, although the first signaling may be the RRC signaling or may not be the RRC signaling, regardless of a type of the first signaling, the terminal device may replace, based on the at least one periodicity indicated by the first signaling, the original periodicity configured by the network device by using the RRC signaling. In this sense, the at least one periodicity may be used to change the periodicity of the first search space of the terminal device to the at least one periodicity, and the first search space is a search space for sending the first signaling, or the first search space includes any one of all the search spaces supported by the terminal device.

According to a second aspect, a second type of communication method is provided. The method includes: receiving first signaling from a network device, where the first signaling is used to indicate at least one periodicity, and each of the at least one periodicity is a periodicity to be used by a terminal device to detect a downlink signal; and detecting the downlink signal based on the at least one periodicity.

The method may be performed by a second communication apparatus. The second communication apparatus may be a communication device, or may be a communication apparatus, for example, a chip, that can support the communication device in implementing a function required in the method. For example, the second communication apparatus is a terminal device, a chip that is disposed in the terminal device and that is configured to implement a function of the terminal device, or another component configured to implement the function of the terminal device. In the following description process, an example in which the second communication apparatus is the terminal device is used.

In an optional implementation, the at least one periodicity matches at least one sleep mode.

In an optional implementation, the first signaling is further used to indicate a quantity of times of detection to be performed by the terminal device based on the at least one periodicity.

In an optional implementation, the first signaling is further used to indicate an order of detection to be performed by the terminal device based on the at least one periodicity.

In an optional implementation, the first signaling is further used to indicate one or more offsets, and the one or more offsets are used to assist in the periodicity-based detection.

In an optional implementation, the method further includes:
receiving second signaling from the network device, where the second signaling is used to indicate a first periodicity, and the first periodicity sequentially follows the at least one periodicity.

In an optional implementation, that the first signaling is used to indicate at least one periodicity includes:
the first signaling includes the at least one periodicity; or
the first signaling includes an identifier of a first periodicity set, the identifier of the first periodicity set is used to indicate the at least one periodicity, the first periodicity set is one of a plurality of periodicity sets, and each of the plurality of periodicity sets includes an order combination of one or more periodicities.

In an optional implementation, the method further includes:
receiving third signaling from the network device, where the third signaling is used to indicate the plurality of periodicity sets.

In an optional implementation, in the at least one periodicity, a length of an earlier periodicity is greater than a length of a later periodicity.

In an optional implementation, that the first signaling is used to indicate at least one periodicity includes:

the first signaling indicates first duration, and the first duration is related to one of the at least one periodicity.

In an optional implementation, that the first duration is related to one of the at least one periodicity includes:
a value of the first duration is in direct proportion to a value of the periodicity.

In an optional implementation, the method further includes:
receiving fourth signaling from the network device, where the fourth signaling is WUS signaling, DCI used to schedule data, or signaling used to carry special information; and
detecting a downlink signal based on a second periodicity, where the second periodicity does not belong to the at least one periodicity.

In an optional implementation, the first signaling is RRC signaling, DCI, or a system message.

In an optional implementation, the at least one periodicity is used to change a periodicity of a first search space of the terminal device to the at least one periodicity, and the first search space is a search space for sending the first signaling; or the first search space includes any one of all search spaces supported by the terminal device.

In an optional implementation, detecting the downlink signal based on a third periodicity in the at least one periodicity includes:
determining that the periodicity of the first search space is less than or equal to the third periodicity, where the first search space is a search space in which the third periodicity is to be executed; and
detecting the downlink signal in the first search space based on the third periodicity.

In an optional implementation, detecting the downlink signal based on a third periodicity in the at least one periodicity includes:
determining that the periodicity of the first search space is greater than the third periodicity, where the first search space is a search space in which the third periodicity is to be executed; and
detecting the downlink signal in the first search space based on the third periodicity, or detecting the downlink signal in the first search space based on a periodicity of M×P, where M is a positive integer, and P is a length of the second periodicity.

If the periodicity of the first search space is less than or equal to the third periodicity, the terminal device may replace the periodicity of the first search space with the third periodicity, and the terminal device may detect the downlink signal in the first search space based on the third periodicity. Alternatively, if the periodicity of the first search space is greater than the third periodicity, the terminal device may replace the periodicity of the first search space with M times the third periodicity. In other words, the terminal device may detect a PDCCH in the first search space based on the periodicity of M×P, where P represents the length of the third periodicity, and M is a positive integer. A value of M×P may be as close as possible to a length of the original periodicity of the first search space. In this way, the periodicity of the first search space is changed slightly, and implementation of the terminal device is more facilitated. Alternatively, if the periodicity of the first search space is greater than the third periodicity, the terminal device may replace the periodicity of the first search space with the third periodicity, or the terminal device may set the periodicity of the first search space to a least common multiple of the original periodicity of the first search space and the third periodicity. The terminal device may determine, based on a determining result, whether to change the periodicity of the first search space, so that the terminal device can change the periodicity of the search space more properly.

In an optional implementation, the first search space is a search space for receiving the first signaling, or the first search space includes any one of all search spaces supported by the terminal device.

In other words, the terminal device may determine only a second search space. For a search space supported by the terminal device other than the second search space, the terminal device does not apply the at least one periodicity to the search space. In other words, for the search space supported by the terminal device other than the second search space, the terminal device still continues to detect the downlink signal based on an original periodicity of the search space; or the terminal device may determine each of all the search spaces supported by the terminal device, and the terminal device may detect the downlink signal in each of all the supported search spaces based on the third periodicity. The second search space is a search space for receiving the first signaling.

For technical effects brought by the second aspect or the implementations, refer to the descriptions of the technical effects brought by the first aspect or the corresponding implementations.

According to a third aspect, a third type of communication method is provided. The method includes: determining first signaling, where the first signaling is used to indicate a quantity of times of detection to be performed by a terminal device based on a first periodicity, or indicate first duration in which the terminal device is to perform detection based on the first periodicity, and the first periodicity is a periodicity to be used by the terminal device to detect a downlink signal; and sending the first signaling.

The method may be performed by a third communication apparatus. The third communication apparatus may be a communication device, or may be a communication apparatus, for example, a chip, that can support the communication device in implementing a function required in the method. For example, the third communication apparatus is a network device, a chip that is disposed in the network device and that is configured to implement a function of the network device, or another component configured to implement the function of the network device. In the following description process, an example in which the third communication apparatus is the network device is used.

In embodiments of this application, the network device may indicate the first periodicity to the terminal device, so that the terminal device can detect the downlink signal based on the first periodicity. For example, the first periodicity matches a state of the network device. This is equivalent to describing that the terminal device can detect the downlink signal based on the state of the network device, to reduce power consumption of the terminal device as much as possible.

In an optional implementation, the first periodicity matches a sleep mode.

In embodiments of this application, the first periodicity may match the sleep mode, so that the terminal device can detect the downlink signal based on the first periodicity. This is equivalent to describing that the terminal device can detect the downlink signal based on the sleep mode of the network device, to avoid as much as possible that when the network device is in the sleep mode, the terminal device still detects the downlink signal based on a periodicity used when the network device is in an active state, thereby reducing a probability that the terminal device performs useless work, and reducing power consumption of the terminal device.

In an optional implementation, the first signaling is further used to indicate an offset, and the offset is used to assist in the periodicity-based detection.

The first periodicity may correspond to one or more offsets. In addition to indicating the first periodicity to the terminal device, the network device may further indicate, to the terminal device, the one or more offsets corresponding to the first periodicity. The one or more offsets may assist the terminal device in performing detection. For example, the periodicity corresponds to the sleep mode, and the sleep mode corresponds to deactivation duration and activation duration. The offset can enable the periodicity to correspond to a sleep granularity of the sleep mode, and the deactivation duration, the activation duration, and the like that correspond to the sleep mode may not necessarily correspond to the periodicity. In this way, the periodicity determined by the terminal device better matches the sleep mode of the network device.

Alternatively, if the offset corresponding to the first periodicity is very short and may be ignored, the network device may not need to indicate an offset corresponding to at least one periodicity. For example, hardware devices of some vendors have good performance, so that deactivation duration when the network device enters one sleep mode is short, and activation duration when the network device exits from one sleep mode is also short. This does not affect the downlink signal detection performed by the terminal device. In this case, the network device may not need to indicate the offset corresponding to the first periodicity.

In an optional implementation, the method further includes:

sending second signaling after being woken up, where the second signaling is WUS signaling, DCI used to schedule data, or signaling used to carry special information.

For example, when the network device is in the sleep mode, if the network device receives a downlink service, the network device is woken up; or after completing execution of the at least one sleep mode, the network device is woken up regardless of whether the network device receives a downlink service. After being woken up, the network device may send the fourth signaling to the terminal device, to perform normal communication with the terminal device.

In an optional implementation, the first signaling is RRC signaling, DCI, or a system message.

Implementation of the first signaling is not limited in embodiments of this application.

According to a fourth aspect, a fourth type of communication method is provided. The method includes: receiving first signaling from a network device, where the first signaling is used to indicate a quantity of times of detection to be performed by a terminal device based on a first periodicity, or indicate first duration in which the terminal device is to perform detection based on the first periodicity, and the first periodicity is a periodicity to be used by the terminal device to detect a downlink signal; and detecting the downlink signal based on the first periodicity.

The method may be performed by a fourth communication apparatus. The fourth communication apparatus may be a communication device, or may be a communication apparatus, for example, a chip, that can support the communication device in implementing a function required in the method. For example, the fourth communication apparatus is a terminal device, a chip that is disposed in the terminal device and that is configured to implement a function of the terminal device, or another component configured to implement the function of the terminal device. In the following description process, an example in which the fourth communication apparatus is the terminal device is used.

In an optional implementation, the first periodicity matches a sleep mode.

In an optional implementation, the first signaling is used to indicate the first duration, and the method further includes:
determining, based on the first duration and the first periodicity, a quantity of times of detection to be performed based on the first periodicity.

If the first signaling indicates the first duration, because the terminal device may determine the first periodicity, the terminal device may also determine the first quantity of times based on the first duration and the first periodicity. After determining the first quantity of times, the terminal device may detect the downlink signal based on the first periodicity and/or the first quantity of times.

In an optional implementation, the first signaling is further used to indicate an offset, and the offset is used to assist in the periodicity-based detection.

In an optional implementation, the method further includes:
receiving second signaling from the network device, where the second signaling is WUS signaling, DCI used to schedule data, or signaling used to carry special information.

In an optional implementation, the first signaling is RRC signaling, DCI, or a system message.

In an optional implementation, the detecting the downlink signal based on the first periodicity includes:
determining that the periodicity of the first search space is less than or equal to the first periodicity, where the first search space is a search space in which the first periodicity is to be executed; and
detecting the downlink signal in the first search space based on the first periodicity.

In an optional implementation, the detecting the downlink signal based on the first periodicity includes:
determining that the periodicity of the first search space is greater than the first periodicity, where the first search space is a search space in which the first periodicity is to be executed; and
detecting the downlink signal in the first search space based on the first periodicity, or detecting the downlink signal in the first search space based on a periodicity of M×P, where M is a positive integer, and P is a length of the first periodicity.

If the periodicity of the first search space is less than or equal to the first periodicity, the terminal device may replace the periodicity of the first search space with the first periodicity, and the terminal device may detect the downlink signal in the first search space based on the first periodicity. Alternatively, if the periodicity of the first search space is greater than the first periodicity, the terminal device may replace the periodicity of the first search space with M times the first periodicity. In other words, the terminal device may detect a PDCCH in the first search space based on the periodicity of M×P, where P represents the length of the first periodicity, and M is a positive integer. A value of M×P may be as close as possible to a length of the original periodicity of the first search space. In this way, the periodicity of the first search space is changed slightly, and implementation of the terminal device is more facilitated. Alternatively, if the periodicity of the first search space is greater than the first periodicity, the terminal device may replace the periodicity of the first search space with the first periodicity, or the terminal device may set the periodicity of the first search space to a least common multiple of the original periodicity of the first search space and the first periodicity. The terminal device may determine, based on a determining result, whether to change the periodicity of the first search space, so that the terminal device can change the periodicity of the search space more properly.

In an optional implementation, the first search space is a search space for receiving the first signaling, or the first search space includes any one of all search spaces supported by the terminal device.

In other words, the terminal device may determine only a second search space. For a search space supported by the terminal device other than the second search space, the terminal device does not apply the first periodicity to the search space. In other words, for the search space supported by the terminal device other than the second search space, the terminal device still continues to detect the downlink signal based on an original periodicity of the search space; or the terminal device may determine each of all the search spaces supported by the terminal device, and the terminal device may detect the downlink signal in each of all the supported search spaces based on the first periodicity. The second search space is a search space for receiving the first signaling.

For technical effects brought by the fourth aspect or the implementations, refer to the descriptions of the technical effects brought by the third aspect or the corresponding implementations.

According to a fifth aspect, a communication apparatus is provided. For example, the communication apparatus is the first communication apparatus described above. The first communication apparatus is configured to perform the method according to any one of the first aspect or the possible implementations. Specifically, the first communication apparatus may include a module configured to perform the method according to any one of the first aspect or the possible implementations, for example, include a processing module and a transceiver module. For example, the transceiver module may include a sending module and a receiving module. The sending module and the receiving module may be different functional modules, or may be a same functional module that can implement different functions. For example, the first communication apparatus is a communication device, or is a chip or another component disposed in the communication device. For example, the communication device is a network device. An example in which the first communication apparatus is the network device is used below. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module that can implement different functions. If the first communication apparatus is the communication device, the transceiver is implemented, for example, by using an antenna, a feeder, and a codec in the communication device. Alternatively, if the first communication apparatus is the chip disposed in the communication device, the transceiver (or the transmitter and the receiver) is, for example, a communication interface in the chip, and the communication interface is connected to a radio frequency transceiver component in the communication device, to implement information sending and receiving by using the radio frequency transceiver component. In a description process of the fifth aspect, that the first communication apparatus is the network device, and the processing module and the transceiver module are still used as examples for description.

The processing module is configured to determine first signaling, where the first signaling is used to indicate at least one periodicity, and each of the at least one periodicity is a periodicity to be used by a terminal device to detect a downlink signal.

The transceiver module is configured to send the first signaling.

In a possible implementation, the at least one periodicity matches at least one sleep mode.

In a possible implementation, the first signaling is further used to indicate a quantity of times of detection to be performed by the terminal device based on the at least one periodicity.

In a possible implementation, the first signaling is further used to indicate an order of detection to be performed by the terminal device based on the at least one periodicity.

In a possible implementation, the first signaling is further used to indicate one or more offsets, and the one or more offsets are used to assist in the periodicity-based detection.

In a possible implementation, the transceiver module is further configured to send second signaling when the quantity of times of detection to be performed based on the at least one periodicity is reached, where the second signaling is used to indicate a first periodicity, and the first periodicity sequentially follows the at least one periodicity.

In a possible implementation, that the first signaling is used to indicate at least one periodicity includes:
 the first signaling includes the at least one periodicity; or
 the first signaling includes an identifier of a first periodicity set, the identifier of the first periodicity set is used to indicate the at least one periodicity, the first periodicity set is one of a plurality of periodicity sets, and each of the plurality of periodicity sets includes an order combination of one or more periodicities.

In a possible implementation, the transceiver module is further configured to send third signaling, where the third signaling is used to indicate the plurality of periodicity sets.

In a possible implementation, in the at least one periodicity, a length of an earlier periodicity is greater than a length of a later periodicity.

In a possible implementation, that the first signaling is used to indicate at least one periodicity includes:
 the first signaling indicates first duration, and the first duration is related to one of the at least one periodicity.

In a possible implementation, that the first duration is related to one of the at least one periodicity includes:
 a value of the first duration is in direct proportion to a value of the periodicity.

In a possible implementation, the transceiver module is further configured to send fourth signaling after the network device is woken up, where the fourth signaling is WUS signaling, DCI used to schedule data, or signaling used to carry special information.

In a possible implementation, the first signaling is RRC signaling, DCI, or a system message.

In a possible implementation, the at least one periodicity is used to change a periodicity of a first search space of the terminal device to the at least one periodicity, and the first search space is a search space for sending the first signaling; or the first search space includes any one of all search spaces supported by the terminal device.

For technical effects brought by the fifth aspect or the implementations, refer to the descriptions of the technical effects brought by the first aspect or the corresponding implementations.

According to a sixth aspect, a communication apparatus is provided. For example, the communication apparatus is the second communication apparatus described above. The second communication apparatus is configured to perform the method according to any one of the second aspect or the possible implementations. Specifically, the second communication apparatus may include a module configured to perform the method according to any one of the second aspect or the possible implementations, for example, include a processing module and a transceiver module. For example, the transceiver module may include a sending module and a receiving module. The sending module and the receiving module may be different functional modules, or may be a same functional module that can implement different functions. For example, the second communication apparatus is a communication device, or is a chip or another component disposed in the communication device. For example, the communication device is a terminal device. An example in which the second communication apparatus is the terminal device is used below. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module that can implement different functions. If the second communication apparatus is the communication device, the transceiver is implemented, for example, by using an antenna, a feeder, and a codec in the communication device. Alternatively, if the second communication apparatus is the chip disposed in the communication device, the transceiver (or the transmitter and the receiver) is, for example, a communication interface in the chip, and the communication interface is connected to a radio frequency transceiver component in the communication device, to implement information sending and receiving by using the radio frequency transceiver component. In a description process of the sixth aspect, that the second communication apparatus is the terminal device, and the processing module and the transceiver module are still used as examples for description.

The transceiver module is configured to receive first signaling from a network device, where the first signaling is used to indicate at least one periodicity, and each of the at least one periodicity is a periodicity to be used by the terminal device to detect a downlink signal.

The processing module is configured to detect the downlink signal based on the at least one periodicity.

In an optional implementation, the at least one periodicity matches at least one sleep mode.

In an optional implementation, the first signaling is further used to indicate a quantity of times of detection to be performed by the terminal device based on the at least one periodicity.

In an optional implementation, the first signaling is further used to indicate an order of detection to be performed by the terminal device based on the at least one periodicity.

In a possible implementation, the first signaling is further used to indicate one or more offsets, and the one or more offsets are used to assist in the periodicity-based detection.

In an optional implementation, the transceiver module is further configured to receive second signaling from the network device, where the second signaling is used to indicate a first periodicity, and the first periodicity sequentially follows the at least one periodicity.

In an optional implementation, that the first signaling is used to indicate at least one periodicity includes:
the first signaling includes the at least one periodicity; or
the first signaling includes an identifier of a first periodicity set, the identifier of the first periodicity set is used to indicate the at least one periodicity, the first periodicity set is one of a plurality of periodicity sets, and each of the plurality of periodicity sets includes an order combination of one or more periodicities.

In an optional implementation, the transceiver module is further configured to receive third signaling from the network device, where the third signaling is used to indicate the plurality of periodicity sets.

In an optional implementation, in the at least one periodicity, a length of an earlier periodicity is greater than a length of a later periodicity.

In an optional implementation, that the first signaling is used to indicate at least one periodicity includes:
the first signaling indicates first duration, and the first duration is related to one of the at least one periodicity.

In an optional implementation, that the first duration is related to one of the at least one periodicity includes:
a value of the first duration is in direct proportion to a value of the periodicity.

In an optional implementation, the transceiver module is further configured to receive fourth signaling from the network device, where the fourth signaling is WUS signaling, DCI used to schedule data, or signaling used to carry special information; and the processing module is further configured to detect a downlink signal based on a second periodicity, where the second periodicity does not belong to the at least one periodicity.

In an optional implementation, the first signaling is RRC signaling, DCI, or a system message.

In an optional implementation, the at least one periodicity is used to change a periodicity of a first search space of the terminal device to the at least one periodicity, and the first search space is a search space for sending the first signaling; or the first search space includes any one of all search spaces supported by the terminal device.

In an optional implementation, the processing module is configured to detect the downlink signal based on a third periodicity in the at least one periodicity in the following manner:
determining that the periodicity of the first search space is less than or equal to the third periodicity, where the first search space is a search space in which the third periodicity is to be executed; and detecting the downlink signal in the first search space based on the third periodicity.

In an optional implementation, the processing module is configured to detect the downlink signal based on a third periodicity in the at least one periodicity in the following manner:
determining that the periodicity of the first search space is greater than the third periodicity, where the first search space is a search space in which the third periodicity is to be executed; and
detecting the downlink signal in the first search space based on the third periodicity, or detecting the downlink signal in the first search space based on a periodicity of M×P, where M is a positive integer, and P is a length of the second periodicity.

In an optional implementation, the first search space is a search space for receiving the first signaling, or the first search space includes any one of all search spaces supported by the terminal device.

For technical effects brought by the sixth aspect or the implementations, refer to the descriptions of the technical effects brought by the second aspect or the corresponding implementations.

According to a seventh aspect, a communication apparatus is provided. For example, the communication apparatus is the third communication apparatus described above. The third communication apparatus is configured to perform the method according to any one of the third aspect or the possible implementations. Specifically, the third communication apparatus may include a module configured to perform the method according to any one of the third aspect or the possible implementations, for example, include a processing module and a transceiver module. For example, the transceiver module may include a sending module and a receiving module. The sending module and the receiving module may be different functional modules, or may be a same functional module that can implement different functions. For example, the first communication apparatus is a communication device, or is a chip or another component disposed in the communication device. For example, the communication device is a network device. An example in which the third communication apparatus is the network device is used below. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module that can implement different functions. If the third communication apparatus is the communication device, the transceiver is implemented, for example, by using an antenna, a feeder, and a codec in the communication device. Alternatively, if the third communication apparatus is the chip disposed in the communication device, the transceiver (or the transmitter and the receiver) is, for example, a communication interface in the chip, and the communication interface is connected to a radio frequency transceiver component in the communication device, to implement information sending and receiving by using the radio frequency transceiver component. In a description process of the seventh aspect, that the third communication apparatus is the network device, and the processing module and the transceiver module are still used as examples for description.

The processing module is configured to determine first signaling, where the first signaling is used to indicate a quantity of times of detection to be performed by a terminal device based on a first periodicity, or indicate first duration in which the terminal device is to perform detection based on the first periodicity, and the first periodicity is a periodicity to be used by the terminal device to detect a downlink signal.

The transceiver module is configured to send the first signaling.

In an optional implementation, the first periodicity matches a sleep mode.

In a possible implementation, the first signaling is further used to indicate an offset, and the offset is used to assist in the periodicity-based detection.

In an optional implementation, the transceiver module is further configured to send second signaling after the network device is woken up, where the second signaling is WUS signaling, DCI used to schedule data, or signaling used to carry special information.

In an optional implementation, the first signaling is RRC signaling, DCI, or a system message.

For technical effects brought by the seventh aspect or the implementations, refer to the descriptions of the technical effects brought by the third aspect or the corresponding implementations.

According to an eighth aspect, a communication apparatus is provided. For example, the communication apparatus is the fourth communication apparatus described above. The fourth communication apparatus is configured to perform the method according to any one of the fourth aspect or the possible implementations. Specifically, the fourth communication apparatus may include a module configured to perform the method according to any one of the fourth aspect or the possible implementations, for example, include a processing module and a transceiver module. For example, the transceiver module may include a sending module and a receiving module. The sending module and the receiving module may be different functional modules, or may be a same functional module that can implement different functions. For example, the fourth communication apparatus is a communication device, or is a chip or another component disposed in the communication device. For example, the communication device is a terminal device. An example in which the fourth communication apparatus is the terminal device is used below. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module that can implement different functions. If the fourth communication apparatus is the communication device, the transceiver is implemented, for example, by using an antenna, a feeder, and a codec in the communication device. Alternatively, if the fourth communication apparatus is the chip disposed in the communication device, the transceiver (or the transmitter and the receiver) is, for example, a communication interface in the chip, and the communication interface is connected to a radio frequency transceiver component in the communication device, to implement information sending and receiving by using the radio frequency transceiver component. In a description process of the eighth aspect, that the fourth communication apparatus is the terminal device, and the processing module and the transceiver module are still used as examples for description.

The transceiver module is configured to receive first signaling from a network device, where the first signaling is used to indicate a quantity of times of detection to be performed by the terminal device based on a first periodicity, or indicate first duration in which the terminal device is to perform detection based on the first periodicity, and the first periodicity is a periodicity to be used by the terminal device to detect a downlink signal.

The processing module is configured to detect the downlink signal based on the first periodicity.

In an optional implementation, the first periodicity matches a sleep mode.

In a possible implementation, the first signaling is used to indicate the first duration, and the processing module is further configured to determine, based on the first duration and the first periodicity, a quantity of times of detection to be performed based on the first periodicity.

In a possible implementation, the first signaling is further used to indicate an offset, and the offset is used to assist in the periodicity-based detection.

In an optional implementation, the transceiver module is further configured to receive second signaling from the network device, where the second signaling is WUS signaling, DCI used to schedule data, or signaling used to carry special information.

In an optional implementation, the first signaling is RRC signaling, DCI, or a system message.

In an optional implementation, the processing module is configured to detect the downlink signal based on the first periodicity in the following manner:
  determining that a periodicity of a first search space is less than or equal to the first periodicity, where the first search space is a search space in which the first periodicity is to be executed; and
  detecting the downlink signal in the first search space based on the first periodicity.

In an optional implementation, the processing module is configured to detect the downlink signal based on the first periodicity in the following manner:
  determining that a periodicity of a first search space is greater than the first periodicity, where the first search space is a search space in which the first periodicity is to be executed; and
  detecting the downlink signal in the first search space based on the first periodicity, or detecting the downlink signal in the first search space based on a periodicity of M×P, where M is a positive integer, and P is a length of the first periodicity.

In an optional implementation, the first search space is a search space for receiving the first signaling, or the first search space includes any one of all search spaces supported by the terminal device.

For technical effects brought by the eighth aspect or the implementations, refer to the descriptions of the technical effects brought by the fourth aspect or the corresponding implementations.

According to a ninth aspect, a communication apparatus is provided. For example, the communication apparatus is the first communication apparatus described above. The communication apparatus includes a processor. Optionally, the communication apparatus may further include a memory, configured to store computer instructions. The processor and the memory are coupled to each other, to implement the method according to any one of the first aspect or the possible implementations. Alternatively, the first communication apparatus may not include a memory, and the memory may be located outside the first communication apparatus. Optionally, the first communication apparatus may further include a communication interface, configured to communicate with another apparatus or device. The processor, the memory, and the communication interface are coupled to each other, to implement the method according to the first aspect or the possible implementations. For example, when the processor executes the computer instructions stored in the memory, the first communication apparatus is enabled to perform the method according to any one of the first aspect or the possible implementations. For example, the first communication apparatus is a communication device, or is a chip or another component disposed in the communication device. For example, the communication device is a network device.

If the first communication apparatus is the communication device, the communication interface is implemented, for example, by using a transceiver (or a transmitter and a receiver) in the communication device, and the transceiver is implemented, for example, by using an antenna, a feeder, and a codec in the communication device. Alternatively, if the first communication apparatus is the chip disposed in the communication device, the communication interface is, for example, an input/output interface such as an input/output pin of the chip, and the communication interface is connected to a radio frequency transceiver component in the communication device, to implement information sending and receiving by using the radio frequency transceiver component.

According to a tenth aspect, a communication apparatus is provided. For example, the communication apparatus is the second communication apparatus described above. The communication apparatus includes a processor. Optionally, the communication apparatus may further include a memory, configured to store computer instructions. The processor and the memory are coupled to each other, to implement the method according to the second aspect or the possible implementations. Alternatively, the second communication apparatus may not include a memory, and the memory may be located outside the second communication apparatus. Optionally, the second communication apparatus may further include a communication interface, configured to communicate with another apparatus or device. The processor, the memory, and the communication interface are coupled to each other, to implement the method according to the second aspect or the possible implementations. For example, when the processor executes the computer instructions stored in the memory, the second communication apparatus is enabled to perform the method according to any one of the second aspect or the possible implementations. For example, the second communication apparatus is a communication device, or is a chip or another component disposed in the communication device. For example, the communication device is a terminal device.

If the second communication apparatus is the communication device, the communication interface is implemented, for example, by using a transceiver (or a transmitter and a receiver) in the communication device, and the transceiver is implemented, for example, by using an antenna, a feeder, and a codec in the communication device. Alternatively, if the second communication apparatus is the chip disposed in the communication device, the communication interface is, for example, an input/output interface such as an input/output pin of the chip, and the communication interface is connected to a radio frequency transceiver component in the communication device, to implement information sending and receiving by using the radio frequency transceiver component.

According to an eleventh aspect, a communication apparatus is provided. For example, the communication apparatus is the third communication apparatus described above. The communication apparatus includes a processor. Optionally, the communication apparatus may further include a memory, configured to store computer instructions. The processor and the memory are coupled to each other, to implement the method according to the third aspect or the possible implementations. Alternatively, the third communication apparatus may not include a memory, and the memory may be located outside the third communication apparatus. Optionally, the third communication apparatus may further include a communication interface, configured to communicate with another apparatus or device. The processor, the memory, and the communication interface are coupled to each other, to implement the method according to the third aspect or the possible implementations. For example, when the processor executes the computer instructions stored in the memory, the third communication apparatus is enabled to perform the method according to any one of the third aspect or the possible implementations. For example, the third communication apparatus is a communication device, or is a chip or another component disposed in the communication device. For example, the communication device is a network device.

If the third communication apparatus is the communication device, the communication interface is implemented, for example, by using a transceiver (or a transmitter and a receiver) in the communication device, and the transceiver is implemented, for example, by using an antenna, a feeder, and a codec in the communication device. Alternatively, if the third communication apparatus is the chip disposed in the communication device, the communication interface is, for example, an input/output interface such as an input/output pin of the chip, and the communication interface is connected to a radio frequency transceiver component in the communication device, to implement information sending and receiving by using the radio frequency transceiver component.

According to a twelfth aspect, a communication apparatus is provided. For example, the communication apparatus is the fourth communication apparatus described above. The communication apparatus includes a processor. Optionally, the communication apparatus may further include a memory, configured to store computer instructions. The processor and the memory are coupled to each other, to implement the method according to the fourth aspect or the possible implementations. Alternatively, the fourth communication apparatus may not include a memory, and the memory may be located outside the fourth communication apparatus. Optionally, the fourth communication apparatus may further include a communication interface, configured to communicate with another apparatus or device. The processor, the memory, and the communication interface are coupled to each other, to implement the method according to the fourth aspect or the possible implementations. For example, when the processor executes the computer instructions stored in the memory, the second communication apparatus is enabled to perform the method according to any one of the fourth aspect or the possible implementations. For example, the fourth communication apparatus is a communication device, or is a chip or another component disposed in the communication device. For example, the communication device is a terminal device.

If the fourth communication apparatus is the communication device, the communication interface is implemented, for example, by using a transceiver (or a transmitter and a receiver) in the communication device, and the transceiver is implemented, for example, by using an antenna, a feeder, and a codec in the communication device. Alternatively, if the fourth communication apparatus is the chip disposed in the communication device, the communication interface is, for example, an input/output interface such as an input/output pin of the chip, and the communication interface is connected to a radio frequency transceiver component in the communication device, to implement information sending and receiving by using the radio frequency transceiver component.

According to a thirteenth aspect, a communication system is provided. The communication system includes the communication apparatus according to the fifth aspect or the communication apparatus according to the ninth aspect, and includes the communication apparatus according to the sixth aspect or the communication apparatus according to the tenth aspect.

According to a fourteenth aspect, a communication system is provided. The communication system includes the communication apparatus according to the seventh aspect or the communication apparatus according to the eleventh aspect, and includes the communication apparatus according to the eighth aspect or the communication apparatus according to the twelfth aspect.

The communication system according to the thirteenth aspect and the communication system according to the fourteenth aspect may be a same communication system, or may be different communication systems.

According to a fifteenth aspect, a computer-readable storage medium is provided. The computer-readable storage medium is configured to store computer instructions. When the computer instructions are run on a computer, the computer is enabled to perform the method according to any one of the first aspect or the possible implementations.

According to a sixteenth aspect, a computer-readable storage medium is provided. The computer-readable storage medium is configured to store computer instructions. When the computer instructions are run on a computer, the computer is enabled to perform the method according to any one of the second aspect or the possible implementations.

According to a seventeenth aspect, a computer-readable storage medium is provided. The computer-readable storage medium is configured to store computer instructions. When the computer instructions are run on a computer, the computer is enabled to perform the method according to any one of the third aspect or the possible implementations.

According to an eighteenth aspect, a computer-readable storage medium is provided. The computer-readable storage medium is configured to store computer instructions. When the computer instructions are run on a computer, the computer is enabled to perform the method according to any one of the fourth aspect or the possible implementations.

According to a nineteenth aspect, a computer program product including instructions is provided. The computer program product is configured to store computer instructions. When the computer instructions are run on a computer, the computer is enabled to perform the method according to any one of the first aspect or the possible implementations.

According to a twentieth aspect, a computer program product including instructions is provided. The computer program product is configured to store computer instructions. When the computer instructions are run on a computer, the computer is enabled to perform the method according to any one of the second aspect or the possible implementations.

According to a twenty-first aspect, a computer program product including instructions is provided. The computer program product is configured to store computer instructions. When the computer instructions are run on a computer, the computer is enabled to perform the method according to any one of the third aspect or the possible implementations.

According to a twenty-second aspect, a computer program product including instructions is provided. The computer program product is configured to store computer instructions. When the computer instructions are run on a computer, the computer is enabled to perform the method according to any one of the fourth aspect or the possible implementations.

In embodiments of this application, a network device may indicate at least one periodicity to a terminal device, so that the terminal device can detect a downlink signal based on the at least one periodicity. For example, the at least one periodicity matches a state of the network device. This is equivalent to describing that the terminal device can detect the downlink signal based on the state of the network device, to reduce power consumption of the terminal device as much as possible.

DESCRIPTION OF EMBODIMENTS

Figure 1:
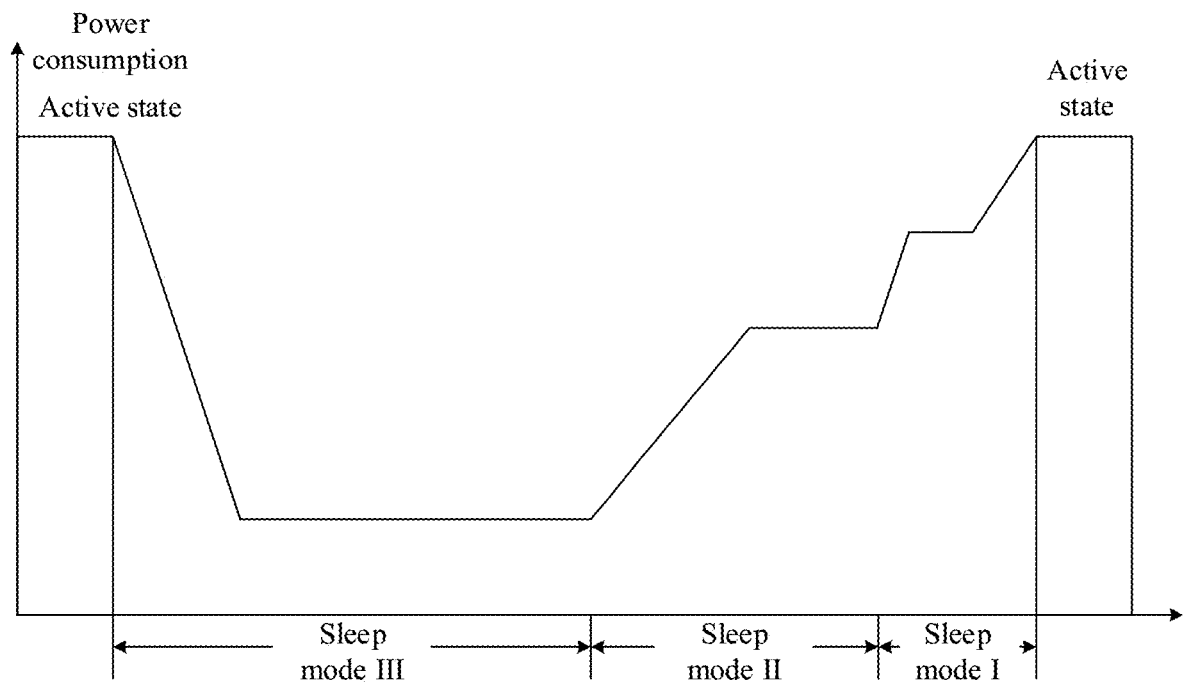
FIG. 1 is a schematic diagram in which a base station sleeps in three sleep modes.

To make the objectives, technical solutions, and advantages of embodiments of this application clearer, the following further describes embodiments of this application in detail with reference to the accompanying drawings.

In the following descriptions, some terms in embodiments of this application are described, to help a person skilled in the art have a better understanding.

(1) A terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function, or a processing device connected to a wireless modem. The terminal device may communicate with a core network through a radio access network (RAN), and exchange a voice or data with the RAN, or exchange a voice and data with the RAN. The terminal device may include user equipment (UE), a wireless terminal device, a mobile terminal device, a device-to-device (D2D) communication terminal device, a vehicle-to-everything (V2X) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a portable, pocket-sized, handheld, or computer built-in mobile apparatus. For example, the terminal device may be a device such as a personal communications service (PCS) phone, a cordless phone, a session initiation protocol (SIP) phone set, a wireless local loop (WLL) station, or a personal digital assistant (PDA). The terminal device further includes a limited device, for example, a device with low power consumption, a device with a limited storage capacity, or a device with a limited computing capability. For example, the terminal device includes an information sensing device such as a barcode, radio frequency identification (RFID), a sensor, a global positioning system (GPS), or a laser scanner.

By way of example and not limitation, in embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligently designs of daily wear, such as glasses, gloves, watches, clothes, and shoes. The wearable device is a portable device that is directly worn or integrated into clothes or an accessory of a user. The wearable device is not merely a hardware device, but is configured to implement a powerful function through software support, data exchange, and cloud interaction. In a broad sense, wearable intelligent devices include full-featured and large-sized devices that can implement all or some functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

If the various terminal devices described above are located in a vehicle (for example, placed in the vehicle or mounted in the vehicle), the terminal devices may be all considered as vehicle-mounted terminal devices. For example, the vehicle-mounted terminal devices are also referred to as on-board units (OBUs).

In embodiments of this application, it may also be understood that all devices that can perform data communication with a base station may be considered as terminal devices.

(2) A network device includes, for example, an access network AN) device such as a base station (for example, an access point), and may be a device that communicates with a wireless terminal device over an air interface through one or more cells in an access network. Alternatively, for example, a network device in a V2X technology is a road side unit (RSU). The base station may be configured to perform mutual conversion between a received over-the-air frame and an IP packet, to serve as a router between a terminal device and a remaining part of the access network, where the remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolved NodeB) in a long term evolution (LTE) system or a long term evolution-advanced (LTE-A) system, may include a next generation NodeB (gNB) in a 5th generation (5G) mobile communication technology new radio (NR) system (which is also briefly referred to as an NR system), or may include a centralized unit (CU) and a distributed unit (DU) in a cloud radio access network (Cloud RAN) system. This is not limited in embodiments of this application.

(3) A downlink control channel is, for example, a PDCCH or an enhanced physical downlink control channel (EPDCCH), or may include another downlink control channel. There is no specific limitation. In embodiments of this application, an example in which a downlink control channel is a PDCCH is mainly used.

(4) A periodicity is also referred to as a detection periodicity or the like. To reduce power consumption of a terminal device, a periodicity for a downlink signal may be configured for the terminal device in an RRC connected mode, and the terminal device detects the downlink signal based on the configured periodicity.

(5) A downlink signal detected by a terminal device includes, for example, a control signal, a data signal, or a control signal and a data signal. The control signal is, for example, a PDCCH.

(6) The terms "system" and "network" in embodiments of this application may be used interchangeably. "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following items (pieces)" or a similar expression thereof indicates any combination of these items, including a singular item (piece) or any combination of plural items (pieces). For example, at least one of a, b, or c may indicate a, or b, or c, or a and b, or a and c, or b and c, or a, b, and c, where a, b, and c may be singular or plural.

In addition, unless otherwise stated, ordinal numbers such as "first" and "second" in embodiments of this application are used to distinguish between a plurality of objects, but are not intended to limit an order, a time sequence, priorities, or importance degrees of the plurality of objects. For example, first signaling and second signaling are merely used to distinguish between different signaling, and do not indicate different content, different sending orders, different priorities, different importance degrees, or the like of the first signaling and the second signaling.

The foregoing describes concepts of some terms used in embodiments of this application. The following describes technical features of embodiments of this application.

A base station may reduce power consumption by entering a sleep mode. Because duration required for turning off and waking up different components is different, the base station may deactivate the components to varying degrees. Correspondingly, the base station may have one or more sleep modes. Each sleep mode may correspond to parameters such as a sleep granularity, sleep power consumption, and wake-up duration. Values of parameters corresponding to different sleep modes are completely different, or are not completely the same. Generally, lower sleep power consumption of a sleep mode indicates a longer sleep granularity and longer wake-up duration. A sleep granularity refers to sleep duration corresponding to a sleep mode.

Table 1 shows sleep granularities and wake-up duration corresponding to three sleep modes, where the wake-up duration may be activation duration in Table 1. Deactivation duration of one sleep mode refers to duration required for a base station to enter the sleep mode from an active state. Activation duration of one sleep mode refers to duration required for a base station to enter an active state from the sleep mode.

TABLE 1

| Sleep mode | Deactivation duration | Sleep granularity | Activation duration |
|---|---|---|---|
| Sleep mode I | 35.5 μs | 71 μs | 35.5 μs |
| Sleep mode II | 0.5 ms | 1 ms | 0.5 ms |
| Sleep mode III | 5 ms | 10 ms | 5 ms |

Certainly, Table 1 is merely an example. For example, in Table 1, for one sleep mode, deactivation duration is equal to activation duration. This is not limited in practice. In some sleep modes, deactivation duration may be not equal to activation duration. In addition, in Table 1, both the deactivation duration and the activation duration are equal to half of the sleep granularity. This is not limited in practice. For example, deactivation duration or activation duration of some sleep modes is ¼ of sleep granularities, or the deactivation duration and the activation duration are very small relative to the sleep granularities and may be ignored.

FIG. 1 is a schematic diagram in which a base station sleeps in the three sleep modes shown in Table 1. Specifically, FIG. 1 describes a process in which the base station sequentially enters different sleep modes from an active state, and then is woken up again. It can be learned from FIG. 1 that the sleep modes that the base station sequentially enters are a sleep mode III, a sleep mode II, and a sleep mode I, and sleep granularities corresponding to the three sleep modes are respectively $T_3$, $T_2$, and $T_1$. In FIG. 1, the base station first enters the sleep mode III having lowest power consumption. Before completely entering the sleep mode III, the base station needs to experience a deactivation process of the sleep mode III, that is, a process represented by a first segment of slashes from left to right in FIG. 1. Deactivation duration and activation duration of the sleep mode III are the longest among those of the three sleep modes. After the sleep mode III ends, the base station switches to the sleep mode II. A switching process experienced before the base station switches to the sleep mode II is a process represented by a second segment of slashes from left to right in FIG. 1, and is related to the activation duration of the sleep mode III, deactivation duration of the sleep mode II, the deactivation duration of the sleep mode III, and/or activation duration of the sleep mode II. A power consumption level, the deactivation duration, the activation duration, and the like of the base station corresponding to the sleep mode II are between those of the sleep mode III and those of the sleep mode I. After the sleep mode II ends, the base station may switch to the sleep mode I after experiencing a process of switching from the sleep mode II to the sleep mode I, that is, a process represented by a third segment of slashes from left to right in FIG. 1, and is related to the activation duration of the sleep mode II, deactivation duration of the sleep mode I, the deactivation duration of the sleep mode II, and/or activation duration of the sleep mode I. The base station corresponding to the sleep mode I has the largest power consumption, but requires the shortest activation duration. After the sleep mode I ends, the base station may exit the sleep mode I and return to the active state after experiencing an activation process of the sleep mode I, that is, a process represented by a fourth segment of slashes from left to right in FIG. 1.

In addition, to reduce power consumption of a terminal device, a PDCCH periodicity may be configured for the terminal device in an RRC connected mode, and the terminal device detects a PDCCH based on the configured periodicity.

For example, for each search space, the following parameters need to be configured for the terminal device to detect the PDCCH: a search space set index, a control-resource set (control-resource set, CORESET) index, a periodicity, a slot (slot) offset, a symbol (symbol) position, a quantity of slots, a quantity of candidate PDCCHs corresponding to each aggregation level, and a search space set type. The CORESET index is an index of a CORESET associated with a search space set, and the CORESET associated with the search space set determines physical resources of the search space set. The periodicity is a time interval for detecting the search space set, and the unit is a slot. The slot offset is a slot offset between starting of the periodicity and actual detection of the search space set, and the offset is less than a length of the periodicity. The symbol position is a position of a start symbol of the CORESET associated with the search space set in each slot, and two adjacent symbol positions are greater than or equal to a quantity of time domain symbols included in the CORESET. The quantity of slots is a quantity of slots for continuously detecting the search space set, and the quantity of slots is less than a quantity of slots corresponding to the periodicity.

Currently, when a base station enters a sleep mode, the base station usually does not reconfigure a PDCCH periodicity for a terminal device, and the terminal device continues to detect a PDCCH based on a periodicity used when the base station is in an active state. This clearly increases power consumption of the terminal device, and reduces efficiency of performing useful power by the terminal device.

In view of this, the technical solutions in embodiments of this application are provided. In embodiments of this application, a network device may indicate at least one periodicity to a terminal device, so that the terminal device can detect a downlink signal based on the at least one periodicity. For example, the at least one periodicity matches a state of the network device. This is equivalent to describing that the terminal device can detect the downlink signal based on the state of the network device, to reduce power consumption of the terminal device as much as possible. In addition, the network device may indicate a plurality of periodicities to the terminal device. For example, different periodicities may correspond to different states of the network device, so that the periodicity of the terminal device matches each state of the network device as much as possible, and the power consumption of the terminal device is reduced.

The technical solutions provided in embodiments of this application may be applied to a 4th generation (4G) 4G mobile communication technology system, for example, an LTE system; a 5G system, for example, an NR system; or a next generation mobile communication system or another similar communication system. This is not specifically limited.

Figure 2:
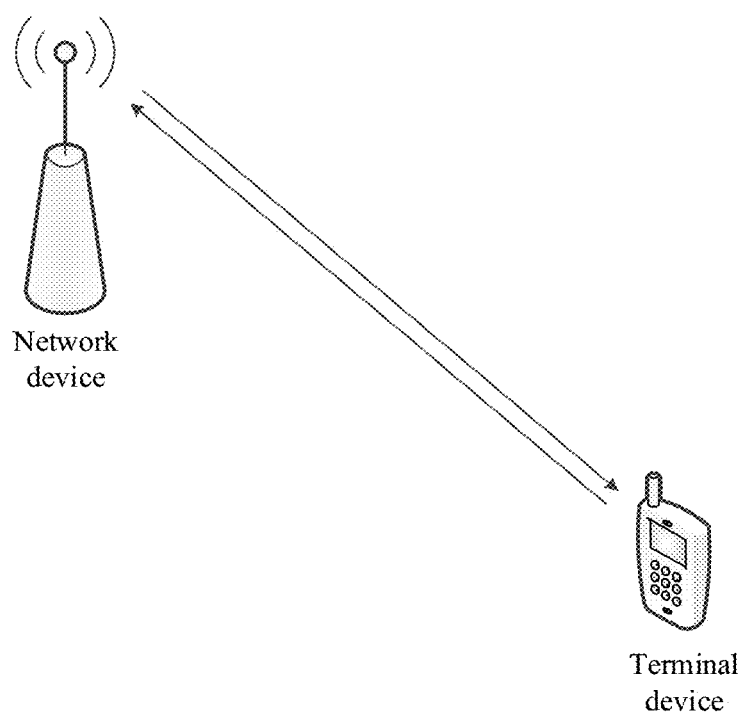
FIG. 2 is a schematic diagram of an application scenario according to an embodiment of this application.

The following describes a network architecture used in an embodiment of this application. Refer to FIG. 2.

FIG. 2 includes a network device and a terminal device, and the terminal device is connected to the network device. Certainly, a quantity of terminal devices in FIG. 2 is merely an example. During actual application, the network device may serve a plurality of terminal devices. The network device in FIG. 2 and each of some or all of the plurality of terminal devices may implement the technical solutions provided in embodiments of this application. In addition, a mobile phone is used as an example of the terminal device in FIG. 2. This is not limited in actual application.

The network device in FIG. 2 may be an access network device, for example, a base station, or may be an RSU or another device. The base station corresponds to different devices in different systems. For example, the base station may correspond to an eNB in a 4G system, and may correspond to a gNB in a 5G system. Certainly, the technical solutions provided in embodiments of this application may also be applied to a future mobile communication system. Therefore, the network device in FIG. 2 may also correspond to an access network device in the future mobile communication system.

The technical solutions provided in embodiments of this application are described below in detail with reference to the accompanying drawings.

Figure 3:
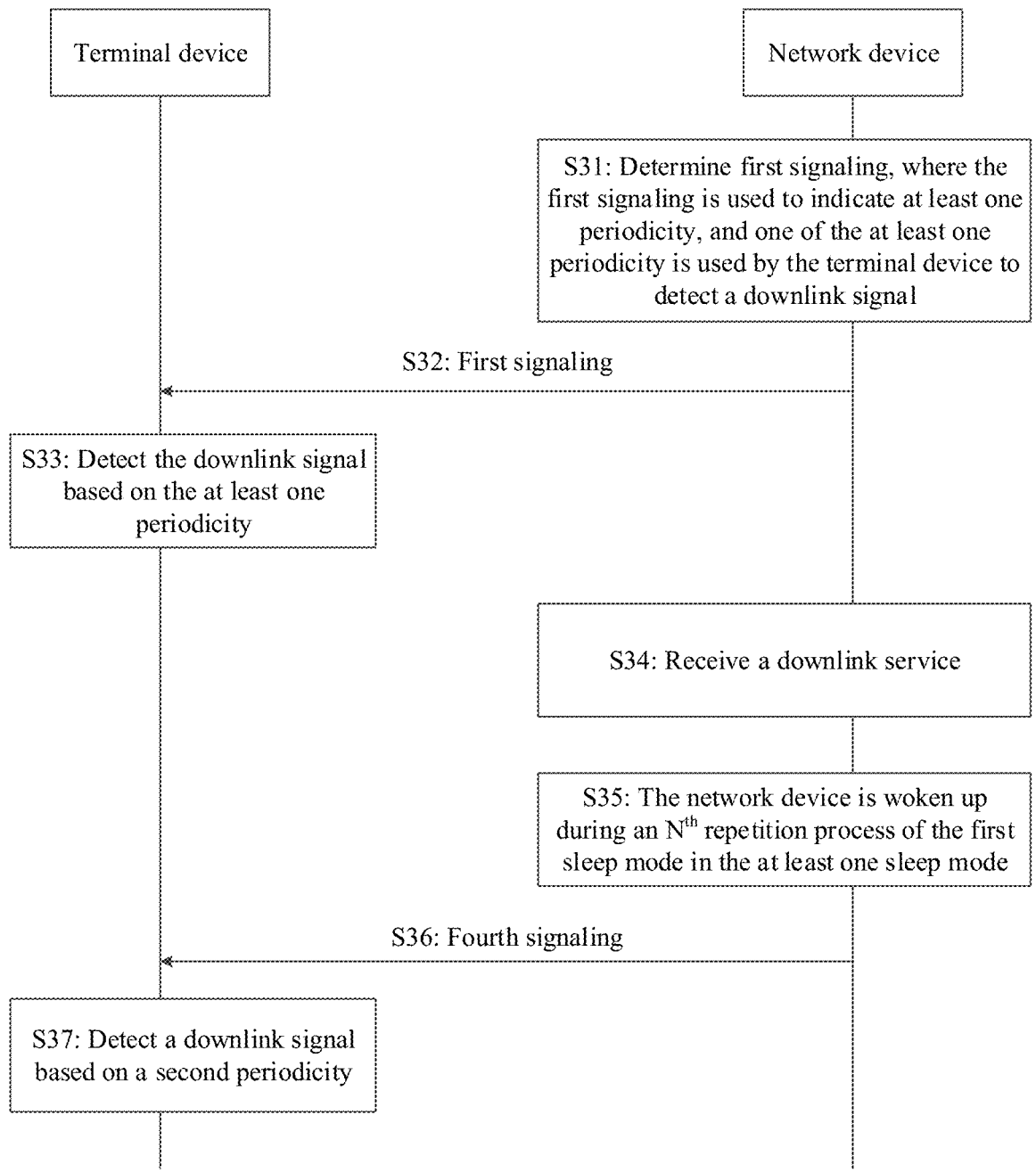
FIG. 3 is a flowchart of a first type of communication method according to an embodiment of this application.

An embodiment of this application provides a first type of communication method. FIG. 3 is a flowchart of the method. In the following description process, an example in which the method is applied to the network architecture shown in FIG. 2 is used. In addition, the method may be performed by two communication apparatuses. The two communication apparatuses are, for example, a first communication apparatus and a second communication apparatus. The first communication apparatus may be a network device or a communication apparatus that can support the network device in implementing a function required in the method. Alternatively, the first communication apparatus may be a terminal device or a communication apparatus that can support the terminal device in implementing a function required in the method. Certainly, the first communication apparatus may alternatively be another communication apparatus, for example, a chip system. Similarly, the second communication apparatus may be a network device or a communication apparatus that can support the network device in implementing a function required in the method. Alternatively, the second communication apparatus may be a terminal device or a communication apparatus that can support the terminal device in implementing a function required in the method. Certainly, the second communication apparatus may alternatively be another communication apparatus, for example, a chip system. In addition, implementations of the first communication apparatus and the second communication apparatus are not limited. For example, the first communication apparatus may be a network device, and the second communication apparatus is a terminal device. Alternatively, both the first communication apparatus and the second communication apparatus are network devices. Alternatively, both the first communication apparatus and the second communication apparatus are terminal devices. Alternatively, the first communication apparatus is a network device, and the second communication apparatus is a communication apparatus that can support a terminal device in implementing a function required in the method. The network device is, for example, a base station.

For ease of description, the following uses an example in which the method is performed by a network device and a terminal device, that is, an example in which the first communication apparatus is a network device and the second communication apparatus is a terminal device. An example in which this embodiment is applied to the network architecture shown in FIG. 2 is used. Therefore, a network device described below may be the network device in the network architecture shown in FIG. 2, and a terminal device described below may be the terminal device in the network architecture shown in FIG. 2.

S31: The network device determines first signaling, where the first signaling is used to indicate at least one periodicity, and one of the at least one periodicity is a periodicity to be used by the terminal device to detect a downlink signal.

The network device may determine the at least one periodicity that needs to be executed by the terminal device. In an optional manner, a sleep mode of the network device and the periodicity to be used by the terminal device to detect the downlink signal may be in one-to-one correspondence, so that the at least one periodicity can match at least one sleep mode. One periodicity matches one sleep mode. For example, a matching manner is that a difference between a length of the periodicity and a sleep granularity of the sleep mode is less than a first threshold. For example, the first threshold is configured by the network device, or specified in a protocol. If the first threshold is 0, the length of the periodicity is equal to the sleep granularity of the sleep mode. Alternatively, the first threshold may not be used. When one periodicity matches one sleep mode, a sleep granularity of the sleep mode is directly used as a length of the periodicity. For example, if a sleep granularity of one sleep mode is 1 ms, a corresponding periodicity determined by the network device may also be 1 ms.

The determining of the at least one periodicity herein may be determining of a length of the at least one periodicity. In the at least one periodicity, different periodicities may have different lengths, or different periodicities may have a same length. The length of the periodicity in this embodiment of this application is a time domain length of the periodicity.

For example, before entering the sleep mode, the network device may determine the at least one sleep mode that is to be entered, and may determine a corresponding periodicity based on the determined sleep mode.

A quantity of the at least one sleep mode may be 1. For example, the network device sequentially enters a plurality of sleep modes, but before entering each sleep mode, the network device determines only one sleep mode that is to be entered subsequently. In this case, the quantity of the at least one sleep mode is 1, and the quantity of the at least one periodicity is also 1. Alternatively, the quantity of the at least one sleep mode may be greater than 1. For example, the network device sequentially enters a plurality of sleep modes. Before entering the first sleep mode, the network device may determine all sleep modes that need to be entered. In this case, the quantity of the at least one sleep mode is greater than 1, and the quantity of the at least one periodicity is also greater than 1.

Alternatively, if the quantity of the at least one sleep mode is greater than 1, there may be another case in which the network device sequentially enters a plurality of sleep modes, and before entering one sleep mode, the network device may determine some sleep modes that need to be entered subsequently, but a quantity of these sleep modes is greater than 1. In this case, the quantity of the at least one sleep mode is greater than 1, and the quantity of the at least one periodicity is also greater than 1.

If the quantity of the at least one periodicity is greater than 1, an order is further involved when the terminal device executes the at least one periodicity. Therefore, the network device may further determine an order of the at least one periodicity, in other words, determine an order of detection to be performed by the terminal device based on the at least one periodicity. For example, the network device may randomly determine the order of the at least one periodicity. Alternatively, if the periodicity corresponds one-to-one to the sleep mode, the network device may determine an order of the at least one sleep mode, and the order of the at least one sleep mode may be the same as the order of the at least one corresponding periodicity. Therefore, after determining the order of the at least one sleep mode, the network device determines the order of the at least one periodicity.

The order of the at least one sleep mode reflects an order in which the network device is to enter corresponding sleep modes, that is, a sleep mode that the network device is to enter first and a sleep mode that the network device is to enter subsequently. For example, if the network device determines that the network device is to enter a sleep mode 1, a sleep mode 2, and a sleep mode 3, the network device may determine an order of the three sleep modes, that is, the network device is to first enter the sleep mode 2, then enter the sleep mode 3, and finally enter the sleep mode 1.

Figure 4A:
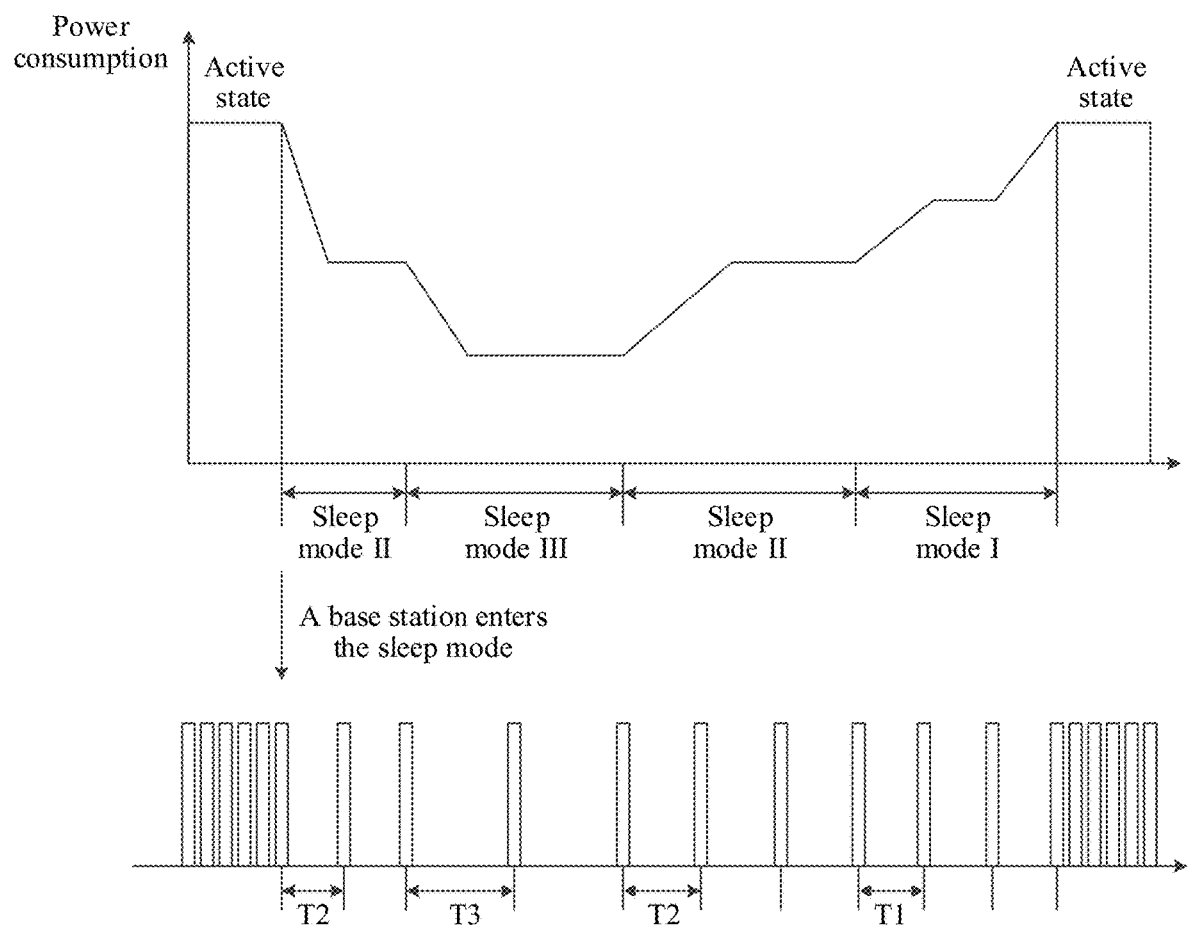
FIG. 4A, 4B, 4C, 4D, and FIG. 4F each are a schematic diagram of an order of sleep modes that is determined by a network device and an order of corresponding periodicities according to an embodiment of this application.

The order of the at least one sleep mode may be flexible; in other words, the network device may flexibly determine the order of the at least one sleep mode. For example, the at least one sleep mode determined by the network device is a sleep mode 1, a sleep mode 2, and a sleep mode 3, and the network device may execute one or more rounds of each of the three sleep modes. In this case, the three sleep modes correspond to a plurality of orders. The network device may determine any order corresponding to the three sleep modes as an actual order of the three sleep modes, and the order may be determined without being limited by any factor. For example, if the network device executes one round of the sleep mode 1, two rounds of the sleep mode 2, and one round of the sleep mode 3, an order of the three sleep modes that is determined by the network device may be the sleep mode 2-the sleep mode 3-the sleep mode 2-the sleep mode 1. Refer to FIG. 4A. Therefore, a corresponding order of the at least one periodicity may be a periodicity corresponding to the sleep mode 2-a periodicity corresponding to the sleep mode 3-the periodicity corresponding to the sleep mode 2-a periodicity corresponding to the sleep mode 1. In this case, the order of the at least one periodicity is also flexible.

Figure 4B:
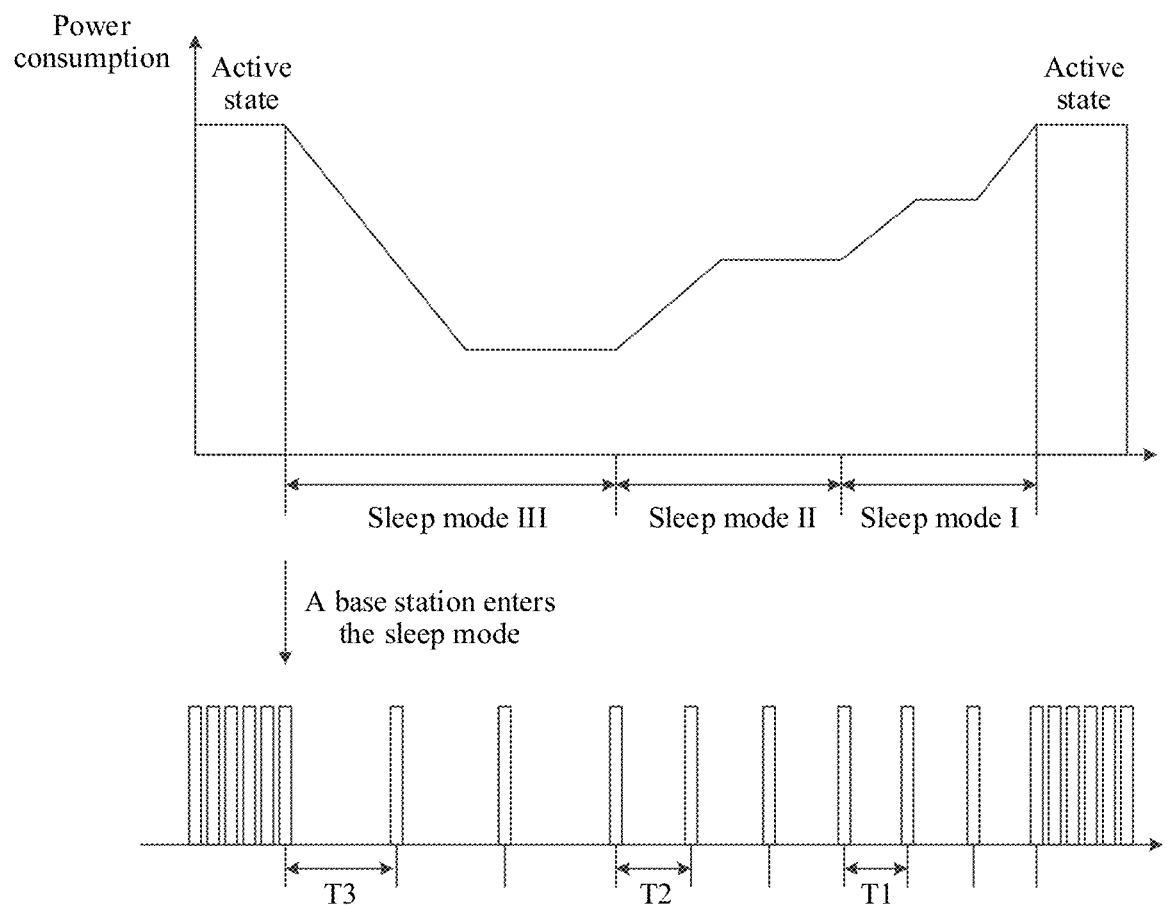

Alternatively, the network device may determine the order of the at least one sleep mode based on power consumption corresponding to the network device. For example, in the at least one sleep mode, power consumption of the network device in an earlier sleep mode is less than power consumption of the network device in a later sleep mode. For example, the at least one sleep mode determined by the network device is a sleep mode 1, a sleep mode 2, and a sleep mode 3, power consumption of the network device in the sleep mode 1 is power consumption 1, power consumption of the network device in the sleep mode 2 is power consumption 2, and power consumption of the network device in the sleep mode 3 is power consumption 3. The power consumption 1>the power consumption 2>the power consumption 3. In this case, an order of the three sleep modes that is determined by the network device may be the sleep mode 3-the sleep mode 2-the sleep mode 1. Refer to FIG. 4B. Therefore, a corresponding order of the at least one periodicity may be a periodicity corresponding to the sleep mode 3-a periodicity corresponding to the sleep mode 2-a periodicity corresponding to the sleep mode 1. This is equivalent to describing that the network device experiences "deep to light" sleep. The manner in which the network device experiences "deep to light" sleep is the most energy-saving sleep manner.

In this case, it is also equivalent to describing that the network device determines the order of the at least one periodicity based on the power consumption corresponding to the network device. If the network device determines the order of the at least one periodicity based on the power consumption of the network device, for example, in the at least one periodicity, a length of an earlier periodicity may be greater than a length of a later periodicity. If the periodicity corresponds one-to-one to the sleep mode, it may also be understood that power consumption of the network device in a sleep mode corresponding to an earlier periodicity is less than power consumption of the network device in a sleep mode corresponding to a later periodicity.

Alternatively, the network device may determine the order of the at least one sleep mode based on wake-up duration corresponding to the network device. For example, in the at least one sleep mode, wake-up duration of the network device in an earlier sleep mode is greater than wake-up duration of the network device in a later sleep mode. For example, the at least one sleep mode determined by the network device is a sleep mode 1, a sleep mode 2, and a sleep mode 3, wake-up duration of the network device in the sleep mode 1 is wake-up duration 1, wake-up duration of the network device in the sleep mode 2 is wake-up duration 2, and wake-up duration of the network device in the sleep mode 3 is wake-up duration 3. The wake-up duration 1<the wake-up duration 2<the wake-up duration 3. In this case, an order of the three sleep modes that is determined by the network device may be the sleep mode 3-the sleep mode 2-the sleep mode 1. Refer to FIG. 4B. Therefore, a corresponding order of the at least one periodicity may be a periodicity corresponding to the sleep mode 3-a periodicity corresponding to the sleep mode 2-a periodicity corresponding to the sleep mode 1. This is equivalent to describing that the network device sleeps in descending order of wake-up duration. That the network device sleeps in descending order of wake-up duration is a sleep manner that can minimize a wake-up delay.

In this case, it is also equivalent to describing that the network device determines the order of the at least one periodicity based on the wake-up duration corresponding to the network device. If the network device determines the order of the at least one periodicity based on the wake-up duration of the network device, for example, in the at least one periodicity, a length of an earlier periodicity may be greater than a length of a later periodicity. If the periodicity corresponds one-to-one to the sleep mode, it may also be understood that wake-up duration of the network device in a sleep mode corresponding to an earlier periodicity is greater than wake-up duration of the network device in a sleep mode corresponding to a later periodicity.

Alternatively, the network device may determine the order of the at least one sleep mode based on a hardware condition of the network device.

Figure 4C:
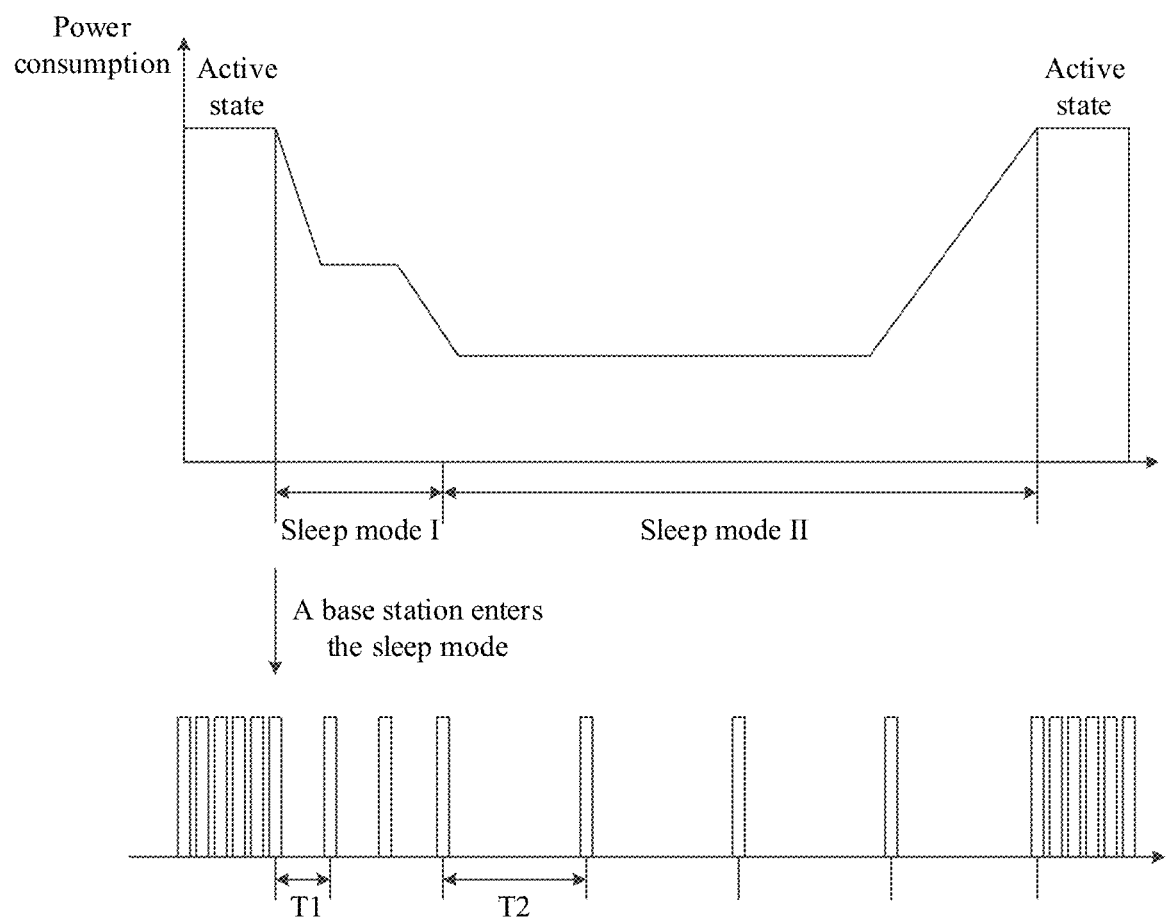

For example, if hardware of the network device cannot support the network device in directly entering a sleep mode, the network device may first enter another sleep mode, and then enter the sleep mode from the another sleep mode. For example, the at least one sleep mode determined by the network device is a sleep mode 1 and a sleep mode 2, and the network device cannot support direct entering of the sleep mode 2, but can support direct entering of the sleep mode 1. Therefore, the network device determines to enter the sleep mode 1 first and then enter the sleep mode 2, that is, an order of the two sleep modes that is determined by the network device may be the sleep mode 1-the sleep mode 2, as shown in FIG. 4C. Therefore, a corresponding order of the at least one periodicity may be a periodicity corresponding to the sleep mode 1-a periodicity corresponding to the sleep mode 2.

Figure 4D:
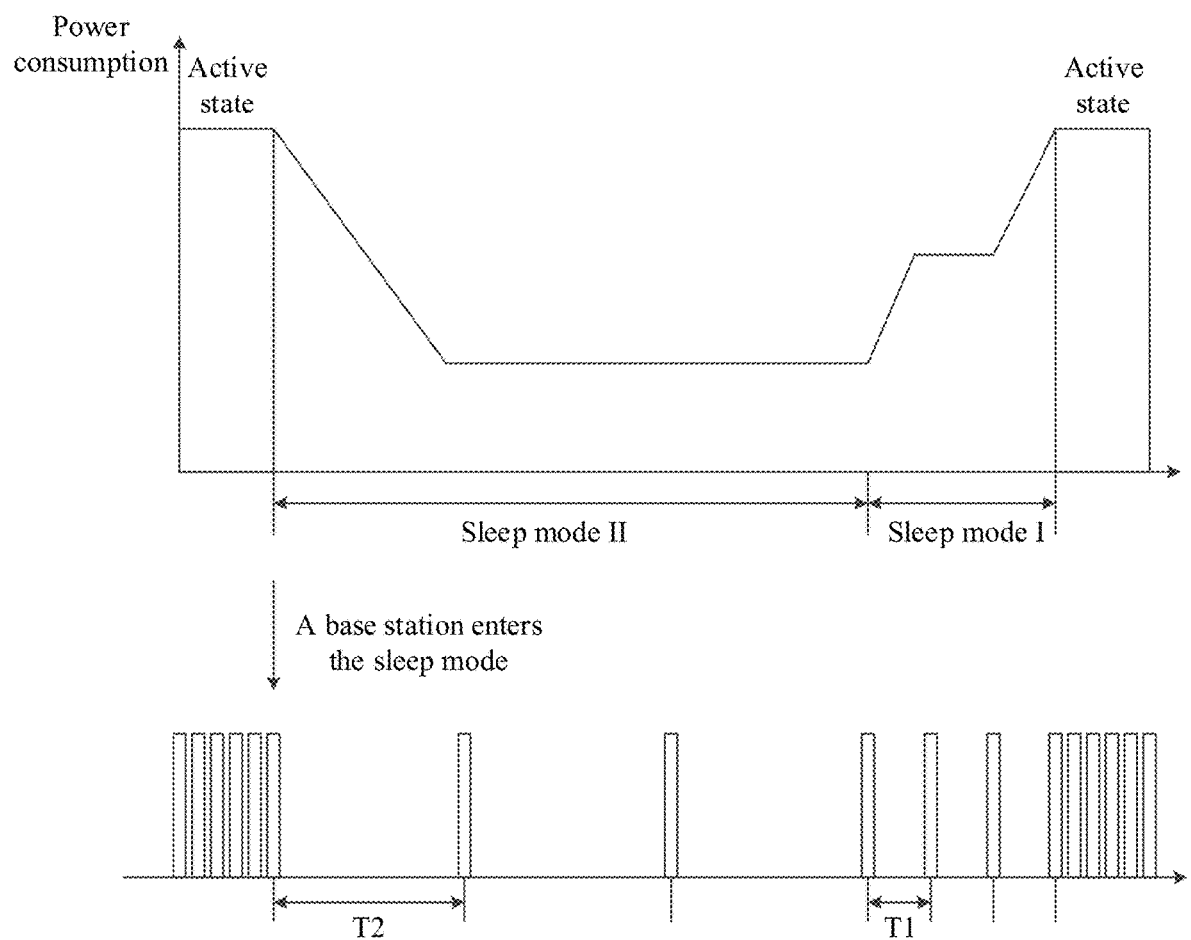

For another example, if hardware of the network device cannot support the network device in directly returning to an active state from a sleep mode, the network device may return to the active state from another sleep mode. For example, if the at least one sleep mode determined by the network device is a sleep mode 1 and a sleep mode 2, and the network device cannot support returning to the active state from the sleep mode 2, but can support returning to the active state from the sleep mode 1, an order of the two sleep modes that may be determined by the network device may be the sleep mode 2-the sleep mode 1, as shown in FIG. 4D. Therefore, a corresponding order of the at least one periodicity may be a periodicity corresponding to the sleep mode 2-a periodicity corresponding to the sleep mode 1.

In this case, it is also equivalent to describing that the network device determines the order of the at least one periodicity based on the hardware condition of the network device. If the network device determines the order of the at least one periodicity based on the hardware condition of the network device, for example, if the hardware of the network device does not support direct entering of along periodicity, the network device may place a shorter periodicity earlier. In this case, in the at least one periodicity, a length of an earlier periodicity may be less than a length of a later periodicity. For another example, if the hardware of the network device does not support the network device in directly exiting from a long periodicity, the network device may place a long periodicity before a short periodicity. In this case, in the at least one periodicity, a length of an earlier periodicity may be greater than a length of a later periodicity.

Certainly, in addition to the foregoing several manners, the network device may determine the order of the at least one sleep mode in another manner, which is equivalent to determining the order of the at least one periodicity in another manner. This is not limited in this embodiment of this application.

Alternatively, the network device may obtain a plurality of periodicity sets, and each of the plurality of periodicity sets may include one periodicity or an order combination of a plurality of periodicities. For example, the network device may set the plurality of periodicity sets, or the plurality of periodicity sets may be specified in a protocol. For example, the plurality of periodicity sets include a periodicity set 1, a periodicity set 2, and a periodicity set 3. The periodicity set 1 includes a periodicity 2-a periodicity 3, and includes a quantity n2 of times of detection to be performed based on the periodicity 2 and a quantity n3 of times of detection to be performed based on the periodicity 3. This indicates that the periodicity set 1 includes two periodicities: the periodicity 2 and the periodicity 3, and includes an order of the two periodicities and the quantities of times of detection to be performed based on the two periodicities. The periodicity set 2 includes the periodicity 3-the periodicity 2-a periodicity 1, and includes the quantity n3 of times of detection to be performed based on the periodicity 3, the quantity n2 of times of detection to be performed based on the periodicity 2, and a quantity n1 of times of detection to be performed based on the periodicity 1. This indicates that the periodicity set 2 includes three periodicities: the periodicity 1, the periodicity 2, and the periodicity 3, and includes an order of the three periodicities and the quantities of times of detection to be performed based on the three periodicities. The periodicity set 3 includes the periodicity 1-the periodicity 2, and includes the quantity n1 of times of detection to be performed based on the periodicity 1 and the quantity n2 of times of detection to be performed based on the periodicity 2. This indicates that the periodicity set 3 includes two periodicities: the periodicity 1 and the periodicity 2, and includes an order of the two periodicities and the quantities of times of detection to be performed based on the two periodicities. The quantity of times of periodicity-based detection is to be described in the next step.

In this case, if the network device needs to determine the at least one periodicity, the network device may directly determine one periodicity set from the plurality of periodicity sets. Determining the periodicity set is determining the at least one periodicity. For example, if the network device determines a first periodicity set, the first periodicity set may correspond to the at least one periodicity, or the first periodicity set may correspond to an order combination of the at least one periodicity. For example, the network device randomly determines the first periodicity set. For example, the network device may flexibly determine the least one periodicity, and may flexibly determine the order of the at least one periodicity, so that the network device can randomly determine the first periodicity set. Alternatively, the network device may determine the first periodicity set according to a "deep-to-light" principle. For example, the network device may determine the order of the at least one periodicity according to the "deep-to-light" principle, and then may determine the first periodicity set based on the order of the at least one periodicity. Alternatively, the network device may determine the first periodicity set based on a hardware condition of the network device. For example, the network device may determine the order of the at least one periodicity based on the hardware condition of the network device, and then may determine the first periodicity set based on the order of the at least one periodicity. Alternatively, the network device may determine the first periodicity set based on wake-up duration of the network device. For example, the network device may determine the order of the at least one periodicity based on the wake-up duration of the network device, and then may determine the first periodicity set based on the order of the at least one periodicity.

For example, the periodicity corresponds one-to-one to the sleep mode. In this case, the network device may further obtain a plurality of sleep mode sets (which may also be referred to as sleep patterns (patterns) or the like), and the sleep mode sets correspond one-to-one to the periodicity sets. The network device determines one sleep mode set from the plurality of sleep mode sets, that is, determines a corresponding periodicity set.

For example, each of the plurality of sleep mode sets may include one sleep mode or an order combination of a plurality of sleep modes. For example, the network device may set the plurality of sleep mode sets, or the plurality of sleep mode sets may be specified in a protocol. For example, the plurality of sleep mode sets include a sleep mode set 1, a sleep mode set 2, and a sleep mode set 3. The sleep mode set 1 includes a sleep mode 2-a sleep mode 3, and includes a quantity n2 of repetitions of the sleep mode 2 and a quantity n3 of repetitions of the sleep mode 3. This indicates that the sleep mode set 1 includes two sleep modes: the sleep mode 2 and the sleep mode 3, and includes an order of the two sleep modes and the quantities of repetitions of the two sleep modes. The sleep mode set 2 includes the sleep mode 3-the sleep mode 2-a sleep mode 1, and includes the quantity n3 of repetitions of the sleep mode 3, the quantity n2 of repetitions of the sleep mode 2, and a quantity n1 of repetitions of the sleep mode 1. This indicates that the sleep mode set 1 includes three sleep modes: the sleep mode 1, the sleep mode 2, and the sleep mode 3, and includes an order of the three sleep modes and the quantities of repetitions of the three sleep modes. The sleep mode set 3 includes the sleep mode 1-the sleep mode 2, and includes the quantity n1 of repetitions of the sleep mode 1 and the quantity n2 of repetitions of the sleep mode 2. This indicates that the sleep mode set 3 includes two sleep modes: the sleep mode 1 and the sleep mode 2, and includes an order of the two sleep modes and the quantities of repetitions of the two sleep modes. The quantity of repetitions of the sleep mode is also to be described in the next step.

In this case, if the network device needs to determine the at least one sleep mode that is to be entered, the network device may directly determine one sleep mode set from the plurality of sleep mode sets. Determining the sleep mode set is determining the at least one sleep mode. For example, if the network device determines a first sleep mode set, the first sleep mode set may correspond to the at least one sleep mode, or the first sleep mode set may correspond to an order combination of the at least one sleep mode. The first sleep mode set also corresponds to the first periodicity set. Therefore, after determining the first sleep mode set, the network device determines the first periodicity set. For example, the network device randomly determines the first sleep mode set. For example, the network device may flexibly determine the at least one sleep mode, and may flexibly determine the order of the at least one sleep mode, so that the network device can randomly determine the first sleep mode set. Alternatively, the network device may determine the first sleep mode set according to a "deep-to-light" principle. For example, the network device may determine the order of the at least one sleep mode according to the "deep-to-light" principle, and then may determine the first sleep mode set based on the order of the at least one sleep mode. Alternatively, the network device may determine the first sleep mode set based on a hardware condition of the network device. For example, the network device may determine the order of the at least one sleep mode based on the hardware condition of the network device, and then may determine the first sleep mode set based on the order of the at least one sleep mode. Alternatively, the network device may determine the first sleep mode set based on wake-up duration of the network device. For example, the network device may determine the order of the at least one sleep mode based on the wake-up duration of the network device, and then may determine the first sleep mode set based on the order of the at least one sleep mode.

In addition, it can be learned from the foregoing Table 1 that, for the sleep mode, there may be corresponding deactivation duration and activation duration. Deactivation duration of one sleep mode is duration required for the network device to enter the sleep mode from the active state. Activation duration of one sleep mode is duration required for the network device to enter the active state from the sleep mode. Switching duration required for the network device to switch from one sleep mode (for example, a sleep mode A) to another sleep mode (for example, a sleep mode B), is related to one or more of activation duration of the sleep mode A, deactivation duration of the sleep mode B, deactivation duration of the sleep mode A, or activation duration of the sleep mode B.

In activation duration or deactivation duration of one sleep mode, or switching duration for switching from one sleep mode to another sleep mode, the network device usually sends no downlink signal. Therefore, the terminal device may not need to detect the downlink signal, or the terminal device may continue to detect the downlink signal based on an original periodicity. After deactivation duration of one sleep mode or switching duration for switching from another sleep mode to the sleep mode ends, the network device really enters the sleep mode, and the network device sleeps. In this case, the terminal device may change the original periodicity of the terminal device based on the at least one periodicity.

The at least one periodicity may correspond to one or more offsets, and a quantity of offsets corresponding to the at least one periodicity may be equal to or not equal to the quantity of the at least one periodicity.

Figure 4E:
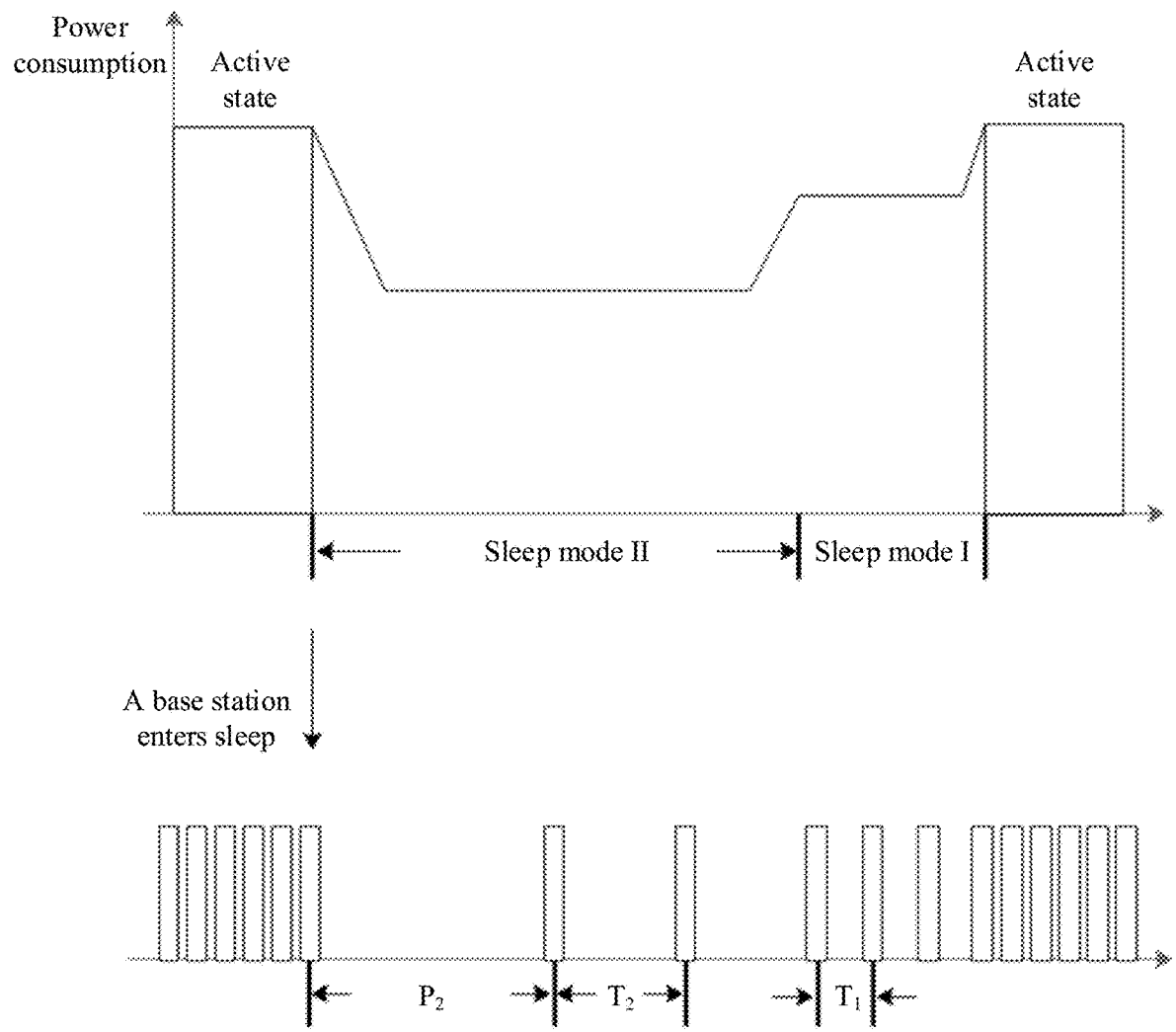
Figure 4F:
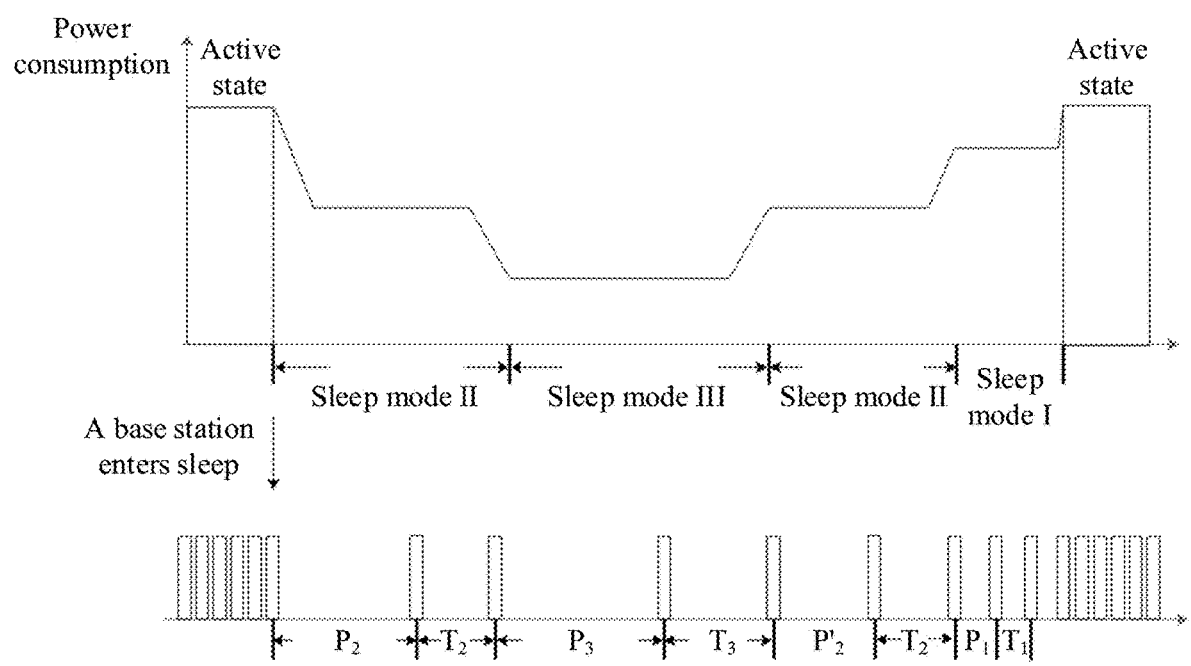

In addition to indicating the at least one periodicity to the terminal device, the network device may further indicate, to the terminal device, the one or more offsets corresponding to the at least one periodicity. The one or more offsets may assist the terminal device in performing detection. For example, the network device may indicate an offset to the terminal device. As shown in FIG. 4E, the network device indicates to the terminal device that the at least one periodicity is a periodicity 2 ($T_2$) and a periodicity 1 ($T_1$), the order of the at least one periodicity is $T_2$-$T_1$, quantities of times of detection corresponding to the at least one periodicity are n2-n1, and the offset is $P_2$. Alternatively, the network device may indicate a plurality of offsets to the terminal device. As shown in FIG. 4F, the network device indicates to the terminal device that the at least one periodicity includes a periodicity 1 ($T_1$), a periodicity 2 ($T_2$), and a periodicity 3 ($T_3$), the order of the at least one periodicity is $T_2$-$T_3$-$T_2$-$T_1$, quantities of times of detection corresponding to the at least one periodicity is n2-n3-n'2-n1, and the plurality of offsets are $P_2$-$P_3$-$P'2$-$P_1$.

For example, the network device may indicate the one or more offsets to the terminal device by using the first signaling, and the terminal device may determine the one or more offsets after receiving the first signaling. Alternatively, the network device may indicate the one or more offsets to the terminal device by using other signaling.

Alternatively, in another case, if the offset corresponding to the at least one periodicity is very short and may be ignored, the network device may not need to indicate the offset corresponding to the at least one periodicity. For example, hardware devices of some vendors have good performance, so that deactivation duration when the network device enters a sleep mode is short, activation duration when the network device exits from a sleep mode is also short, and switching duration for switching from one sleep mode to another sleep mode is also short. This does not affect the downlink signal detection performed by the terminal device. In this case, the network device may not need to indicate the offset corresponding to the at least one periodicity.

Optionally, if the quantity of the at least one periodicity is 1, an indication manner in which the first signaling indicates the at least one periodicity is that the first signaling indicates first duration, and the first duration is related to one of the at least one periodicity. If the quantity of the at least one periodicity is 1, one of the at least one periodicity is the periodicity. For example, the periodicity is referred to as a fourth periodicity. For example, the first duration is total duration in which the terminal device is to perform detection based on the periodicity corresponding to the first duration. For example, if the periodicity matches the sleep mode, the first duration may be total duration in which the network device is in the sleep mode. When the network device is in the sleep mode, the terminal device performs detection based on the periodicity corresponding to the first duration. Therefore, the first duration may also be considered as total duration in which the terminal device is to perform detection based on the periodicity.

The terminal device may determine the fourth periodicity based on the first duration. For example, the terminal device may determine the fourth periodicity based on the first duration and at least one threshold. The at least one threshold may be included in the first signaling, the network device configures the at least one threshold for the terminal device in advance, the at least one threshold may be preconfigured in the terminal device, or the at least one threshold is specified in a protocol. The terminal device may select a periodicity from a first set based on the first duration, and the periodicity is the fourth periodicity. The first set may include one or more periodicities. The first set may be specified in a protocol, the network device configures the first set for the terminal device in advance, the first set may be preconfigured in the terminal device, or the first set may be indicated by using the first signaling. Optionally, the periodicity in the first set may match the sleep granularity of the network device. It should be noted that the first set described herein and the periodicity set described above have different concepts. The first set herein includes the one or more periodicities, and there is no order relationship between the periodicities included in the first set. The terminal device may select, based on the first duration, one periodicity from the one or more periodicities for execution.

After receiving the first signaling, the terminal device may select, based on the first duration and the at least one threshold that are indicated by the first signaling, a periodicity from the first set as a periodicity to be used by the terminal device to detect the downlink signal (that is, select the fourth periodicity), and then the terminal device detects the downlink signal based on the selected periodicity. For example, the at least one threshold may constitute one or more threshold ranges, and each threshold range may correspond to one periodicity. If the terminal device determines a threshold range to which the first duration belongs, a periodicity corresponding to the threshold range is the periodicity corresponding to the first duration, and the terminal device may determine to detect the downlink signal based on the periodicity. In addition, if the first duration is the total duration in which the network device is in the sleep mode, and the terminal device selects the corresponding periodicity, the terminal device may determine, based on the first duration and a length of the periodicity, a quantity of times of detection to be performed based on the periodicity. Therefore, if the first signaling indicates the first duration, the first signaling may not need to indicate the quantity of times of detection to be performed based on the periodicity.

For example, the at least one threshold may include two thresholds, which are respectively Th1 and Th2, where Th1<Th2. The first set includes a periodicity A, a periodicity B, and a periodicity C, and a value of the first duration is Z. A threshold range (0, Th1) corresponds to the periodicity A, a threshold range [Th1, Th2] corresponds to the periodicity B, and a threshold range (Th2, +∞) corresponds to the periodicity C. If 0<Z<Th1, the terminal device may select the periodicity A from the first set. If Th1≤Z<Th2, the terminal device may select the periodicity B from the first set. If Z≥Th2, the terminal device may select the periodicity C from the first set. The terminal device may detect the downlink signal based on the selected periodicity.

It can be learned from the foregoing descriptions that the value of the first duration may be related to a value of the periodicity, and the value of the periodicity may be a length of the periodicity. For example, the at least one threshold includes two thresholds Th1 and Th2, where Th1<Th2. It is assumed that X and Y are two positive numbers. If the value of the first duration is X, the first duration corresponds to the periodicity A. If the value of the first duration is Y, the first duration corresponds to the periodicity B. If X is not equal to Y, A is not equal to B. For example, if 0<X<Th1 and Th1≤Y<Th2, that is, X is not equal to Y, A≠B. In other words, the value of the first duration may be related to the value of the periodicity. If two possible values X and Y of the first duration are not equal, two possible values of the corresponding periodicities are not equal either.

Optionally, the value of the first duration may be in direct proportion to the value of the periodicity. For example, the at least one threshold may include two thresholds Th1 and Th2, where Th1<Th2. It is assumed that X and Y are two positive numbers. If the value of the first duration is X, a corresponding periodicity is the periodicity A. If the value of the first duration is Y, a corresponding periodicity is the periodicity B. If X is less than Y, A is less than B. For example, if 0<X<Th1 and Th1≤Y<Th2, that is, X<Y, A is less than B, that is, the value of the first duration may be in direct proportion to the value of the periodicity.

S32: The network device sends the first signaling, and the terminal device receives the first signaling from the network device.

After determining the at least one periodicity, the network device may send the first signaling, where the first signaling may indicate the at least one periodicity. If the network device directly determines the at least one periodicity, the first signaling may indicate the at least one periodicity. For example, the first signaling may include the at least one periodicity, or the first signaling may include the length of the at least one periodicity. For example, the first signaling includes a length of each of the at least one periodicity. Alternatively, if the network device determines the first periodicity set, the first signaling may include the at least one periodicity, the first signaling may include the length of the at least one periodicity, or may include an identifier of the first periodicity set. The identifier of the first periodicity set may indicate the first periodicity set, and the first periodicity set includes the order combination of the at least one periodicity. Therefore, the identifier of the first periodicity set may also indicate the at least one periodicity. For example, the identifier of the first periodicity set includes a number or an identity (ID) of the first periodicity set.

In a manner in which the first signaling indicates the at least one periodicity, the first signaling may include the at least one periodicity. Alternatively, if the quantity of the at least one periodicity is 1, in another manner in which the first signaling indicates the at least one periodicity, the first signaling may indicate the first duration, and the first duration may indicate the corresponding periodicity.

If the network device configures the plurality of periodicity sets for the terminal device in advance, the plurality of periodicity sets may be preconfigured in the terminal device, or the plurality of periodicity sets are specified in a protocol, the first signaling may include the identifier of the first periodicity set. In this way, signaling overheads can be reduced. Alternatively, if the plurality of periodicity sets are not configured for the terminal device in advance, the first signaling may still include the at least one periodicity, so that the terminal device does not need to sense the periodicity set, and implementation of the terminal device is simplified. If the network device configures the plurality of periodicity sets for the terminal device, for example, the network device may send third signaling, where the third signaling is used to indicate the plurality of periodicity sets. After receiving the third signaling from the network device, the terminal device may determine the plurality of periodicity sets. The third signaling may be unicast signaling, multicast signaling, or broadcast signaling. This is not specifically limited.

If the network device configures the at least one threshold for the terminal device, for example, the network device may send fifth signaling, where the fifth signaling is used to indicate the at least one threshold. After receiving the fifth signaling from the network device, the terminal device may determine the at least one threshold. The fifth signaling may be unicast signaling, multicast signaling, or broadcast signaling. This is not specifically limited. Alternatively, the network device may configure the at least one threshold for the terminal device by using the first signaling.

If the network device configures the first set for the terminal device, for example, the network device may send sixth signaling, where the sixth signaling is used to indicate the first set. After receiving the sixth signaling from the network device, the terminal device may determine the first set. The sixth signaling may be unicast signaling, multicast signaling, or broadcast signaling. This is not specifically limited. Alternatively, the network device may configure the first set for the terminal device by using the first signaling.

The first signaling may be unicast signaling, multicast signaling, or broadcast signaling. For example, if the first signaling is the unicast signaling, the first signaling may be specific to only one terminal device. For example, the network device may send the first signaling only to a terminal device that needs to reduce power consumption, and does not need to send the first signaling to a plurality of terminal devices covered by the network device, so that the first signaling is more targeted. Alternatively, if the first signaling is the multicast signaling, the first signaling may be UE group signaling, and may be specific to a plurality of terminal devices. In this case, the plurality of terminal devices may all use the at least one periodicity to detect downlink signals. Alternatively, the first signaling is the broadcast signaling. For example, for a cell, the at least one periodicity may be used to detect a downlink signal, and the network device may indicate the at least one periodicity by using the broadcast signaling. If the first signaling is the multicast signaling or the broadcast signaling, the signaling overheads can be reduced to some extent.

If the first signaling is the unicast signaling or the multicast signaling, the first signaling may be RRC signaling, or may be signaling, for example, downlink control information (downlink control information, DCI), carried on a PDCCH. If the first signaling is the broadcast signaling, the first signaling may be a system message, for example, a master information block (master information block, MIB) or a system information block (system information block, SIB). If the first signaling is the RRC signaling, the network device may send the first signaling in a semi-static manner, to improve signaling reliability. If the first signaling is the signaling carried on the PDCCH, the network device may dynamically send the first signaling, so that duration for notifying the terminal device by the network device can be reduced, and the network device can quickly enter a sleep mode.

As described in S31, if the quantity of the at least one periodicity is greater than 1, there is a corresponding order when the terminal device performs detection based on the at least one periodicity or when the terminal device executes the at least one periodicity. Optionally, if the quantity of the at least one periodicity is greater than 1, the first signaling may further indicate the order of the at least one periodicity, or indicate the order in which the terminal device is to perform detection based on the at least one periodicity. This is equivalent to indicating the order of the at least one periodicity in an explicit manner. If the at least one periodicity matches the at least one sleep mode, the order of the at least one periodicity may be the same as the order of the at least one corresponding sleep mode, so that the terminal device can detect the downlink signal based on the periodicity matching the sleep mode of the network device.

Alternatively, the first signaling may indicate the at least one periodicity, but does not indicate the order of the at least one periodicity. The order of the at least one periodicity may be predefined, or may be determined in an implicit manner. For example, the network device and the terminal device consider by default that the network device preferentially enters a sleep mode having low sleep power consumption. For example, lower power consumption of a sleep mode indicates a longer corresponding periodicity. In other words, both the network device and the terminal device consider by default that a long periodicity precedes a short periodicity. In this way, the first signaling does not need to include the order of the at least one periodicity. After receiving the first signaling, the terminal device performs periodicity-based detection in an implicit manner in which the terminal device preferentially performs detection based on a longer periodicity.

For another example, the hardware of the network device cannot support the network device in directly entering a sleep mode. For example, if the network device needs to enter a sleep mode II, the network device needs to first enter a sleep mode I for transition before entering the sleep mode II, and the terminal device also knows this. In this case, the network device and the terminal device consider by default that a periodicity corresponding to the sleep mode I precedes a periodicity corresponding to the sleep mode II. If the first signaling includes the periodicity corresponding to the sleep mode II and the periodicity corresponding to the sleep mode I, the first signaling may not include an order of the two periodicities. After receiving the first signaling, the terminal device performs detection in a manner of performing detection based on the periodicity corresponding to the sleep mode I first and then the periodicity corresponding to the sleep mode II. Alternatively, if the first signaling includes the periodicity corresponding to the sleep mode II, but does not include the periodicity corresponding to the sleep mode I used for transition, the network device and the terminal device consider by default that before entering the sleep mode II, the network device still first enters the sleep mode I for transition and then enters the sleep mode II. When the network device enters the sleep mode I for transition, a quantity n1 of times of detection to be performed based on the periodicity corresponding to the sleep mode I may be a predefined value. After receiving the first signaling, the terminal device performs periodicity-based detection in an implicit manner of first performing detection based on the periodicity corresponding to the sleep mode I for the quantity n1 of times and then performing detection based on the periodicity corresponding to the sleep mode II.

For still another example, the hardware of the network device cannot support the network device in directly returning to the active state from a sleep mode. For example, the network device cannot directly return to the active state from a sleep mode II, and needs to first enter a sleep mode I for transition before entering the active state, and the terminal device also knows this. In this case, the network device and the terminal device may consider by default that a periodicity corresponding to the sleep mode II precedes a periodicity corresponding to the sleep mode I. If the first signaling includes the periodicity corresponding to the sleep mode II and the periodicity corresponding to the sleep mode L, the first signaling may not include an order of the two periodicities. After receiving the first signaling, the terminal device performs detection in a manner of performing detection based on the periodicity corresponding to the sleep mode II first and then the periodicity corresponding to the sleep mode I. Alternatively, if the first signaling includes the periodicity corresponding to the sleep mode II, but does not include the periodicity corresponding to the sleep mode I used for transition, the network device and the terminal device may consider by default that before returning to the active state from the sleep mode II, the network device still first enters the sleep mode I for transition and then returns to the active state. When the network device enters the sleep mode I for transition, a quantity n1 of times of detection to be performed based on the periodicity corresponding to the sleep mode I may be a predefined value. After receiving the first signaling, the terminal device performs detection in a manner of performing detection based on the periodicity corresponding to the sleep mode II first and then the periodicity corresponding to the sleep mode I.

When the network device executes the at least one sleep mode, the network device may execute one or more rounds of each sleep mode, and when executing one round of a sleep mode, the network device may execute the sleep mode for one or more times. For example, the at least one sleep mode determined by the network device includes a sleep mode 1, a sleep mode 2, and a sleep mode 3, and an order of the three sleep modes that is determined by the network device is the sleep mode 2-the sleep mode 3-the sleep mode 2-the sleep mode 1, that is, the network device executes one round of the sleep mode 1, one round of the sleep mode 3, and two rounds of the sleep mode 2. For example, when the network device executes the first round of the sleep mode 2, a quantity of repetitions corresponding to the sleep mode 2 is 2, indicating that the network device executes the sleep mode 2 twice. When the network device executes the sleep mode 3, a quantity of repetitions corresponding to the sleep mode 3 is 2, indicating that the network device executes the sleep mode 3 twice. When the network device executes the second round of the sleep mode 2, a quantity of repetitions corresponding to the sleep mode 2 is 3, indicating that the network device executes the sleep mode 2 for three times. When the network device executes the sleep mode 1, a quantity of repetitions corresponding to the sleep mode 1 is 3, indicating that the network device executes the sleep mode 1 for three times. Still refer to FIG. 4A. T2 represents a periodicity corresponding to the sleep mode 2, T3 represents a periodicity corresponding to the sleep mode 3, and T1 represents a periodicity corresponding to the sleep mode 1.

It can be learned that for one sleep mode, if the network device repeatedly executes the sleep mode, a periodicity of the terminal device is correspondingly repeated; in other words, the terminal device correspondingly repeatedly detects the downlink signal. However, a quantity of times of repeatedly performing the sleep mode by the network device may be the same as or different from a quantity of times of detecting the downlink signal by the terminal device. For the sleep mode, if the network device repeatedly executes the sleep mode for a plurality of times, the quantity of times may be referred to as a quantity of repetitions of the sleep mode, a quantity of cycles of the sleep mode, or the like. On a terminal device side, the terminal device needs to perform detection for a plurality of times based on a periodicity. For example, in an optional implementation, the first signaling may further indicate a quantity of times of detection to be performed by the terminal device based on the at least one periodicity, indicate a quantity of times that the terminal device is to execute the at least one periodicity, indicate a quantity of repetitions (or a quantity of cycles) of the at least one periodicity, or the like. Herein, a quantity of times of detection to be performed by the terminal device based on one periodicity means that an interval between two adjacent detection times satisfies the periodicity, or indicates a quantity of times that the terminal device is to execute the periodicity, instead of indicating a quantity of times that the terminal device is to detect the downlink signal within the periodicity. For example, in FIG. 4A, the network device executes the sleep mode 3 twice. Correspondingly, on the terminal device side, a periodicity (for example, the periodicity corresponding to the sleep mode 3) indicated by the network device is T3. It can be learned that the terminal device also needs to perform detection twice based on T3; in other words, T3 is repeated twice.

In addition, for FIG. 4B, FIG. 4C, and FIG. 4D, meanings of T1, T2, T3, and the like are the same as those in FIG. 4A.

If the periodicity corresponds one-to-one to the sleep mode, a quantity of times of detection to be performed by the terminal device based on a periodicity (also referred to as a quantity of detection times of the periodicity for short) is related to a quantity of repetitions of the sleep mode matching the periodicity. For example, the two may be equal, or certainly may not be equal. For example, when the two are equal, Length of the periodicity×Quantity of times of detection to be performed by the terminal device based on the periodicity (or the quantity of repetitions of the sleep mode corresponding to the periodicity) is equal to total duration in which the terminal device is to detect the downlink signal based on the periodicity. Sleep granularity×Quantity of repetitions of the sleep mode is equal to total sleep duration of the network device in the sleep mode. If the periodicity corresponds one-to-one to the sleep mode, a length of the periodicity may be equal to a sleep granularity of the sleep mode, and a quantity of times of detection to be performed by the terminal device based on a periodicity may be equal to a quantity of repetitions of a sleep mode corresponding to the periodicity.

If the first signaling further indicates the quantity of times of detection to be performed by the terminal device based on the at least one periodicity, the first signaling may also perform indication based on an order of detection to be performed by the terminal device based on the at least one periodicity. For example, the at least one periodicity includes a periodicity 1, a periodicity 2, and a periodicity 3, and an order of the three periodicities is the periodicity 2-the periodicity 3-the periodicity 2-the periodicity 1. The first signaling may indicate that quantities of times of detection corresponding to the order are 2-2-4-3. In this way, the terminal device may determine, based on the first signaling, the quantity of times of detection to be performed based on each periodicity.

In an optional implementation, if the network device configures, for each of the at least one periodicity, that the terminal device is to perform detection only once, the first signaling may not indicate the quantity of times of detection to be performed by the terminal device based on the at least one periodicity; or for each of the at least one periodicity, a fixed quantity of times of detection is specified. For example, the network device may configure the fixed quantity of times of detection in advance, or may specify the fixed quantity of times of detection in a protocol. In this case, the first signaling may not need to indicate the quantity of times of detection to be performed by the terminal device based on the at least one periodicity.

However, it should be noted that, if the quantity of the at least one periodicity is greater than 1, in the at least one periodicity, lengths of different periodicities may be different, or lengths of two or more periodicities may be the same. If two periodicities have a same length, for ease of description, the two periodicities may still be considered as different periodicities. The quantities of times of detection corresponding to the two periodicities may be the same or may be different.

For example, the network device executes two rounds of the sleep mode 2, and quantities of repetitions corresponding to the two rounds of the sleep mode 2 are different. For example, a quantity of repetitions of the sleep mode 2 in the first round is 2, and a quantity of repetitions of sleep mode 2 in the second round is 4. It is also considered that a periodicity corresponding to the first round of the sleep mode 2 is the periodicity 1, and a periodicity corresponding to the second round of the sleep mode 2 is the periodicity 2. However, a length of the periodicity 1 is the same as a length of the periodicity 2.

If the first signaling further indicates one offset, for example, in FIG. 4E, the first signaling indicates the at least one periodicity and one offset, the terminal device may perform detection based on the offset and the at least one periodicity.

Alternatively, if the first signaling further indicates a plurality of offsets, the terminal device may perform detection based on the plurality of offsets and the at least one periodicity. For example, as shown in FIG. 4F, the at least one periodicity includes a periodicity 1, a periodicity 2, and a periodicity 3, and an order of the three periodicities is the periodicity 2-the periodicity 3-the periodicity 2-the periodicity 1. The first signaling may indicate that offsets corresponding to the order is 2 ms-2.5 ms-1 ms-0.5 ms. For example, the terminal device needs to experience the offset of 2 ms before executing the periodicity 2, the terminal device needs to experience the offset of 2.5 ms after executing the periodicity 2 and before executing the periodicity 3, and the rest can be deduced by analogy.

The network device may indicate, by using the first signaling, all periodicities that need to be executed by the terminal device, and the at least one periodicity includes all the periodicities that need to be executed by the terminal device. Alternatively, the network device may indicate, by using the first signaling, a part of periodicities that need to be executed by the terminal device, and the at least one periodicity includes only the part of periodicities that need to be executed by the terminal device.

For example, the periodicity corresponds one-to-one to the sleep mode. For example, the network device sequentially enters a plurality of sleep modes, but before entering each sleep mode, the network device determines only a part of the sleep modes that are to be entered subsequently. In this case, the at least one sleep mode in S31 is only a part of the sleep modes to be executed by the network device, but not all the sleep modes to be executed by the network device. The at least one periodicity indicated in S32 is a part of periodicities that the terminal device needs to execute. Alternatively, the network device sequentially enters a plurality of sleep modes. Before entering the sleep mode, the network device still determines all the sleep modes to be executed. However, when sending the first signaling to the terminal device, the network device indicates only periodicities corresponding to a part of the sleep modes that are to be entered subsequently. In this case, the at least one sleep mode in S31 is also only a part of the sleep modes to be executed by the network device, but not all the sleep modes to be executed by the network device. The at least one periodicity indicated in S32 is a part of periodicities that the terminal device needs to execute.

If the terminal device needs to sequentially execute a plurality of periodicities, and the first signaling indicates only a part of periodicities that are to be executed subsequently; in other words, the at least one periodicity is only a part of periodicities that are to be executed by the terminal device. The network device may further send second signaling to the terminal device. For example, the terminal device may receive the second signaling when execution of the at least one periodicity is completed or before the execution of the at least one periodicity is completed, where the second signaling may indicate one or more periodicities, and the one or more periodicities sequentially follow the at least one periodicity. For example, if a quantity of the one or more periodicities is 1, and the periodicity is a first periodicity, the second signaling may indicate the first periodicity that sequentially follows the at least one periodicity.

For example, the network device sequentially enters a plurality of sleep modes, and the first signaling indicates only a periodicity corresponding to a part of the sleep modes that the network device is to enter subsequently. Therefore, when the network device is woken up from the at least one sleep mode, the network device may send the second signaling, where the second signaling may indicate the first periodicity corresponding to a next sleep mode that sequentially follows the at least one sleep mode. Optionally, the second signaling may further indicate a quantity of times of detection to be performed by the terminal device based on the first periodicity. Optionally, the second signaling may further indicate a corresponding offset. Similarly, the second signaling may be unicast signaling, multicast signaling, or broadcast signaling. For implementation of the second signaling, refer to the descriptions of the first signaling.

After the network device notifies the terminal device of all the periodicities that need to be executed by the terminal device, the network device may not need to notify the terminal device again. For example, if the network device is woken up from a sleep mode that is the last one in all the sleep modes that need to be executed, the network device may directly return to the active state, and does not need to send the second signaling. For example, sleep modes that are determined by the network device and that need to be executed are a sleep mode 3-a sleep mode 2-a sleep mode 1, and each time the network device notifies the terminal device of only a periodicity corresponding to a next sleep mode that is to be executed. For example, if the network device is woken up from the sleep mode 3, the network device may send the second signaling, and the second signaling indicates a periodicity corresponding to the sleep mode 2. If the network device is woken up from the sleep mode 2, the network device may send the second signaling. In this case, the second signaling indicates a periodicity corresponding to the sleep mode 1. However, if the network device is woken up from the sleep mode 1, the network device does not need to send the second signaling, but returns to the active state.

S33: The terminal device detects the downlink signal based on the at least one periodicity.

After receiving the first signaling, the terminal device may determine the at least one periodicity based on the first signaling. If the first signaling indicates the first duration, the terminal device may determine the fourth periodicity based on the first duration. In this case, because the quantity of the at least one periodicity is 1, the at least one periodicity is the fourth periodicity. For example, the terminal device may determine the fourth periodicity based on the first duration, the at least one threshold, and the first set. For example, if the first signaling is the signaling carried on the PDCCH, for example, DCI, the terminal device may directly apply the at least one periodicity to a second search space, so that the terminal device can detect the downlink signal in the second search space based on the at least one periodicity. Alternatively, if the first signaling is the signaling carried on the PDCCH, the first signaling is the RRC signaling, or the first signaling is the system message, the terminal device may directly apply the at least one periodicity to all search spaces supported by the terminal device, so that the terminal device can detect the downlink signal in each of all the supported search spaces based on the at least one periodicity. The second search space is, for example, a search space used by the terminal device to receive the first signaling. Applying a periodicity to a search space is replacing a periodicity of the search space with the periodicity. Optionally, when detecting the downlink signal based on the at least one periodicity, the terminal device may not perform channel state measurement and/or feedback.

Before the terminal device replaces a periodicity of a search space, an original periodicity of the search space may be configured by the network device by using RRC signaling. It can be learned that in this embodiment of this application, although the first signaling may be the RRC signaling or may not be the RRC signaling, regardless of a type of the first signaling, the terminal device may replace, based on the at least one periodicity indicated by the first signaling, the original periodicity configured by the network device by using the RRC signaling. In this sense, the at least one periodicity may be used to change a periodicity of a first search space of the terminal device to the at least one periodicity, and the first search space is a search space for sending the first signaling (where in this case, the first search space and the second search space are a same search space), or the first search space is any one of all the search spaces supported by the terminal device.

Alternatively, after receiving the first signaling, the terminal device may perform corresponding determining, to determine whether to detect the downlink signal based on the at least one periodicity. In this embodiment of this application, after receiving the first signaling, if the terminal device needs to determine, through determining, whether to detect the downlink signal based on the at least one periodicity, a determining manner may be performing determining based on a periodicity of a search space. The following describes a manner in which the terminal device performs determining based on the periodicity of the search space. When determining is performed based on the periodicity of the search space, if the first signaling indicates only one periodicity, the terminal device may directly perform determining based on the periodicity indicated by the first signaling. However, if the first signaling indicates a plurality of periodicities, the terminal device may perform determining only based on a next periodicity that is indicated by the first signaling and that is to be executed by the terminal device, and does not need to determine each periodicity. When the terminal device completes execution of a periodicity and needs to execute a next periodicity, the terminal device may perform determining based on the next periodicity indicated by the first signaling. For example, the first signaling indicates a periodicity 1 and a periodicity 2, and the terminal device determines, as indicated by the first signaling, to execute the periodicity 1 first and then execute the periodicity 2. In this case, before the periodicity 1 is executed, the terminal device may first perform determining based on the periodicity of the search space (that is, the original periodicity of the search space) and the periodicity 1, and determine, based on a determining result, whether to change the periodicity of the search space. When the execution of the periodicity 1 is completed, that is, when the periodicity 2 is to be executed, or before the periodicity 2 is executed, the terminal device may first perform determining based on the periodicity of the search space and the periodicity 2, and determine, based on a determining result, whether to change the periodicity of the search space.

For example, if the terminal device needs to perform determining based on the periodicity of the first search space and a third periodicity in the at least one periodicity, the terminal device may determine whether the periodicity of the first search space is greater than the third periodicity. If the periodicity of the first search space is less than or equal to the third periodicity, the terminal device may replace the periodicity of the first search space with the third periodicity, and the terminal device may detect the downlink signal in the first search space based on the third periodicity. Alternatively, if the periodicity of the first search space is greater than the third periodicity, the terminal device may replace the periodicity of the first search space with M times the third periodicity. In other words, the terminal device may detect the downlink signal in the first search space based on a periodicity of M×P, where P represents a length of the third periodicity, and M is a positive integer. A value of M×P may be as close as possible to a length of the original periodicity of the first search space. In this way, the periodicity of the first search space is changed slightly, and implementation of the terminal device is more facilitated. Alternatively, if the periodicity of the first search space is greater than the third periodicity, the terminal device may replace the periodicity of the first search space with the third periodicity, or the terminal device may set the periodicity of the first search space to a least common multiple of the original periodicity of the first search space and the third periodicity.

If the first signaling is the signaling carried on the PDCCH, the first search space may be the foregoing second search space, namely, the search space used by the terminal device to receive the first signaling; or the first search space may be any one of all the search spaces supported by the terminal device. If the first signaling is not the signaling carried on the PDCCH, the first search space may be any one of all the search spaces supported by the terminal device. In other words, if the first signaling is the signaling carried on the PDCCH, the terminal device may determine only the second search space. For a search space supported by the terminal device other than the second search space, the terminal device does not apply the at least one periodicity to the search space. In other words, for the search space supported by the terminal device other than the second search space, the terminal device still continues to detect the downlink signal based on an original periodicity of the search space; or if the first signaling may be or may not be the signaling carried on the PDCCH, the terminal device may determine each of all the search spaces supported by the terminal device, and the terminal device may detect the downlink signal in each of all the supported search spaces based on the third periodicity.

For example, if the original periodicity of the first search space is 0.5 ms, and the third periodicity is 1 ms, the periodicity of the first search space is less than the third periodicity. In this case, the terminal device may change the periodicity of the first search space to 1 ms, and the terminal device may detect the downlink signal in the first search space based on the periodicity of 1 ms.

Alternatively, if the original periodicity of the first search space is 3.2 ms, and the third periodicity is 1 ms, the periodicity of the first search space is greater than the third periodicity. In this case, the terminal device may change the periodicity of the first search space to 3 ms, 4 ms, or the like according to a principle of making the value of M×P as close as possible to the length of the original periodicity of the first search space as much as possible. Alternatively, the terminal device may change the periodicity of the first search space to 1 ms according to a principle of replacing the periodicity of the first search space with the third periodicity. Alternatively, the terminal device may change the periodicity of the first search space to 16 ms according to a principle of setting the periodicity of the first search space to the least common multiple of the original periodicity of the first search space and the third periodicity. The terminal device may detect the downlink signal in the first search space based on a changed periodicity.

The terminal device may determine, based on a determining result, whether to change the periodicity of the first search space, so that the terminal device can change the periodicity of the search space more properly.

For example, the order of the at least one sleep mode is a sleep mode 2-a sleep mode 3-the sleep mode 2-a sleep mode 1, and the order of the at least one periodicity is T2-T3-T2-T1, where T1 represents a length of a periodicity of the sleep mode 1, T2 represents a length of a periodicity of the sleep mode 2, T3 represents a length of a periodicity of the sleep mode 3, and quantities of times of detection corresponding to the at least one periodicity are n2-n3-n'2-n1. For example, for the first search space, the terminal device may first adjust the periodicity of the first search space to T2 matching the sleep mode 2. After detection is performed based on T2 and/or n2, the network device enters the sleep mode 3, and the terminal device also adjusts the periodicity of the first search space to T3 matching the sleep mode 3. After detection is performed based on T3 and/or n3, the network device enters the sleep mode 2, and the terminal device also adjusts the periodicity of the first search space to the periodicity T2 matching the sleep mode 2. After detection is performed based on T2 and/or n'2, the network device enters the sleep mode 1, and the terminal device also adjusts the periodicity of the first search space to T1 matching the sleep mode 1. After detection is performed based on T1 and/or n1, the network device ends a sleep state and enters the active state. In this case, the terminal device also detects a downlink signal from the woken-up network device.

If the first signaling further indicates one or more offsets, or the network device indicates one or more offsets by using other signaling, the terminal device also needs to consider the one or more offsets when detecting the downlink signal based on the first periodicity.

For example, the order of the at least one sleep mode is a sleep mode 2-a sleep mode 3-the sleep mode 2-a sleep mode 1, the order of the at least one periodicity is T2-T3-T2-T1, quantities of times of detection corresponding to the at least one periodicity are n2-n3-n'2-n1, and offsets corresponding to the at least one periodicity are P2-P3-P'2-P1. For example, for the first search space, after receiving the first signaling, the terminal device may adjust, based on P2 and/or T2, the periodicity of the first search space to T2 matching the sleep mode 2. After detection is performed based on P2, T2, and/or n2, the network device enters the sleep mode 3, and the terminal device adjusts, based on the offset P3 and/or T3, the periodicity of the first search space to T3 matching the sleep mode 3. After detection is performed based on P3, T3, and/or n3, the network device enters the sleep mode 2, and the terminal device adjusts, based on the offset P'2 and/or T2, the periodicity of the first search space to the periodicity T2 matching the sleep mode 2. After detection is performed based on P'2 and/or T2 and n'2, the network device enters the sleep mode 1, and the terminal device adjusts, based on the offset P1 and/or T1, the periodicity of the first search space to T1 matching the sleep mode 1. After detection is performed based on P1, T1, and/or n1, the network device ends a sleep state and enters the active state. In this case, the terminal device also detects a downlink signal from the woken-up network device.

S34: The network device receives a downlink service.

For example, the network device receives the downlink service in an $N^{th}$ repetition process of a first sleep mode in the at least one sleep mode; or the network device receives the downlink service when an $N^{th}$ repetition process of a first sleep mode in the at least one sleep mode ends, where N is a positive integer, the $N^{th}$ repetition process may be any repetition process of the first sleep mode, and the first sleep mode may be any one of the at least one sleep mode.

For example, during the $N^{th}$ repetition process of the first sleep mode or when the $N^{th}$ repetition process ends, the network device receives a downlink service from a core network device. The downlink service corresponds to a terminal device, for example, corresponds to the terminal device in S33. The first sleep mode may be any one of the at least one sleep mode, and the $N^{th}$ repetition process may be any repetition process of the first sleep mode.

The first sleep mode may be any one of the at least one sleep mode, and a quantity of repetitions of the first sleep mode may be greater than or equal to N. If the first sleep mode is the last sleep mode in the at least one sleep mode, the quantity of repetitions of the first sleep mode is equal to N, and the network device receives the downlink service when the $N^{th}$ repetition process of the first sleep mode in the at least one sleep mode ends, it may be considered that the network device is woken up after execution of the at least one sleep mode is completed. If the network device is woken up after the execution of the at least one sleep mode is completed, the network device may receive the downlink service; or even if the network device does not receive the downlink service, the network device is woken up after the execution of the at least one sleep mode is completed. S34 is merely an example in which the network device receives the downlink service.

S35: The network device is woken up after the $N^{th}$ repetition process of the first sleep mode in the at least one sleep mode ends. In addition, the network device no longer performs a remaining repetition process other than N repetition processes of the first sleep mode, and no longer executes another sleep mode, in the at least one sleep mode, that sequentially follows the first sleep mode.

If the network device receives the downlink service in a sleep process, the network device may be woken up in time, to perform the downlink service as soon as possible, so as to reduce a delay of the downlink service. For example, sleep modes to be executed by the network device is a sleep mode 3-a sleep mode 2-a sleep mode 1, where a quantity of repetitions of the sleep mode 3 is 6, a quantity of repetitions of the sleep mode 2 is 2, and a quantity of repetitions of the sleep mode 1 is 2. For example, the network device receives the downlink service in the third repetition process of the sleep mode 3. In this case, the network device has repeatedly executed the sleep mode 3 twice, and is currently in the third repetition process of the sleep mode 3. In addition, the sleep mode 3 has three repetition processes that are not performed. However, the network device may still start to be woken up after the third repetition process of the sleep mode 3 ends. However, the network device does not perform the three repetition processes of the sleep mode 3 that have not been performed, and does not execute the subsequent sleep mode 2 or the sleep mode 1.

S36: After being woken up, the network device sends fourth signaling to the terminal device.

The terminal device may receive the fourth signaling from the network device during an $N^{th}$ time of detection performed based on a fifth periodicity in the at least one periodicity. The $N^{th}$ time of detection may be any time of detection performed based on the fifth periodicity, and the fifth periodicity may be any one of the at least one periodicity.

If the first sleep mode is the last sleep mode in the at least one sleep mode, the fifth periodicity may be the last periodicity in the at least one periodicity; otherwise, the fifth periodicity is not the last periodicity in the at least one periodicity. The quantity of repetitions of the first sleep mode may be equal to or not equal to a quantity of times of detection to be performed based on the fifth periodicity. For example, when the two are equal, if the quantity of repetitions of the first sleep mode is equal to N, the quantity of times of detection to be performed based on the fifth periodicity is equal to N; however, if the quantity of repetitions in the first sleep mode is greater than N, the quantity of times of detection to be performed based on the fifth periodicity is greater than N.

If the fifth periodicity is the last periodicity in the at least one periodicity, the quantity of times of detection to be performed based on the fifth periodicity is equal to N, and the terminal device receives the fourth signaling from the network device during the $N^{th}$ time of detection performed based on the fifth periodicity in the at least one periodicity, it may be considered that the terminal device receives the fourth signaling after the execution of the at least one periodicity is completed, that is, the terminal device normally corresponds to the sleep mode of the network device.

Alternatively, if the quantity of the at least one periodicity is 1, the quantity of times of detection to be performed based on the fifth periodicity is equal to N, and the terminal device receives the fourth signaling from the network device during the $N^{th}$ time of detection performed based on the fifth periodicity in the at least one periodicity, it may be considered that the terminal device receives the fourth signaling after the execution of the at least one periodicity is completed. For example, if the first signaling indicates the first duration, the terminal device may receive the fourth signaling when the first duration ends or after the first duration ends.

For example, the periodicity of the terminal device matches the sleep mode of the network device. Therefore, the terminal device can receive the fourth signaling sent by the woken-up network device. After receiving the fourth signaling, the terminal device may perform a normal service with the network device.

For example, the fourth signaling may be signaling carried on a PDCCH. For example, the fourth signaling is a wake-up signal (wake-up signal, WUS) used to wake up the terminal device; the fourth signaling is signaling used to schedule downlink data or uplink data, for example, DCI; or the fourth signaling is signaling used to transmit special information, where the special information is, for example, tsunami information or earthquake information. Certainly, the fourth signaling may alternatively be other signaling, and the fourth signaling may alternatively have another purpose.

S37: The terminal device detects a downlink control channel based on a second periodicity, where the second periodicity does not belong to the at least one periodicity.

After receiving the fourth signaling, the terminal device may change the periodicity of the terminal device to the second periodicity. Alternatively, even if the terminal device does not receive the fourth signaling, after completing the execution of the at least one periodicity, the terminal device may change the periodicity of the terminal device to the second periodicity (herein, an example in which the at least one periodicity is all periodicities indicated by the network device to the terminal device is used). Optionally, if the terminal device previously does not perform channel state measurement and/or feedback during downlink signal detection based on the at least one periodicity, after receiving the fourth signaling, the terminal device may resume the channel state measurement and/or feedback or the terminal device may not resume the channel state measurement and/or feedback; in other words, whether to resume the channel state measurement and/or feedback may be irrelevant to the fourth signaling.

The terminal device may change periodicities that are of search spaces and that are changed by the terminal device in S33 to the second periodicity in S37. Alternatively, regardless of search spaces whose periodicities are changed by the terminal device in S33 to the second periodicity, the terminal device may change a periodicity of each of all the search spaces supported by the terminal device to the second periodicity in S37, or the terminal device may change only a periodicity of a search space for receiving the fourth signaling to the second periodicity in S37.

The second periodicity does not belong to the at least one periodicity, and is not the first periodicity. In other words, the second periodicity is not a periodicity matching the at least one sleep mode of the network device, and the second periodicity needs to be a periodicity of the terminal device when both the terminal device and the network device work normally.

For example, the second periodicity may be an original periodicity of the terminal device before the terminal device changes the periodicity of the terminal device in S33; the second periodicity may be an original periodicity of the terminal device before the network device enters the sleep mode or before the terminal device receives the first signaling; the second periodicity may be a periodicity indicated by using the fourth signaling; or the second periodicity may be a periodicity specified in a protocol.

S34 to S37 are only optional steps, and are not mandatory.

In this embodiment of this application, after determining the at least one sleep mode that the network device is to enter, the network device may indicate the at least one periodicity to the terminal device, and the at least one periodicity may match the at least one sleep mode, so that the terminal device can detect the downlink signal based on the at least one periodicity. This is equivalent to describing that the terminal device can detect the downlink signal based on the sleep mode of the network device, to avoid as much as possible that when the network device is in the sleep mode, the terminal device still detects the downlink signal based on a periodicity used when the network device is in the active state, thereby reducing a probability that the terminal device performs useless work, and reducing power consumption of the terminal device. In addition, the periodicity may correspond to the sleep mode of the network device. If the network device may be sequentially in a plurality of sleep modes, the quantity of the at least one periodicity may be greater than 1. In other words, the network device may indicate the plurality of periodicities to the terminal device. When the network device is in one sleep mode, the terminal device may detect the downlink signal based on a periodicity matching the sleep mode, so that the periodicity of the terminal device can match each sleep mode of the network device, and the power consumption of the terminal device can be reduced.

Figure 5:
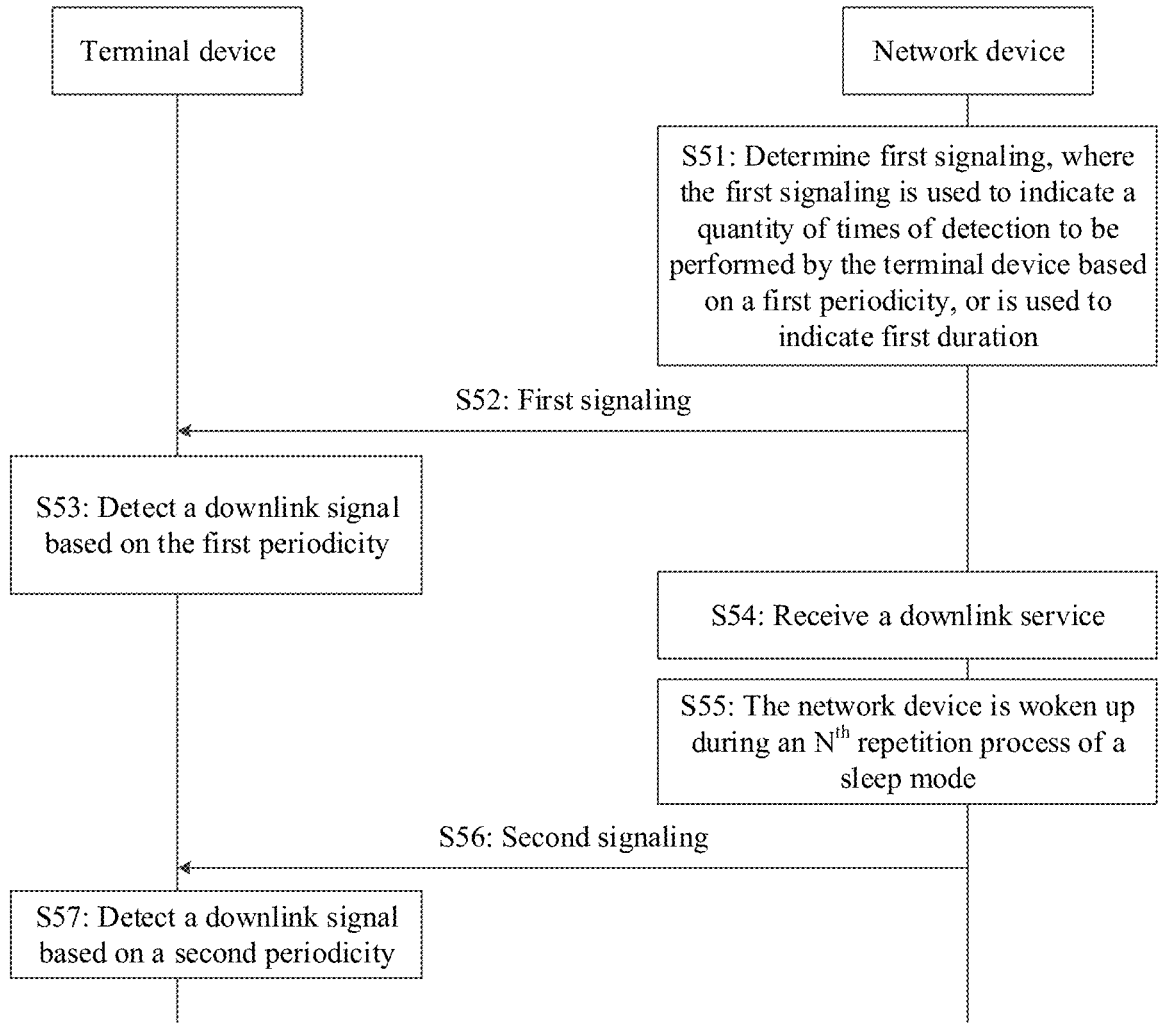
FIG. 5 is a flowchart of a second type of communication method according to an embodiment of this application.

In the embodiment shown in FIG. 3, the network device indicates the at least one periodicity. However, in another case, it is possible that the terminal device can match a state of the network device by detecting a downlink signal based on only one periodicity. Therefore, an embodiment of this application provides a second type of communication method. FIG. 5 is a flowchart of the method. In the following descriptions, an example in which the method is applied to the network architecture shown in FIG. 2 is used. In addition, the method may be performed by two communication apparatuses. The two communication apparatuses are, for example, a first communication apparatus and a second communication apparatus. The first communication apparatus may be a network device or a communication apparatus that can support the network device in implementing a function required in the method. Alternatively, the first communication apparatus may be a terminal device or a communication apparatus that can support the terminal device in implementing a function required in the method. Certainly, the first communication apparatus may alternatively be another communication apparatus, for example, a chip system. Similarly, the second communication apparatus may be a network device or a communication apparatus that can support the network device in implementing a function required in the method. Alternatively, the second communication apparatus may be a terminal device or a communication apparatus that can support the terminal device in implementing a function required in the method. Certainly, the second communication apparatus may alternatively be another communication apparatus, for example, a chip system. In addition, implementations of the first communication apparatus and the second communication apparatus are not limited. For example, the first communication apparatus may be a network device, and the second communication apparatus is a terminal device. Alternatively, both the first communication apparatus and the second communication apparatus are network devices. Alternatively, both the first communication apparatus and the second communication apparatus are terminal devices. Alternatively, the first communication apparatus is a network device, and the second communication apparatus is a communication apparatus that can support a terminal device in implementing a function required in the method. The network device is, for example, a base station.

For ease of description, the following uses an example in which the method is performed by a network device and a terminal device, that is, an example in which the first communication apparatus is a network device and the second communication apparatus is a terminal device. An example in which this embodiment is applied to the network architecture shown in FIG. 2 is used. Therefore, a network device described below may be the network device in the network architecture shown in FIG. 2, and a terminal device described below may be the terminal device in the network architecture shown in FIG. 2.

S51: The network device determines first signaling, where the first signaling is used to indicate a first quantity of times or first duration, the first quantity of times is a quantity of times of detection to be performed by the terminal device based on a first periodicity, and the first duration is duration in which the terminal device is to perform detection based on the first periodicity.

In this embodiment of this application, the network device may determine the first periodicity, and the first periodicity is used by the terminal device to detect a downlink signal. For example, a length of the first periodicity is known by the terminal device. For example, the first periodicity is configured by the network device for the terminal device, the first periodicity may be preconfigured in the terminal device, or the first periodicity is specified in a protocol. In this case, the network device only needs to indicate, to the terminal device by using the first signaling, the quantity of times of detection to be performed based on the first periodicity. Alternatively, if the terminal device does not know the length of the first periodicity, the first signaling may further indicate the length of the first periodicity; or the network device may send third signaling, to indicate the length of the first periodicity by using the third signaling. After receiving the third signaling, the terminal device may determine the length of the first periodicity.

For example, the first periodicity matches a sleep mode of the network device. For example, if the network device supports only one sleep mode, the network device needs to determine only one periodicity matching the sleep mode. One periodicity matches one sleep mode. For example, a matching manner is that a difference between a length of the periodicity and a sleep granularity of the sleep mode is less than a first threshold. For example, the first threshold is configured by the network device, or specified in a protocol. If the first threshold is 0, the length of the periodicity is equal to the sleep granularity of the sleep mode. For example, if a sleep granularity of one sleep mode is 1 ms, a corresponding periodicity determined by the network device may also be 1 ms.

Optionally, the first signaling may further indicate an offset, or the network device may indicate the offset by using other signaling. For example, the first signaling may indicate one or more offsets. These offsets may assist the terminal device in detecting the first periodicity. For more descriptions of the offset of the periodicity, refer to S31 in the embodiment shown in FIG. 3.

Alternatively, the first signaling may not indicate the first quantity of times, but may indicate the first duration. For example, the first duration is total duration in which the terminal device is to perform detection based on the first periodicity. For example, if the periodicity matches the sleep mode, the first duration may be total duration in which the network device is in the sleep mode. When the network device is in the sleep mode, the terminal device performs detection based on the first periodicity. Therefore, the first duration may also be considered as the total duration in which the terminal device is to perform detection based on the first periodicity. If the first duration is the total duration in which the network device is in the sleep mode, and the terminal device may determine the first periodicity, the terminal device may determine, based on the first duration and the length of the periodicity, the quantity of times of detection to be performed based on the first periodicity. Therefore, if the first signaling indicates the first duration, the first signaling may not need to indicate the first quantity of times.

S52: The network device sends the first signaling, and the terminal device receives the first signaling from the network device.

The first signaling may be unicast signaling, multicast signaling, or broadcast signaling. For example, if the first signaling is the unicast signaling, the first signaling may be specific to only one terminal device. For example, the network device may send the first signaling only to a terminal device that needs to reduce power consumption, and does not need to send the first signaling to a plurality of terminal devices covered by the network device, so that the first signaling is more targeted. Alternatively, if the first signaling is the multicast signaling, the first signaling may be UE group signaling, and may be specific to a plurality of terminal devices. In this case, the plurality of terminal devices may all use the first periodicity to detect downlink signals. Alternatively, the first signaling is the broadcast signaling. For example, for a cell, the first periodicity may be used to detect a downlink signal, and the network device may indicate the first periodicity by using the broadcast signaling. If the first signaling is the multicast signaling or the broadcast signaling, signaling overheads can be reduced to some extent.

If the first signaling is the unicast signaling or the multicast signaling, the first signaling may be RRC signaling, or may be signaling, for example, DCI, carried on a PDCCH. If the first signaling is the broadcast signaling, the first signaling may be a system message, for example, a MIB or a SIB. If the first signaling is the RRC signaling, the network device may send the first signaling in a semi-static manner, to improve signaling reliability. If the first signaling is the signaling carried on the PDCCH, the network device may dynamically send the first signaling, so that duration for notifying the terminal device by the network device can be reduced, and the network device can quickly enter a sleep mode.

S53: The terminal device detects the downlink signal based on the first periodicity.

After the terminal device receives the first signaling, if the first signaling indicates the first quantity of times, the terminal device may determine the first quantity of times; or if the first signaling indicates the first duration, because the terminal device can determine the first periodicity, the terminal device may also determine the first quantity of times based on the first duration and the first periodicity. After determining the first quantity of times, the terminal device may detect the downlink signal based on the first periodicity and/or the first quantity of times.

For example, if the first signaling is the signaling carried on the PDCCH, for example, DCI, the terminal device may directly apply the first periodicity to a second search space, so that the terminal device can detect the downlink signal in the second search space based on the first periodicity. Alternatively, if the first signaling is the signaling carried on the PDCCH, the first signaling is the RRC signaling, or the first signaling is the system message, the terminal device may directly apply the first periodicity to all search spaces supported by the terminal device, so that the terminal device can detect the downlink signal in each of all the supported search spaces based on the first periodicity. The second search space is, for example, a search space used by the terminal device to receive the first signaling. Applying a periodicity to a search space is replacing a periodicity of the search space with the periodicity.

Before the terminal device replaces a periodicity of a search space, an original periodicity of the search space may be configured by the network device by using RRC signaling. It can be learned that in this embodiment of this application, although the first signaling may be the RRC signaling or may not be the RRC signaling, regardless of a type of the first signaling, the terminal device may replace, based on the first periodicity after receiving the first signaling, the original periodicity configured by the network device by using the RRC signaling. In this sense, the first periodicity may be used to change a periodicity of a first search space of the terminal device to the first periodicity, and the first search space is a search space for sending the first signaling (where in this case, the first search space and the second search space are a same search space), or the first search space is any one of all the search spaces supported by the terminal device.

Alternatively, after receiving the first signaling, the terminal device may perform corresponding determining, to determine whether to detect the downlink signal based on the first periodicity. In this embodiment of this application, after receiving the first signaling, if the terminal device needs to determine, through determining, whether to detect the downlink signal based on the first periodicity, a determining manner may be performing determining based on a periodicity of a search space. The following describes a manner in which the terminal device performs determining based on the periodicity of the search space.

For example, the terminal device may determine whether the periodicity of the first search space is greater than the first periodicity. If the periodicity of the first search space is less than or equal to the first periodicity, the terminal device may replace the periodicity of the first search space with the first periodicity, and the terminal device may detect the downlink signal in the first search space based on the first periodicity. Alternatively, if the periodicity of the first search space is greater than the first periodicity, the terminal device may replace the periodicity of the first search space with M times the first periodicity. In other words, the terminal device may detect a PDCCH in the first search space based on a periodicity of M×P, where P represents the length of the first periodicity, and M is a positive integer. A value of M×P may be as close as possible to a length of the original periodicity of the first search space. In this way, the periodicity of the first search space is changed slightly, and implementation of the terminal device is more facilitated. Alternatively, if the periodicity of the first search space is greater than the first periodicity, the terminal device may replace the periodicity of the first search space with the first periodicity, or the terminal device may set the periodicity of the first search space to a least common multiple of the original periodicity of the first search space and the first periodicity.

If the first signaling is the signaling carried on the PDCCH, the first search space may be the foregoing second search space, namely, the search space used by the terminal device to receive the first signaling; or the first search space may be any one of all the search spaces supported by the terminal device. If the first signaling is not the signaling carried on the PDCCH, the first search space may be any one of all the search spaces supported by the terminal device.

If the first signaling further indicates the offset, or the network device indicates the offset by using other signaling, the terminal device also needs to consider the offset when detecting the downlink signal based on the first periodicity.

For more descriptions of a determining manner of the terminal device, refer to related content in S33 in the embodiment shown in FIG. 3.

S54: The network device receives a downlink service.

For example, the network device receives the downlink service in an $N^{th}$ repetition process of the sleep mode or when the $N^{th}$ repetition process of the sleep mode ends, where N is a positive integer. The $N^{th}$ repetition process may be any repetition process of the sleep mode. If the network device is woken up after execution of the sleep mode is completed, the network device may receive the downlink service; or even if the network device does not receive the downlink service, the network device is woken up after execution of the sleep mode is completed. S54 is merely an example in which the network device receives the downlink service.

For more descriptions of S54, refer to related content in S34 in the embodiment shown in FIG. 3.

S55: The network device is woken up after the $N^{th}$ repetition process of the sleep mode in the sleep mode ends. In addition, the network device no longer performs a remaining repetition process other than N repetition processes of the sleep mode.

If the network device receives the downlink service in a sleep process, the network device may be woken up in time, to perform the downlink service as soon as possible, so as to reduce a delay of the downlink service. For example, the network device receives the downlink service in the third repetition process of the sleep mode, and a quantity of repetitions of a sleep mode 3 is 6. In this case, the sleep mode has been repeated twice, and the network device is currently in the third repetition process of the sleep mode. In addition, the sleep mode has three repetition processes that are not performed. However, the network device may still start to be woken up after the third repetition process of the sleep mode ends. In this case, it is equivalent to describing that the network device starts to be woken up before the first duration ends. However, the network device does not perform the three repetition processes of the sleep mode that have not been performed.

Alternatively, the network device may be woken up when the sleep mode ends or after the sleep mode ends. For example, the network device receives the downlink service in the sixth repetition process of the sleep mode, and a quantity of repetitions of a sleep mode 3 is 6. In this case, the sleep mode has been repeated for five times, and the network device is currently in the sixth repetition process of the sleep mode. In this case, the network device may start to be woken up after the sixth repetition process of the sleep mode ends. In this case, it is equivalent to describing that the network device starts to be woken up when the first duration ends.

Alternatively, the network device may not receive the downlink service. In this case, the network device may start to be woken up when the sleep mode ends or after the sleep mode ends.

S56: After being woken up, the network device sends second signaling to the terminal device. The terminal device receives the second signaling from the network device during an $N^{th}$ time of detection performed based on the first periodicity. The $N^{th}$ time of detection may be any detection performed based on the first periodicity.

Alternatively, the terminal device may receive the second signaling from the network device before the first duration ends, or receive the second signaling from the network device when the first duration ends or after the first duration ends.

For example, the periodicity of the terminal device matches the sleep mode of the network device. Therefore, the terminal device can receive the second signaling sent by the woken-up network device. After receiving the second signaling, the terminal device may perform a normal service with the network device.

For example, the second signaling may be signaling carried on a PDCCH. For example, the second signaling is a WUS used to wake up the terminal device; the second signaling is signaling used to schedule downlink data or uplink data, for example, DCI; or the second signaling is signaling used to transmit special information, where the special information is, for example, tsunami information or earthquake information. Certainly, the second signaling may alternatively be other signaling, and the second signaling may alternatively have another purpose.

For more descriptions of S56, refer to related content in S36 in the embodiment shown in FIG. 3.

S57: The terminal device detects a downlink control channel based on a second periodicity, where the second periodicity and the first periodicity are different periodicities.

After receiving the second signaling, the terminal device may change the periodicity of the terminal device to the second periodicity. Alternatively, even if the terminal device does not receive the second signaling, the terminal device may change the periodicity of the terminal device to the second periodicity after completing execution of at least one periodicity.

The terminal device may change periodicities that are of search spaces and that are changed by the terminal device in S53 to the second periodicity in S57. Alternatively, regardless of search spaces whose periodicities are changed by the terminal device in S53 to the second periodicity, the terminal device may change a periodicity of each of all the search spaces supported by the terminal device to the second periodicity in S57, or the terminal device may change only a periodicity of a search space for receiving the second signaling to the second periodicity in S57.

The second periodicity and the first periodicity are not a same periodicity. In other words, the second periodicity is not a periodicity matching the sleep mode of the network device, and the second periodicity needs to be a periodicity of the terminal device when both the terminal device and the network device work normally.

For example, the second periodicity may be an original periodicity of the terminal device before the terminal device changes the periodicity of the terminal device in S53; the second periodicity may be an original periodicity of the terminal device before the network device enters the sleep mode or before the terminal device receives the first signaling; the second periodicity may be a periodicity indicated by using the second signaling; or the second periodicity may be a periodicity specified in a protocol.

S54 to S57 are only optional steps, and are not mandatory. Similar to the descriptions in S33 and S37 in the embodiment shown in FIG. 3, optionally, the terminal device may not perform channel state measurement and/or feedback during downlink signal detection based on the first periodicity; correspondingly, after receiving the second signaling, the terminal device may resume the channel state measurement and/or feedback or the terminal device may not resume the channel state measurement and/or feedback; in other words, whether to resume the channel state measurement and/or feedback may be irrelevant to the second signaling.

In this embodiment of this application, after determining the sleep mode of the network device, the network device may indicate, to the terminal device, the quantity of times of detection to be performed based on the first periodicity, and the first periodicity may match the sleep mode, so that the terminal device can detect the downlink signal based on the first periodicity. This is equivalent to describing that the terminal device can detect the downlink signal based on the sleep mode of the network device, to avoid as much as possible that when the network device is in the sleep mode, the terminal device still detects the downlink signal based on a periodicity used when the network device is in an active state, thereby reducing a probability that the terminal device performs useless work, and reducing power consumption of the terminal device.

The following describes, with reference to the accompanying drawings, apparatuses configured to implement the foregoing methods in embodiments of this application. Therefore, all the foregoing content may be used in the following embodiments. Repeated content is not described again.

Figure 6:
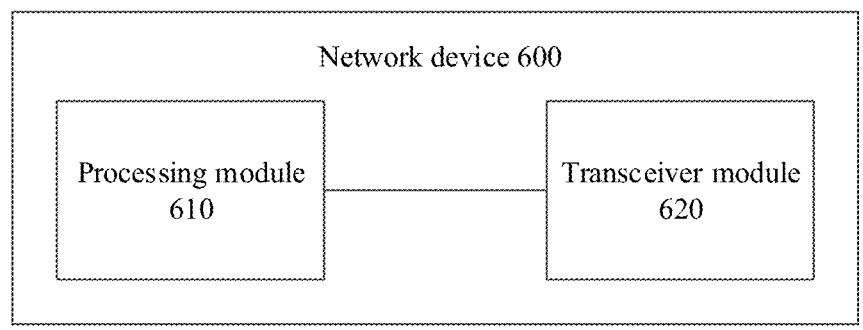
FIG. 6 is a schematic block diagram of a first type of network device according to an embodiment of this application.

FIG. 6 is a schematic block diagram of a communication apparatus 600 according to an embodiment of this application. For example, the communication apparatus 600 is a network device 600.

The network device 600 includes a processing module 610 and a transceiver module 620. For example, the network device 600 may be a network device, or may be a chip used in the network device, or another combined device or component that has a function of the foregoing network device. When the network device 600 is the network device, the transceiver module 620 may be a transceiver, and the transceiver may include an antenna, a radio frequency circuit, and the like; the processing module 610 may be a processor, and the processor may include one or more central processing units (central processing units, CPUs). When the network device 600 is the component having the function of the network device, the transceiver module 620 may be a radio frequency unit, and the processing module 610 may be a processor, for example, a baseband processor. When the network device 600 is a chip system, the transceiver module 620 may be an input/output interface in the chip system (for example, a baseband chip), and the processing module 610 may be a processor in the chip system, and may include one or more central processing units. It should be understood that the processing module 610 in this embodiment of this application may be implemented by a processor or a processor-related circuit component, and the transceiver module 620 may be implemented by a transceiver or a transceiver-related circuit component.

The processing module 610 may be configured to perform all operations performed by the network device in the embodiment shown in FIG. 3 except sending and receiving operations, for example, S31, S34, and S35, and/or configured to support another process of the technology described in this specification. The transceiver module 620 may be configured to perform all receiving operations performed by the network device in the embodiment shown in FIG. 3, for example, S32 and S36, and/or configured to support another process of the technology described in this specification.

In addition, the transceiver module 620 may be a functional module. The functional module can implement both a sending operation and a receiving operation. For example, the transceiver module 620 may be configured to perform all sending operations and receiving operations performed by the network device in the embodiment shown in FIG. 3. For example, when a sending operation is performed, it may be considered that the transceiver module 620 is a sending module; when a receiving operation is performed, it may be considered that the transceiver module 620 is a receiving module. Alternatively, the transceiver module 620 may be two functional modules, the transceiver module may be a general term of the two functional modules, and the two functional modules are respectively a sending module and a receiving module. The sending module is configured to implement a sending operation. For example, the sending module may be configured to perform all the sending operations performed by the network device in the embodiment shown in FIG. 3. The receiving module is configured to implement a receiving operation. For example, the receiving module may be configured to perform all the receiving operations performed by the network device in the embodiment shown in FIG. 3.

The processing module 610 is configured to determine first signaling, where the first signaling is used to indicate at least one periodicity, and each of the at least one periodicity is a periodicity to be used by a terminal device to detect a downlink signal.

The transceiver module 620 is configured to send the first signaling.

In an optional implementation, the at least one periodicity matches at least one sleep mode.

In an optional implementation, the first signaling is further used to indicate a quantity of times of detection to be performed by the terminal device based on the at least one periodicity.

In an optional implementation, the first signaling is further used to indicate an order of detection to be performed by the terminal device based on the at least one periodicity.

In an optional implementation, the first signaling is further used to indicate one or more offsets, and the one or more offsets are used to assist in the periodicity-based detection.

In an optional implementation, the transceiver module 620 is further configured to send second signaling when the quantity of times of detection to be performed based on the at least one periodicity is reached, where the second signaling is used to indicate a first periodicity, and the first periodicity sequentially follows the at least one periodicity.

In an optional implementation, that the first signaling is used to indicate at least one periodicity includes:
the first signaling includes the at least one periodicity; or
the first signaling includes an identifier of a first periodicity set, the identifier of the first periodicity set is used to indicate the at least one periodicity, the first periodicity set is one of a plurality of periodicity sets, and each of the plurality of periodicity sets includes an order combination of one or more periodicities.

In an optional implementation, the transceiver module 620 is further configured to send third signaling, where the third signaling is used to indicate the plurality of periodicity sets.

In an optional implementation, in the at least one periodicity, a length of an earlier periodicity is greater than a length of a later periodicity.

In an optional implementation, that the first signaling is used to indicate at least one periodicity includes:

the first signaling indicates first duration, and the first duration is related to one of the at least one periodicity.

In an optional implementation, that the first duration is related to one of the at least one periodicity includes:
a value of the first duration is in direct proportion to a value of the periodicity.

In an optional implementation, the transceiver module 620 is further configured to send fourth signaling after the network device 600 is woken up, where the fourth signaling is WUS signaling, DCI used to schedule data, or signaling used to carry special information.

In an optional implementation, the first signaling is RRC signaling, DCI, or a system message.

In an optional implementation, the at least one periodicity is used to change a periodicity of a first search space of the terminal device to the at least one periodicity, and the first search space is a search space for sending the first signaling; or the first search space includes any one of all search spaces supported by the terminal device.

Figure 7:
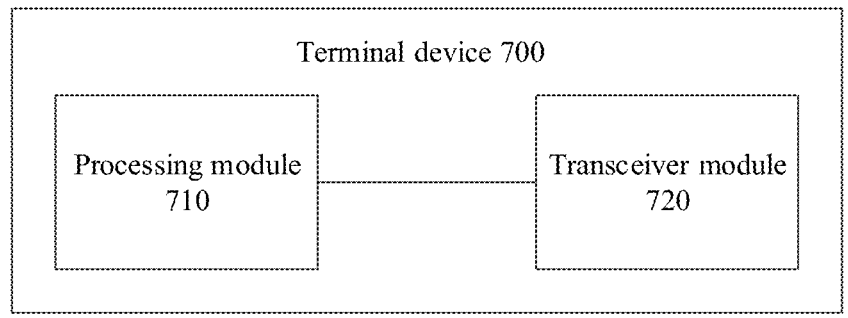
FIG. 7 is a schematic block diagram of a first type of terminal device according to an embodiment of this application.

FIG. 7 is a schematic block diagram of a communication apparatus 700 according to an embodiment of this application. For example, the communication apparatus 700 is a terminal device 700.

The terminal device 700 includes a processing module 710 and a transceiver module 720. For example, the terminal device 700 may be a network device, or may be a chip used in the terminal device, or another combined device or component that has a function of the foregoing terminal device. When the terminal device 700 is the terminal device, the transceiver module 720 may be a transceiver, and the transceiver may include an antenna, a radio frequency circuit, and the like; the processing module 710 may be a processor, for example, a baseband processor, and the baseband processor may include one or more CPUs. When the terminal device 700 is the component having the function of the terminal device, the transceiver module 720 may be a radio frequency unit, and the processing module 710 may be a processor, for example, a baseband processor. When the terminal device 700 is a chip system, the transceiver module 720 may be an input/output interface in the chip system (for example, a baseband chip), and the processing module 710 may be a processor in the chip system, and may include one or more central processing units. It should be understood that the processing module 710 in this embodiment of this application may be implemented by a processor or a processor-related circuit component, and the transceiver module 720 may be implemented by a transceiver or a transceiver-related circuit component.

The processing module 710 may be configured to perform all operations performed by the terminal device in the embodiment shown in FIG. 3 except sending and receiving operations, for example, S33 and S37, and/or configured to support another process of the technology described in this specification. The transceiver module 720 may be configured to perform all receiving operations performed by the terminal device in the embodiment shown in FIG. 3, for example, S32 and S36, and/or configured to support another process of the technology described in this specification.

In addition, the transceiver module 720 may be a functional module. The functional module can implement both a sending operation and a receiving operation. For example, the transceiver module 720 may be configured to perform all sending operations and receiving operations performed by the terminal device in the embodiment shown in FIG. 3. For example, when a sending operation is performed, it may be considered that the transceiver module 720 is a sending module; when a receiving operation is performed, it may be considered that the transceiver module 720 is a receiving module. Alternatively, the transceiver module 720 may be two functional modules, the transceiver module may be a general term of the two functional modules, and the two functional modules are respectively a sending module and a receiving module. The sending module is configured to implement a sending operation. For example, the sending module may be configured to perform all the sending operations performed by the terminal device in the embodiment shown in FIG. 3. The receiving module is configured to implement a receiving operation. For example, the receiving module may be configured to perform all the receiving operations performed by the terminal device in the embodiment shown in FIG. 3.

The transceiver module 720 is configured to receive first signaling from a network device, where the first signaling is used to indicate at least one periodicity, and each of the at least one periodicity is a periodicity to be used by the terminal device 700 to detect a downlink signal.

The processing module 710 is configured to detect the downlink signal based on the at least one periodicity.

In an optional implementation, the at least one periodicity matches at least one sleep mode.

In an optional implementation, the first signaling is further used to indicate a quantity of times of detection to be performed by the terminal device 700 based on the at least one periodicity.

In an optional implementation, the first signaling is further used to indicate an order of detection to be performed by the terminal device 700 based on the at least one periodicity.

In an optional implementation, the first signaling is further used to indicate one or more offsets, and the one or more offsets are used to assist in the periodicity-based detection.

In an optional implementation, the transceiver module 720 is further configured to receive second signaling from the network device, where the second signaling is used to indicate a first periodicity, and the first periodicity sequentially follows the at least one periodicity.

In an optional implementation, that the first signaling is used to indicate at least one periodicity includes:
the first signaling includes the at least one periodicity; or
the first signaling includes an identifier of a first periodicity set, the identifier of the first periodicity set is used to indicate the at least one periodicity, the first periodicity set is one of a plurality of periodicity sets, and each of the plurality of periodicity sets includes an order combination of one or more periodicities.

In an optional implementation, the transceiver module 720 is further configured to receive third signaling from the network device, where the third signaling is used to indicate the plurality of periodicity sets.

In an optional implementation, in the at least one periodicity, a length of an earlier periodicity is greater than a length of a later periodicity.

In an optional implementation, that the first signaling is used to indicate at least one periodicity includes:
the first signaling indicates first duration, and the first duration is related to one of the at least one periodicity.

In an optional implementation, that the first duration is related to one of the at least one periodicity includes:
a value of the first duration is in direct proportion to a value of the periodicity.

In an optional implementation, the transceiver module 720 is further configured to receive fourth signaling from the network device, where the fourth signaling is WUS signaling, DCI used to schedule data, or signaling used to carry special information; and the processing module 710 is further configured to detect a downlink signal based on a second periodicity, where the second periodicity does not belong to the at least one periodicity.

In an optional implementation, the first signaling is RRC signaling, DCI, or a system message.

In an optional implementation, the at least one periodicity is used to change a periodicity of a first search space of the terminal device 700 to the at least one periodicity, and the first search space is a search space for sending the first signaling; or the first search space includes any one of all search spaces supported by the terminal device 700.

In an optional implementation, the processing module 710 is configured to detect the downlink signal based on a third periodicity in the at least one periodicity in the following manner:
  determining that the periodicity of the first search space is less than or equal to the third periodicity, where the first search space is a search space in which the third periodicity is to be executed; and
  detecting the downlink signal in the first search space based on the third periodicity.

In an optional implementation, the processing module 710 is configured to detect the downlink signal based on a third periodicity in the at least one periodicity in the following manner:
  determining that the periodicity of the first search space is greater than the third periodicity, where the first search space is a search space in which the third periodicity is to be executed; and
  detecting the downlink signal in the first search space based on the third periodicity, or detecting the downlink signal in the first search space based on a periodicity of M×P, where M is a positive integer, and P is a length of the second periodicity.

In an optional implementation, the first search space is a search space for receiving the first signaling, or the first search space includes any one of all search spaces supported by the terminal device 700.

Figure 8:
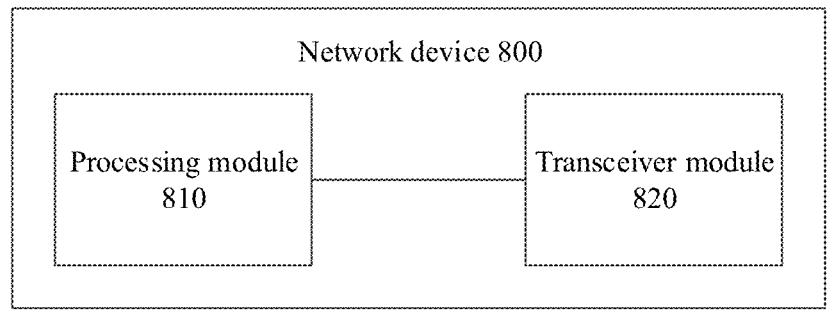
FIG. 8 is a schematic block diagram of a second type of network device according to an embodiment of this application.

FIG. 8 is a schematic block diagram of a communication apparatus 800 according to an embodiment of this application. For example, the communication apparatus 800 is a network device 800.

The network device 800 includes a processing module 810 and a transceiver module 820. For example, the network device 800 may be a network device, or may be a chip used in the network device, or another combined device or component that has a function of the foregoing network device. When the network device 800 is the network device, the transceiver module 820 may be a transceiver, and the transceiver may include an antenna, a radio frequency circuit, and the like; the processing module 810 may be a processor, and the processor may include one or more CPUs. When the network device 800 is the component having the function of the network device, the transceiver module 820 may be a radio frequency unit, and the processing module 810 may be a processor, for example, a baseband processor. When the network device 800 is a chip system, the transceiver module 820 may be an input/output interface in the chip system (for example, a baseband chip), and the processing module 810 may be a processor in the chip system, and may include one or more central processing units. It should be understood that the processing module 810 in this embodiment of this application may be implemented by a processor or a processor-related circuit component, and the transceiver module 820 may be implemented by a transceiver or a transceiver-related circuit component.

The processing module 810 may be configured to perform all operations performed by the network device in the embodiment shown in FIG. 5 except sending and receiving operations, for example, S51, S54, and S55, and/or configured to support another process of the technology described in this specification. The transceiver module 820 may be configured to perform all receiving operations performed by the network device in the embodiment shown in FIG. 5, for example, S52 and S56, and/or configured to support another process of the technology described in this specification.

In addition, the transceiver module 820 may be a functional module. The functional module can implement both a sending operation and a receiving operation. For example, the transceiver module 820 may be configured to perform all sending operations and receiving operations performed by the network device in the embodiment shown in FIG. 5. For example, when a sending operation is performed, it may be considered that the transceiver module 820 is a sending module; when a receiving operation is performed, it may be considered that the transceiver module 820 is a receiving module. Alternatively, the transceiver module 820 may be two functional modules, the transceiver module may be a general term of the two functional modules, and the two functional modules are respectively a sending module and a receiving module. The sending module is configured to implement a sending operation. For example, the sending module may be configured to perform all the sending operations performed by the network device in the embodiment shown in FIG. 5. The receiving module is configured to implement a receiving operation. For example, the receiving module may be configured to perform all the receiving operations performed by the network device in the embodiment shown in FIG. 5.

The processing module 810 is configured to determine first signaling, where the first signaling is used to indicate a quantity of times of detection to be performed by a terminal device based on a first periodicity, or indicate first duration in which the terminal device is to perform detection based on the first periodicity, and the first periodicity is a periodicity to be used by the terminal device to detect a downlink signal.

The transceiver module 820 is configured to send the first signaling.

In an optional implementation, the first periodicity matches a sleep mode.

In an optional implementation, the first signaling is further used to indicate an offset, and the offset is used to assist in the periodicity-based detection.

In an optional implementation, the transceiver module 820 is further configured to send second signaling after the network device 800 is woken up, where the second signaling is WUS signaling, DCI used to schedule data, or signaling used to carry special information.

In an optional implementation, the first signaling is RRC signaling, DCI, or a system message.

Figure 9:
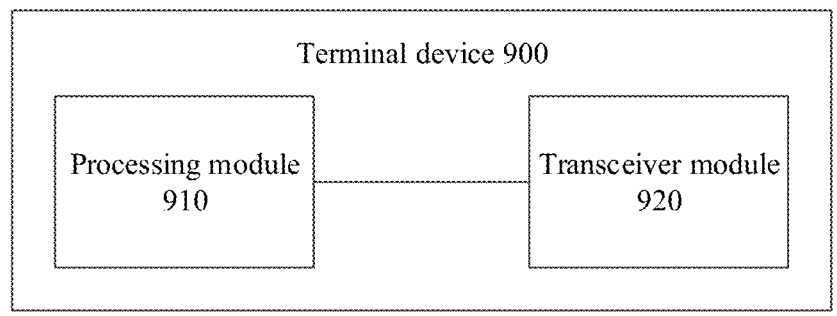
FIG. 9 is a schematic block diagram of a second type of terminal device according to an embodiment of this application.

FIG. 9 is a schematic block diagram of a communication apparatus 900 according to an embodiment of this application. For example, the communication apparatus 900 is a terminal device 900.

The terminal device 900 includes a processing module 910 and a transceiver module 920. For example, the terminal device 900 may be a network device, or may be a chip used in the terminal device, or another combined device or component that has a function of the foregoing terminal device. When the terminal device 900 is the terminal device, the transceiver module 920 may be a transceiver, and the transceiver may include an antenna, a radio frequency circuit, and the like; the processing module 910 may be a processor, for example, a baseband processor, and the baseband processor may include one or more CPUs. When the terminal device 900 is the component having the function of the terminal device, the transceiver module 920 may be a radio frequency unit, and the processing module 910 may be a processor, for example, a baseband processor. When the terminal device 900 is a chip system, the transceiver module 920 may be an input/output interface in the chip system (for example, a baseband chip), and the processing module 910 may be a processor in the chip system, and may include one or more central processing units. It should be understood that the processing module 910 in this embodiment of this application may be implemented by a processor or a processor-related circuit component, and the transceiver module 920 may be implemented by a transceiver or a transceiver-related circuit component.

The processing module 910 may be configured to perform all operations performed by the terminal device in the embodiment shown in FIG. 5 except sending and receiving operations, for example, S53 and S57, and/or configured to support another process of the technology described in this specification. The transceiver module 920 may be configured to perform all receiving operations performed by the terminal device in the embodiment shown in FIG. 5, for example, S52 and S56, and/or configured to support another process of the technology described in this specification.

In addition, the transceiver module 920 may be a functional module. The functional module can implement both a sending operation and a receiving operation. For example, the transceiver module 920 may be configured to perform all sending operations and receiving operations performed by the terminal device in the embodiment shown in FIG. 5. For example, when a sending operation is performed, it may be considered that the transceiver module 920 is a sending module; when a receiving operation is performed, it may be considered that the transceiver module 920 is a receiving module. Alternatively, the transceiver module 920 may be two functional modules, the transceiver module may be a general term of the two functional modules, and the two functional modules are respectively a sending module and a receiving module. The sending module is configured to implement a sending operation. For example, the sending module may be configured to perform all the sending operations performed by the terminal device in the embodiment shown in FIG. 5. The receiving module is configured to implement a receiving operation. For example, the receiving module may be configured to perform all the receiving operations performed by the terminal device in the embodiment shown in FIG. 5.

The transceiver module 920 is configured to receive first signaling from a network device, where the first signaling is used to indicate a quantity of times of detection to be performed by the terminal device based on a first periodicity, or indicate first duration in which the terminal device is to perform detection based on the first periodicity, and the first periodicity is a periodicity to be used by the terminal device 900 to detect a downlink signal.

The processing module 910 is configured to detect the downlink signal based on the first periodicity.

In an optional implementation, the first periodicity matches a sleep mode.

In an optional implementation, the first signaling is used to indicate the first duration, and the processing module 910 is further configured to determine, based on the first duration and the first periodicity, the quantity of times of detection to be performed based on the first periodicity.

In an optional implementation, the first signaling is further used to indicate an offset, and the offset is used to assist in the periodicity-based detection.

In an optional implementation, the transceiver module 920 is further configured to receive second signaling from the network device, where the second signaling is WUS signaling, DCI used to schedule data, or signaling used to carry special information.

In an optional implementation, the first signaling is RRC signaling, DCI, or a system message.

In an optional implementation, the processing module 910 is configured to detect the downlink signal based on the first periodicity in the following manner:
determining that a periodicity of a first search space is less than or equal to the first periodicity, where the first search space is a search space in which the first periodicity is to be executed; and
detecting the downlink signal in the first search space based on the first periodicity.

In an optional implementation, the processing module 910 is configured to detect the downlink signal based on the first periodicity in the following manner:
determining that a periodicity of a first search space is greater than the first periodicity, where the first search space is a search space in which the first periodicity is to be executed; and
detecting the downlink signal in the first search space based on the first periodicity, or detecting the downlink signal in the first search space based on a periodicity of M×P, where M is a positive integer, and P is a length of the first periodicity.

In an optional implementation, the first search space is a search space for receiving the first signaling, or the first search space includes any one of all search spaces supported by the terminal device 900.

An embodiment of this application further provides a communication apparatus. The communication apparatus may be a terminal device or a circuit. The communication apparatus may be configured to perform an action performed by the terminal device in the foregoing method embodiment.

Figure 10:
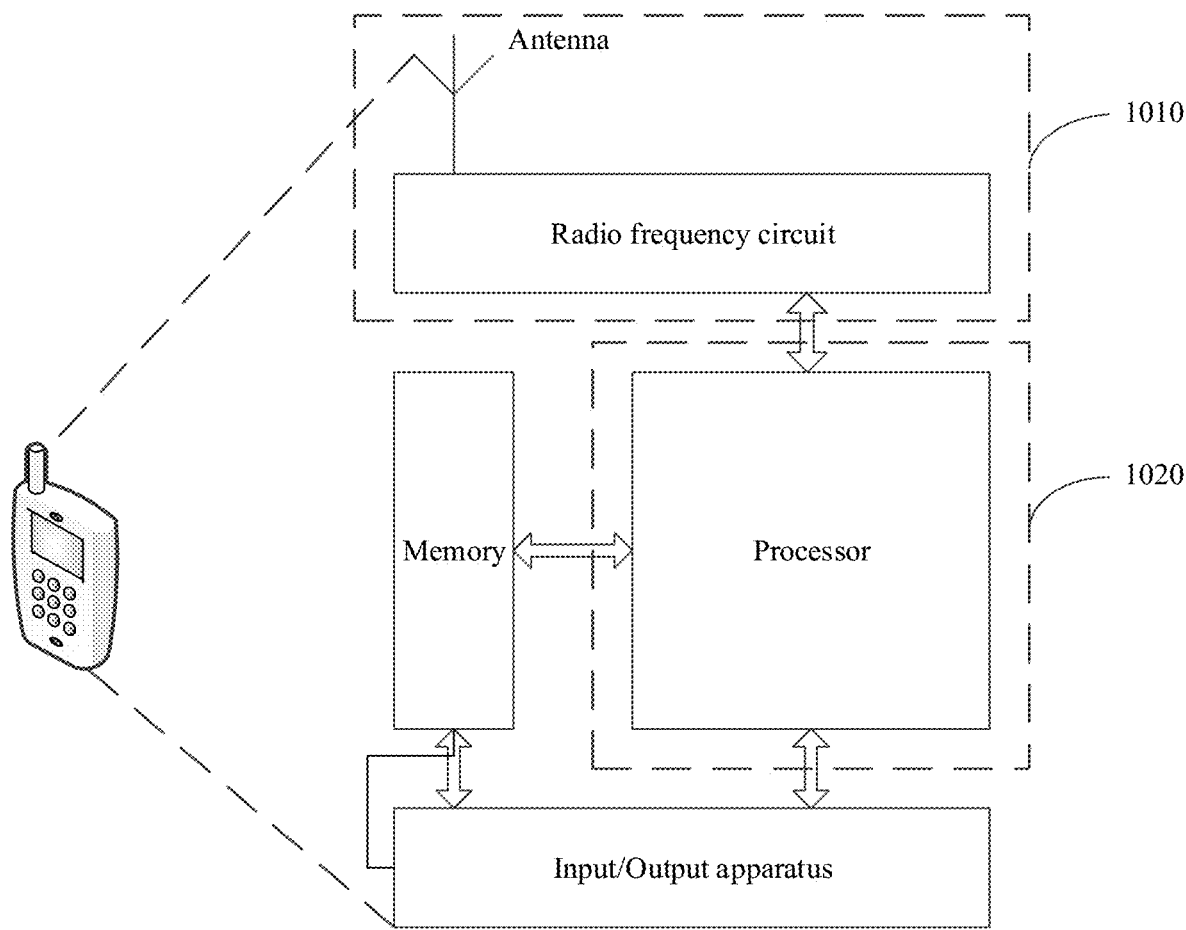
FIG. 10 is a schematic block diagram of a communication apparatus according to an embodiment of this application.

When the communication apparatus is a terminal device, FIG. 10 is a simplified schematic diagram of a structure of the terminal device. For ease of understanding and illustration, in FIG. 10, for example, the terminal device is a mobile phone. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is configured to store the software program and the data. The radio frequency circuit is mainly configured to perform conversion between a baseband signal and a radio frequency signal and process the radio frequency signal. The antenna is mainly configured to send and receive radio frequency signals in a form of an electromagnetic wave. The input/output apparatus, for example, a touchscreen, a display screen, or a keyboard is mainly configured to: receive data entered by a user, and output data to the user. It should be noted that some types of terminal devices may not have the input/output apparatus.

When data needs to be sent, the processor performs baseband processing on the to-be-sent data, and outputs a baseband signal to the radio frequency circuit. The radio frequency circuit performs radio frequency processing on the baseband signal, and sends a radio frequency signal through the antenna in a form of an electromagnetic wave.

When data is sent to the terminal device, the radio frequency circuit receives a radio frequency signal through the antenna, converts the radio frequency signal into a baseband signal, and outputs the baseband signal to the processor, and the processor converts the baseband signal into data and processes the data. For ease of description, only one memory and one processor are shown in FIG. 10. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device (where the transceiver unit may be a functional unit, and the functional unit can implement a sending function and a receiving function; or the transceiver unit may include two functional units: a receiving unit that can implement a receiving function and a sending unit that can implement a sending function). The processor that has a processing function is considered as a processing unit of the terminal device. As shown in FIG. 10, the terminal device includes a transceiver unit 1010 and a processing unit 1020. The transceiver unit may also be referred to as a transceiver, a transceiver machine, a transceiver apparatus, or the like. The processing unit may also be referred to as a processor, a processing board, a processing module, a processing apparatus, or the like. Optionally, a component configured to implement a receiving function in the transceiver unit 1010 may be considered as a receiving unit, and a component configured to implement a sending function in the transceiver unit 1010 may be considered as a sending unit. In other words, the transceiver unit 1010 includes the receiving unit and the sending unit. The transceiver unit sometimes may also be referred to as a transceiver machine, a transceiver, a transceiver circuit, or the like. The receiving unit may sometimes be referred to as a receiver machine, a receiver, a receiver circuit, or the like. The sending unit may sometimes be referred to as a transmitter machine, a transmitter, a transmitter circuit, or the like.

It should be understood that the transceiver unit 1010 is configured to perform a sending operation and a receiving operation on a terminal device side in the foregoing method embodiments, and the processing unit 1020 is configured to perform an operation other than the receiving operation and the sending operation of the terminal device in the foregoing method embodiments.

For example, in an implementation, the transceiver unit 1010 is configured to perform all sending operations and receiving operations performed by the terminal device in the embodiment shown in FIG. 3, for example, S32 and S36, and/or the transceiver unit 1010 is further configured to support another process of the technology described in this specification. The processing unit 1320 is configured to perform all operations performed by the terminal device in the embodiment shown in FIG. 3 except the sending and receiving operations, for example, S33 and S37, and/or the processing unit 1020 is further configured to support another process of the technology described in this specification.

For another example, in an implementation, the transceiver unit 1010 is configured to perform all sending operations and receiving operations performed by the terminal device in the embodiment shown in FIG. 5, for example, S52 and S56, and/or the transceiver unit 1010 is further configured to support another process of the technology described in this specification. The processing unit 1020 is configured to perform all operations performed by the terminal device in the embodiment shown in FIG. 5 except the sending and receiving operations, for example, S53 and S57, and/or the processing unit 1020 is further configured to support another process of the technology described in this specification.

When the communication apparatus is a chip apparatus or a circuit, the apparatus may include a transceiver unit and a processing unit. The transceiver unit may be an input/output circuit and/or a communication interface. The processing unit is an integrated processor, a microprocessor, or an integrated circuit.

Figure 11:
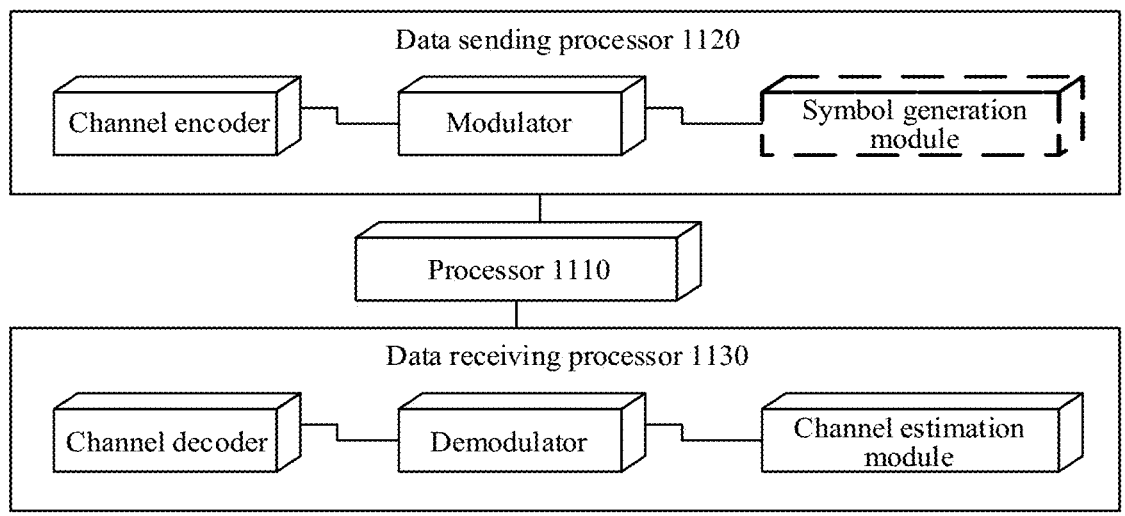
FIG. 11 is another schematic block diagram of a communication apparatus according to an embodiment of this application.

When the communication apparatus in this embodiment is a terminal device, refer to a device shown in FIG. 11. In an example, the device can implement a function similar to a function of the processing module 710 in FIG. 7. In another example, the device can implement a function similar to a function of the processing module 910 in FIG. 9. In FIG. 11, the device includes a processor 1110, a data sending processor 1120, and a data receiving processor 1130. The processing module 710 in the foregoing embodiment may be the processor 1110 in FIG. 11, and completes a corresponding function. The transceiver module 720 in the foregoing embodiment may be the data sending processor 1120 and/or the data receiving processor 1130 in FIG. 11, and completes a corresponding function. Alternatively, the processing module 910 in the foregoing embodiment may be the processor 1110 in FIG. 11, and completes a corresponding function. The transceiver module 920 in the foregoing embodiment may be the data sending processor 1120 and/or the data receiving processor 1130 in FIG. 11, and completes a corresponding function. Although FIG. 11 shows a channel encoder and a channel decoder, it may be understood that the modules are merely examples, and do not constitute a limitation on this embodiment.

Figure 12:
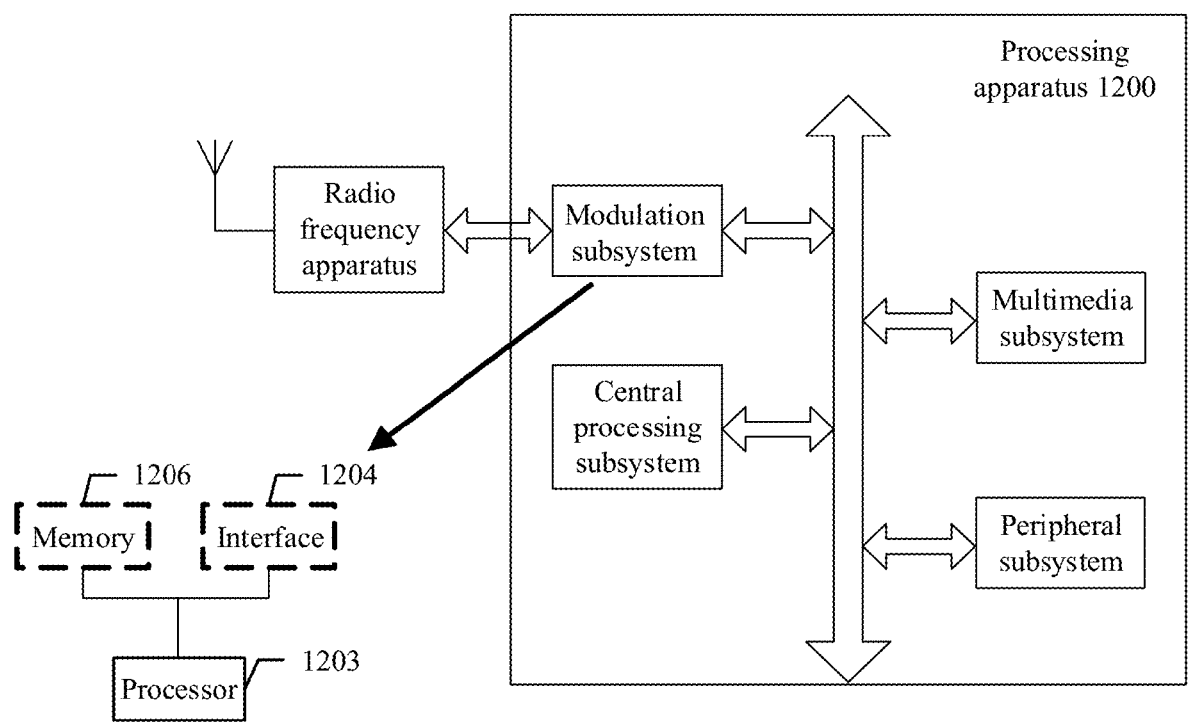
FIG. 12 is still another schematic block diagram of a communication apparatus according to an embodiment of this application.

FIG. 12 shows another form of this embodiment. A processing apparatus 1200 includes modules such as a modulation subsystem, a central processing subsystem, and a peripheral subsystem. The communication apparatus in this embodiment may be used as the modulation subsystem. Specifically, the modulation subsystem may include a processor 1203 and an interface 1204. The processor 1203 implements a function of the processing module 710, and the interface 1204 implements a function of the transceiver module 720. Alternatively, the processor 1203 implements a function of the processing module 910, and the interface 1204 implements a function of the transceiver module 920. In another variant, the modulation subsystem includes a memory 1206, a processor 1203, and a program that is stored in the memory 1206 and that can be run on the processor. When executing the program, the processor 1203 implements the method on the terminal device side in the foregoing method embodiments. It should be noted that the memory 1206 may be non-volatile or volatile. The memory 1206 may be located in the modulation subsystem, or may be located in the processing apparatus 1200, provided that the memory 1206 can be connected to the processor 1203.

Figure 13:
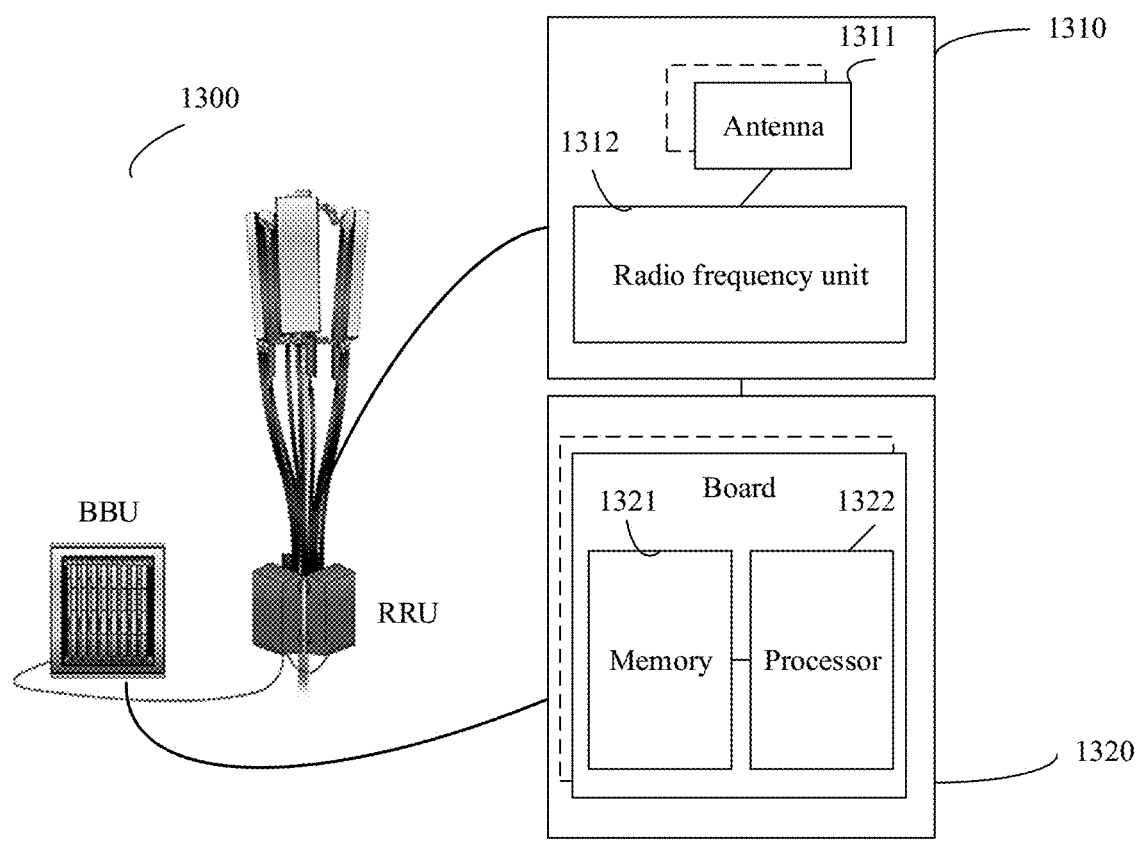
FIG. 13 is yet another schematic block diagram of a communication apparatus according to an embodiment of this application.

When the apparatus in this embodiment of this application is a network device, the apparatus may be shown in FIG. 13. An apparatus 1300 may include one or more radio frequency units such as a remote radio unit (remote radio unit, RRU) 1310 and one or more baseband units (baseband units, BBUs) (which may also be referred to as digital units, digital units, DUs) 1320. The RRU 1310 may be referred to as a transceiver module. The transceiver module may include a sending module and a receiving module, or the transceiver module may be a module that can implement a sending function and a receiving function. The transceiver module may correspond to the transceiver module 620 in FIG. 6, or the transceiver module may correspond to the transceiver module 820 in FIG. 8. Optionally, the transceiver module may also be referred to as a transceiver machine, a transceiver circuit, a transceiver, or the like, and may include at least one antenna 1311 and a radio frequency unit 1312. The RRU 1310 is mainly configured to: send and receive a radio frequency signal, and perform conversion between the radio frequency signal and a baseband signal. For example, the RRU 1310 is configured to send indication information to a terminal device. The BBU 1310 is mainly configured to perform baseband processing, control a base station, and so on. The RRU 1310 and the BBU 1320 may be physically disposed together, or may be physically disposed separately, namely, a distributed base station.

The BBU 1320 is a control center of the base station, may also be referred to as a processing module, may correspond to the processing module 610 in FIG. 6, or may correspond to the processing module 810 in FIG. 8, and is mainly configured to complete baseband processing functions such as channel coding, multiplexing, modulation, and spectrum spreading. For example, the BBU (the processing module) may be configured to control the base station to perform an operation procedure related to the network device in the foregoing method embodiments, for example, generate the foregoing indication information.

In an example, the BBU 1320 may include one or more boards, and a plurality of boards may jointly support a radio access network (for example, an LTE network) having a single access standard; or may separately support radio access networks (for example, an LTE network, a 5G network, or another network) having different access standards. The BBU 1320 further includes a memory 1321 and a processor 1322. The memory 1321 is configured to store necessary instructions and data. The processor 1322 is configured to control the base station to perform a necessary action, for example, is configured to control the base station to perform an operation procedure related to the network device in the foregoing method embodiments. The memory 1321 and the processor 1322 may serve one or more boards. In other words, the memory and the processor may be independently disposed on each board. Alternatively, the plurality of boards may share a same memory and a same processor. In addition, a necessary circuit may be further disposed on each board.

An embodiment of this application provides a first communication system. The first communication system may include the network device in the embodiment shown in FIG. 3 and the terminal device in the embodiment shown in FIG. 3. For example, the terminal device is the terminal device 700 in FIG. 7. For example, the network device is the network device 600 in FIG. 6.

An embodiment of this application provides a second communication system. The second communication system may include the terminal device in the embodiment shown in FIG. 5 and the network device in the embodiment shown in FIG. 5. For example, the terminal device is the terminal device 900 in FIG. 9. For example, the network device is the network device 800 in FIG. 8.

The first communication system and the second communication system may be a same communication system, or may be different communication systems.

An embodiment of this application further provides a computer-readable storage medium. The computer-readable storage medium stores a computer program. When the computer program is executed by a computer, the computer may implement a procedure related to the network device in the embodiment shown in FIG. 3 in the foregoing method embodiments.

An embodiment of this application further provides a computer-readable storage medium. The computer-readable storage medium is configured to store a computer program. When the computer program is executed by a computer, the computer may implement a procedure related to the terminal device in the embodiment shown in FIG. 3 in the foregoing method embodiments.

An embodiment of this application further provides a computer-readable storage medium. The computer-readable storage medium stores a computer program. When the computer program is executed by a computer, the computer may implement a procedure related to the network device in the embodiment shown in FIG. 5 in the foregoing method embodiments.

An embodiment of this application further provides a computer-readable storage medium. The computer-readable storage medium is configured to store a computer program. When the computer program is executed by a computer, the computer may implement a procedure related to the terminal device in the embodiment shown in FIG. 5 in the foregoing method embodiments.

An embodiment of this application further provides a computer program product. The computer program product is configured to store a computer program. When the computer program is executed by a computer, the computer may implement a procedure related to the network device in the embodiment shown in FIG. 3 in the foregoing method embodiments.

An embodiment of this application further provides a computer program product. The computer program product is configured to store a computer program. When the computer program is executed by a computer, the computer may implement a procedure related to the terminal device in the embodiment shown in FIG. 3 in the foregoing method embodiments.

An embodiment of this application further provides a computer program product. The computer program product is configured to store a computer program. When the computer program is executed by a computer, the computer may implement a procedure related to the network device in the embodiment shown in FIG. 5 in the foregoing method embodiments.

An embodiment of this application further provides a computer program product. The computer program product is configured to store a computer program. When the computer program is executed by a computer, the computer may implement a procedure related to the terminal device provided in the method embodiment shown in FIG. 5.

It should be understood that the processor mentioned in embodiments of this application may be a CPU, or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate, a transistor logic device, a discrete hardware component, or the like. The general-purpose processor may be a microprocessor, any conventional processor, or the like.

It may be understood that the memory mentioned in embodiments of this application may be a volatile memory or a non-volatile memory, or may include a volatile memory and a non-volatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through example description but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is the general-purpose processor, the DSP, the ASIC, the FPGA, or the another programmable logical device, discrete gate, transistor logical device, or discrete hardware component, the memory (storage module) is integrated into the processor.

It should be noted that the memory described in this specification includes but is not limited to these and any memory of another proper type.

It should be understood that, in embodiments of this application, sequence numbers of the foregoing processes do not mean execution orders. The execution orders of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication method, comprising:
   determining first signaling, wherein the first signaling is used to indicate at least one periodicity, and one of the at least one periodicity is a periodicity to be used by a terminal device to detect a downlink signal; and
   sending the first signaling, wherein when a quantity of the at least one periodicity is greater than 1, the first signaling is further used to indicate an order of detection to be performed by the terminal device based on the at least one periodicity and wherein the at least one periodicity matches at least one sleep mode of the network device, where a match between the at least one periodicity and the at least one sleep mode is a difference between a length of the periodicity and a sleep granularity of the sleep mode is less than a first threshold.

2. The method according to claim 1, wherein the first signaling is further used to indicate a quantity of times of detection to be performed by the terminal device based on the at least one periodicity.

3. The method according to claim 1, wherein the first signaling is further used to indicate one or more offsets, and the offset is used to assist in the periodicity-based detection.

4. The method according to claim 1, wherein the method further comprises:
   sending second signaling when the quantity of times of detection to be performed based on the at least one periodicity is reached, wherein the second signaling is used to indicate a second periodicity, and the second periodicity sequentially follows the at least one periodicity.

5. The method according to claim 1, wherein that the first signaling is used to indicate at least one periodicity comprises one of:
the first signaling comprises the at least one periodicity; or
the first signaling comprises an identifier of a first periodicity set, the identifier of the first periodicity set is used to indicate the at least one periodicity, the first periodicity set is one of a plurality of periodicity sets, and each of the plurality of periodicity sets comprises an order combination of one or more periodicities.

6. The method according to claim 5, wherein the method further comprises:
sending third signaling, wherein the third signaling is used to indicate the plurality of periodicity sets.

7. The method according to claim 1, wherein in the at least one periodicity, a length of an earlier periodicity is greater than a length of a later periodicity.

8. The method according to claim 1, wherein that the first signaling is used to indicate at least one periodicity comprises:
the first signaling indicates first duration, and the first duration is related to one of the at least one periodicity.

9. The method according to claim 8, wherein that the first duration is related to one of the at least one periodicity comprises:
a value of the first duration is in direct proportion to a value of the periodicity.

10. The method according to claim 1, wherein the method further comprises:
sending fourth signaling after being woken up, wherein the fourth signaling is one of wake-up signal (WUS) signaling, downlink control information (DCI) used to schedule data, or signaling used to carry special information.

11. The method according to claim 1, wherein the first signaling is one of radio resource control (RRC) signaling, downlink control information (DCI), or a system message.

12. The method according to claim 1, wherein the at least one periodicity is used to change a periodicity of a first search space of the terminal device to the at least one periodicity, and the first search space is a search space for sending the first signaling; or the first search space comprises any one of all search spaces supported by the terminal device.

13. A communication method, comprising:
receiving first signaling from a network device, wherein the first signaling is used to indicate at least one periodicity, and one of the at least one periodicity is a periodicity to be used by a terminal device to detect a downlink signal; and
detecting the downlink signal based on the at least one periodicity, wherein when a quantity of the at least one periodicity is greater than 1, the first signaling is further used to indicate an order of detection to be performed by the terminal device based on the at least one periodicity and wherein the at least one periodicity matches at least one sleep mode of the network device, where a match between the at least one periodicity and the at least one sleep mode is a difference between a length of the periodicity and a sleep granularity of the sleep mode is less than a first threshold.

14. The method according to claim 13, wherein the first signaling is further used to indicate a quantity of times of detection to be performed by the terminal device based on the at least one periodicity.

15. The method according to claim 13, wherein the first signaling is further used to indicate one or more offsets, and the offset is used to assist in the periodicity-based detection.

16. A network device, comprising:
a processor; and
a computer readable memory storing instructions that when executed by the processor cause the network device to perform steps comprising
determining first signaling, wherein the first signaling is used to indicate at least one periodicity, and one of the at least one periodicity is a periodicity to be used by a communication apparatus to detect a downlink signal; and
sending the first signaling, wherein when a quantity of the at least one periodicity is greater than 1, the first signaling is further used to indicate an order of detection to be performed by the terminal device based on the at least one periodicity and wherein the at least one periodicity matches at least one sleep mode of the network device, where a match between the at least one periodicity and the at least one sleep mode is a difference between a length of the periodicity and a sleep granularity of the sleep mode is less than a first threshold.

* * * * *